(12) United States Patent
Mohassel et al.

(10) Patent No.: US 11,222,138 B2
(45) Date of Patent: Jan. 11, 2022

(54) PRIVACY-PRESERVING MACHINE LEARNING IN THE THREE-SERVER MODEL

(71) Applicant: Visa International Service Association, San Francisco, CA (US)

(72) Inventors: Payman Mohassel, San Jose, CA (US); Peter Rindal, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/057,574

(22) PCT Filed: Jul. 17, 2018

(86) PCT No.: PCT/US2018/042545
§ 371 (c)(1),
(2) Date: Nov. 20, 2020

(87) PCT Pub. No.: WO2019/231481
PCT Pub. Date: Dec. 5, 2019

(65) Prior Publication Data
US 2021/0209247 A1 Jul. 8, 2021

Related U.S. Application Data

(60) Provisional application No. 62/677,575, filed on May 29, 2018.

(51) Int. Cl.
*G06F 21/62* (2013.01)
*G06N 20/00* (2019.01)

(52) U.S. Cl.
CPC ......... *G06F 21/6245* (2013.01); *G06N 20/00* (2019.01)

(58) Field of Classification Search
CPC .......................... G06F 21/6245; G06N 20/00
(Continued)

(56) References Cited

U.S. PATENT DOCUMENTS 10,083,310 B1 * 9/2018 Lampkins ............. G06F 21/606
2016/0283735 A1 9/2016 Wang et al.
(Continued)

FOREIGN PATENT DOCUMENTS

WO 2017222902 12/2017

OTHER PUBLICATIONS

Li, Ping, et al. "Multi-key privacy-preserving deep learning in cloud computing." Future Generation Computer Systems 74 (2017): 76-85. (Year: 2017).*

(Continued)

*Primary Examiner* — Syed A Zaidi
(74) *Attorney, Agent, or Firm* — Kilpatrick Townsend & Stockton LLP

(57) ABSTRACT

Methods and systems according to embodiments of the invention provide for a framework for privacy-preserving machine learning which can be used to obtain solutions for training linear regression, logistic regression and neural network models. Embodiments of the invention are in a three-server model, wherein data owners secret-share their data among three servers who train and evaluate models on the joint data using three-party computation (3PC). Embodiments of the invention provide for efficient conversions between arithmetic, binary, and Yao 3PC, as well as techniques for fixed-point multiplication and truncation of shared decimal values. Embodiments also provide customized protocols for evaluating polynomial piecewise functions and a three-party oblivious transfer protocol.

20 Claims, 26 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 2017/0372226 | A1* | 12/2017 | Costa et al. ........... | G06N 20/00 |
| 2018/0011996 | A1* | 1/2018 | Dolev ..................... | H04L 9/085 |
| 2018/0048625 | A1* | 2/2018 | Teranishi ................ | H04L 9/088 |
| 2020/0186528 | A1* | 6/2020 | Fan .......................... | H04L 9/00 |
| 2020/0228325 | A1* | 7/2020 | Fan ......................... | G06F 17/16 |
| 2020/0401440 | A1* | 12/2020 | Sankaran ............ | G06F 9/30087 |

OTHER PUBLICATIONS

Yuan, Jiawei, and Shucheng Yu. "Privacy preserving back-propagation neural network learning made practical with cloud computing." IEEE Transactions on Parallel and Distributed Systems 25.1 (2013): 212-221. (Year: 2013).*

Miyajima, Hirofumi, et al. "New privacy preserving back propagation learning for secure multiparty computation." IAENG International Journal of Computer Science 43.3 (2016): 270-276. (Year: 2016).*

Zhang, Xinyang, et al. "Private, yet practical, multiparty deep learning." 2017 IEEE 37th International Conference on Distributed Computing Systems (ICDCS). IEEE, 2017 (Year: 2017).*

NPL Search Terms (Year: 2021).*

Guang et al., "A privacy Preserving Neural Network Learning Algorithm for Horizontally Partitioned Databases", Information Technology Journal, vol. 9, Issue 1, 2010, pp. 1-10.

Miyajima et al., "Proposal of Privacy Preserving Reinforcement Learning for Secure Multiparty Computation", Artificial Intelligence Research, vol. 6, Issue 2, May 23, 2017, pp. 57-68.

Mohassel et al., "SecureML: A System for Scalable Privacy-Preserving Machine Learning", IEEE Symposium on Security and Privacy, Jun. 26, 2017, pp. 1-20.

Application No. PCT/US2018/042545, International Search Report and Written Opinion, dated Feb. 27, 2019, 15 pages.

* cited by examiner

| Protocol | Malicious | | Semi-honest | |
|---|---|---|---|---|
| | Comm | Round | Comm | Round |
| Add | 0 | 0 | 0 | 0 |
| Mult | 4k | 1 | 11k | 1 |
| ZeroShare | 0 | 0 | 0 | 0 |
| Rand | 0 | 0 | 0 | 0 |
| RevealAll | 3 | 1 | 6 | 1 |
| RevealOne | 1 | 1 | 2 | 1 |
| Input | 3 | 1 | 3 | 1 |

*FIG. 5*

MALICIOUS SHARE TRUNCATION

Parameters: A single 2-out-of-3 (or 3-out-of-3) share $[\![x']\!]^A = (x'_1, x'_2, x'_3)$ over the ring $\mathbb{Z}_{2^k}$ and a integer $d < k$.
Preprocess:
- S802    1) All parties locally compute $[\![r']\!]^B \leftarrow \text{Rand}((\mathbb{Z}_2)^k)$.
- S804    2) Define the sharing $[\![r]\!]^B$ to be the $k - d$ most significant shares of $[\![r']\!]^B$, i.e. $r = r'/2^d$.
- S806    3) The parties compute $[\![r'_2]\!]^B, [\![r'_3]\!]^B \leftarrow \text{Rand}((\mathbb{Z}_2)^k)$ and $[\![r_2]\!]^B, [\![r_3]\!]^B \leftarrow \text{Rand}((\mathbb{Z}_2)^{k-d})$. $r'_2, r_2$ is revealed to party 1,2 and $r'_3, r_3$ to parties 2,3 using the RevealOne routine.
- S808    4) Using a ripple carry subtraction circuit, the parties jointly compute $[\![r'_1]\!]^B := [\![r']\!]^B - [\![r'_2]\!]^B - [\![r'_3]\!]^B$, $[\![r_1]\!]^B := [\![r]\!]^B - [\![r_2]\!]^B - [\![r_3]\!]^B$ and reveal $r'_1, r_1$ to parties 1,3.
- S810    5) Define the preprocessed shares as $[\![r']\!]^A := (r'_1, r'_2, r'_3), [\![r]\!]^A := (r_1, r_2, r_3)$.

Online:
- S812    1) The parties jointly compute $[\![x' - r']\!]^A$ and then compute $(x' - r') := \text{RevealAll}([\![x - r']\!]^A)$.
- S814    2) Output $[\![x]\!]^A := [\![r]\!]^A + (x' - r')/2^d$.

FIG. 8

Flowchart of malicious truncation

Flowchart of malicious truncation $$X = \begin{bmatrix} x_{11} & x_{12} & \cdots & x_{1d} \\ x_{21} & x_{22} & \cdots & x_{2d} \\ \cdots & \cdots & \ddots & \cdots \\ x_{n1} & x_{n2} & \cdots & x_{nd} \end{bmatrix}, Y = \begin{bmatrix} y_1 \\ y_2 \\ \cdots \\ y_n \end{bmatrix}$$

1010    1020

$$Z = X \times Y$$

1030

$$Z_i = \sum_j x_{ij} y_j$$

| Conversion | Semi-honest | | Malicious | |
|---|---|---|---|---|
| | Comm. | Rounds | Comm. | Rounds |
| $[x]^A \to [x]^B$ | $k + k \log k$ | $1 + \log k$ | $k + k \log k$ | $1 + \log k$ |
| $([x]^A, i) \to [x[i]]^B$ | $k$ | $1 + \log k$ | $2k$ | $1 + \log k$ |
| $[x]^B \to [x]^A$ | $k + k \log k$ | $1 + \log k$ | $k + k \log k$ | $1 + \log k$ |
| $[b]^B \to [b]^A$ | $2k$ | $1$ | $2k$ | $2$ |
| $[b]^Y \to [b]^B$ | $1/3$ | $1$ | $2\kappa/3$ | $1$ |
| $[b]^B \to [b]^Y$ | $2\kappa/3$ | $1$ | $4\kappa/3$ | $1$ |
| $[x]^Y \to [x]^A$ | $4k\kappa/3$ | $1$ | $5k\kappa/3$ | $1$ |
| $[x]^A \to [x]^Y$ | $4k\kappa/3$ | $1$ | $8k\kappa/3$ | $1$ |

*FIG. 12*

| Setting | Dimension | Protocol | Batch Size B | | | | | | | |
|---|---|---|---|---|---|---|---|---|---|---|
| | | | Online | | | | Online + Offline | | | |
| | | | 128 | 256 | 512 | 1024 | 128 | 256 | 512 | 1024 |
| LAN | 10 | This | 11764 | 10060 | 7153 | 5042 | 11574 | 9803 | 6896 | 4125 |
| | | [41] | 7889 | 7206 | 4350 | 4263 | 47 | 25 | 11 | 5.4 |
| | 100 | This | 5171 | 2738 | 993 | 447 | 5089 | 2744 | 1091 | 470 |
| | | [41] | 2612 | 735 | 325 | 281 | 3.7 | 2.0 | 1.1 | 0.6 |
| | 1000 | This | 406 | 208 | 104 | 46 | 377 | 200 | 100 | 46 |
| | | [41] | 131 | 96 | 45 | 27 | 0.44 | 0.24 | 0.12 | 0.06 |
| WAN | 10 | This | 24.6 | 24.5 | 24.3 | 23.9 | 20.8 | 20.7 | 20.6 | 20.3 |
| | | [41] | 12.4 | 12.4 | 12.4 | 12.4 | 2.4 | 1.6 | 0.88 | 0.50 |
| | 100 | This | 24.5 | 24.1 | 23.7 | 23.3 | 20.7 | 20.4 | 20.1 | 19.4 |
| | | [41] | 12.3 | 12.2 | 11.8 | 11.8 | 0.63* | 0.37* | 0.19* | 0.11* |
| | 1000 | This | 22.2 | 20.2 | 17.5 | 12.6 | 19.3 | 17.9 | 16.5 | 11.6 |
| | | [41] | 11.0 | 9.8 | 9.2 | 7.3 | 0.06* | 0.03* | 0.02* | 0.01* |

*FIG. 22*

| Setting | Dimension | Protocol | Batch Size B | | | | | | | |
|---|---|---|---|---|---|---|---|---|---|---|
| | | | Online | | | | Online + Offline | | | |
| | | | 128 | 256 | 512 | 1024 | 128 | 256 | 512 | 1024 |
| LAN | 10 | This | 2251 | 2053 | 1666 | 1245 | 2116 | 1892 | 1441 | 1031 |
| | | [40] | 188 | 101 | 41 | 25 | 37 | 20 | 8.6 | 4.4 |
| | 100 | This | 1867 | 1375 | 798 | 375 | 1744 | 1276 | 727 | 345 |
| | | [40] | 183 | 93 | 46 | 24 | 3.6 | 1.9 | 1.1 | 0.6 |
| | 1000 | This | 349 | 184 | 95 | 42 | 328 | 177 | 93 | 41 |
| | | [40] | 105 | 51 | 24 | 13.5 | 0.43 | 0.24 | 0.12 | 0.06 |
| WAN | 10 | This | 4.12 | 4.10 | 4.06 | 3.99 | 3.91 | 3.90 | 3.86 | 3.79 |
| | | [40] | 3.10 | 2.28 | 1.58 | 0.99 | 1.4 | 0.94 | 0.56 | 0.33 |
| | 100 | This | 4.11 | 4.09 | 4.03 | 3.94 | 3.91 | 3.89 | 3.84 | 3.74 |
| | | [40] | 3.08 | 2.25 | 1.57 | 0.99 | 0.52* | 0.32* | 0.17* | 0.01* |
| | 1000 | This | 4.04 | 3.95 | 3.78 | 3.47 | 3.84 | 3.75 | 3.59 | 3.32 |
| | | [40] | 3.01 | 2.15 | 1.47 | 0.93 | 0.06* | 0.03* | 0.02* | 0.01* |

*FIG. 23*

| Model | Protocol | Batch Size | Running Time (ms) Online | Running Time (ms) Total | Comm. (MB) |
|---|---|---|---|---|---|
| Linear | This | 1 | 0.1 | 3.8 | 0.002 |
| | This | 100 | 0.3 | 4.1 | 0.008 |
| | SecureML [41] | 1 | 0.2 | 2.6 | 1.6 |
| | SecureML [41] | 100 | 0.3 | 54.2 | 160 |
| Logistic | This | 1 | 0.2 | 4.0 | 0.005 |
| | This | 100 | 6.0 | 9.1 | 0.26 |
| | SecureML [41] | 1 | 0.7 | 3.8 | 1.6 |
| | SecureML [41] | 100 | 4.0 | 56.2 | 161 |
| NN | This | 1 | 3 | 8 | 0.5 |
| | SecureML [41] | 1 | 193 | 4823 | 120.5 |
| CNN | This* | 1 | 6 | 10 | 5.2 |
| | Chameleon [44] | 1 | 1360 | 2700 | 12.9 |
| | MiniONN [38] | 1 | 3580 | 9329 | 657.5 |

*FIG. 24*

PRIVACY-PRESERVING MACHINE LEARNING IN THE THREE-SERVER MODEL

CROSS-REFERENCES TO RELATED APPLICATIONS

The present application is a 371 application of International Application No. claims priority to U.S. Provisional Application No. 62/677,576, filed on May 29, 2018, which is herein incorporated by reference in its entirety for all purposes.

BACKGROUND

Machine learning is widely used to produce models that can classify images, authenticate biometric information, recommend products, choose which advertisements to show, and identify fraudulent transactions. Major technology companies are providing cloud-based machine learning services [4], [5], [7], [2] to their customers both in the form of pre-trained models that can be used for prediction as well as training platforms that can train models on customer data. Advances in deep learning, in particular, have led to breakthroughs in image, speech, and text recognition to the extent that the best records are often held by neural network models trained on large datasets.

A major enabler of this success is the large scale data collection that deep learning algorithms thrive on. Internet companies regularly collect users' online activities and browsing behavior to collect data and to train more accurate recommendation systems. For example, the healthcare sector envisions a future where patients' clinical and genomic data can be used to produce new diagnostic models. Another example is to share security incidents and threat data in order to create broad machine learning models that can improve future attack prediction.

The data being classified or used for training is often sensitive and may come from multiple sources with different privacy requirements. Regulations such as the Health Insurance Portability and Accountability Act of 1996 (HIPAA), the Payment Card Industry Security Standards Council (PCI SSC), and the General Data Protection Regulation (GDPR) as well as user privacy concerns, data sovereignty issues, and competitive advantage are all reasons that prevent entities from pooling different data sources to train more accurate models.

Privacy-preserving machine learning based on secure multiparty computation (MPC) is an active area of research that can help address some of these concerns. In particular, it tries to ensure that during training the only information leaked about the data is the final model (or an encrypted/shared version) and during prediction the only information leaked is the classification label. Alone, this may not provide a full-proof privacy solution. For example, the models themselves or interactions with the models can leak information about the data [53], [50], [52]. However, privacy-preserving machine learning offers guarantees that provide a strong first line of defense which can be strengthened when combined with orthogonal mechanisms such as differential privacy [8], [39].

One setting considered in this line of work is a server-aided model where data owners (clients) send an encrypted/shared version of their data to multiple servers that can perform the training procedure on the combined data or apply a shared pre-trained model to classify new data samples. Performance of these solutions have improved over the years, leading to orders of magnitude speedup in privacy-preserving machine learning. Nevertheless, there is still a large gap between plaintext training and the state-of-the-art privacy-preserving solutions. While part of this gap is unavoidable given the desired guarantees, the current state of affairs is far from optimal. In three party computation (3PC) with one corruption, new techniques and implementations [40], [10], [26] have significantly reduced this gap, e.g. processing 7 billion AND gates per second (1.3 million AES circuits). The MPC techniques employed for machine learning, however, are primarily limited to the two-server model and do not benefit from these speedups. They also only consider security against the weaker semi-honest attackers that continue to behave honestly even after corrupting a server.

Embodiments of the invention address this and other problems, individually and collectively.

BRIEF SUMMARY

Embodiments of the present invention provide methods, apparatuses, and systems for implementing privacy-preserving machine learning. The private data from multiple sources can be secret-shared among three or more training computers (e.g., first, second, and third training computers). Different parts of a single data item of the private data can be stored on different training computer such that the data item is not known to any one of the training computers. A secret-shared data item of the secret-shared private data can be represented by three parts.

The secret-shared private data can include a set of training samples. Each training sample can have features and an output Y. In some embodiments, weights of a machine learning model can be efficiently determined in the training, e.g., iteratively initializing the weights. For example, the three training computers can truncate a result of a multiplication of a secret-shared feature and a secret-shared weight as part of training the machine learning model. The truncation can include generating a random value, truncating a sum of a second share and a third share resulting in an intermediate value, transmitting the truncated second share to the first training computer, and transmitting a truncated first share to the third training computer. Further, additional multiplications and truncations for secret-shared features of the set of training samples and secret-shared weights to train a machine learning model for predicting the outputs Y of the set of training samples can be performed.

According to another embodiment, three training computers can truncate a result of a multiplication of a secret-shared feature and a secret-shared weight as part of training a machine learning model. The result comprises a first share, a second share, and a third share. The truncation can be performed in the malicious setting and can include performing preprocessing resulting in a random arithmetic share and a truncated random arithmetic share for each of the three training computers. The three training computers can determine intermediate shares of an intermediate value. The intermediate shares can be revealed to the three training computers. Each of the three training computers can store and then truncate the intermediate value. Each of the training computers can determine a truncated data item using the respective truncated random arithmetic share and the truncated intermediate value. The truncated data item is secret-shared among the three training computers.

According to another embodiment, training computers can efficiently perform computations using secret-shared data shared among a plurality of computers. A first training computer can determine local shares of elements of an inner product z of locally-stored shares of a first shared tensor X and locally-stored shares of a second shared tensor Y. A second training computer and a third training computer determine respective local shares of the inner product. The first training computer can then add the local shares of the elements of the inner product z and a secret-shared random value r, resulting in a local share of an intermediate value. The shared intermediate value can be revealed to the second training computer and the third training computer. The first computer can receive a share of the shared intermediate value and can determine an intermediate value. The intermediate value can be truncated by a predetermined number of bits to determine a truncated intermediate value. The first training computer can subtract the truncated intermediate value by a secret-shared truncated random value, resulting in a product of two tensors.

According to another embodiment, three training computers can locally, convert each value of a arithmetic secret-shared data item into k bit vectors of secret-shared bits, with no communication. Each training computer can store two of three shares of each vector. The training computers can create three tuples, each of which comprise two of three shares of a vector. Each training computer can input its three tuples, which can be different at each training computer, into full adder circuits operating in parallel. The outputs of the k full adder circuits can be inputs to a parallel prefix adder. The three training computers can determine a binary secret-shared data item based on the output of the parallel prefix adder.

According to another embodiment, three training computers can generate two random binary secret-shared values. The shares of the two random binary secret-shared values can be summed along with a binary secret-shared data item using full adder circuits in parallel. The outputs of the full adder circuits can be inputs to a parallel prefix adder. The three training computers can determine an arithmetic secret-shared data item based on the output of the parallel prefix adder.

Other embodiments can include a method of efficiently performing privacy-preserving computations including a Yao secret-shared data item comprising a first key and a choice key to determine a binary secret-shared data item. A first training computer and a second training computer can generate a random value, which can be a new second share. The second training computer and a third training computer can determine a new third share. The new third share can be a permutation bit stored by the second training computer and the third training computer. The permutation bit being stored as part of the Yao secret-shared data item. The first training computer can determine a new first share. The new first share is equal to the choice key XORed with the random value. The choice key is stored at the first training computer. The first training computer can then transmit the new first share to the third training computer.

Other embodiments can include, a method of performing a three-party oblivious transfer among a sender computer, a receiver computer, and a helper computer. The sender computer and the helper computer can generate two random strings. The sender computer can then mask two messages with the two random strings. The sender computer can transmit the two masked messages to the receiver computer. The receiver computer can also receive a choice random string from the helper computer. The choice random string is either the first random string or the second random string.

The receiver computer recovers a choice message using the choice random string and either the first masked message or the second masked message.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 5 shows round and communication cost of various protocols.

FIG. 8 shows a method of performing truncation during privacy-preserving machine learning in the malicious setting according to an embodiment of the invention.

FIG. 10A shows two data items according to an embodiment of the invention.

FIG. 12 shows round and communication cost of various conversions.

FIG. 22 shows a data table of linear regression performance.

FIG. 23 shows a data table of logistic regression performance.

FIG. 24 shows running time and communications of privacy preserving inference of linear, logistic and neural network models in the LAN setting.

TERMS

Figure 1:
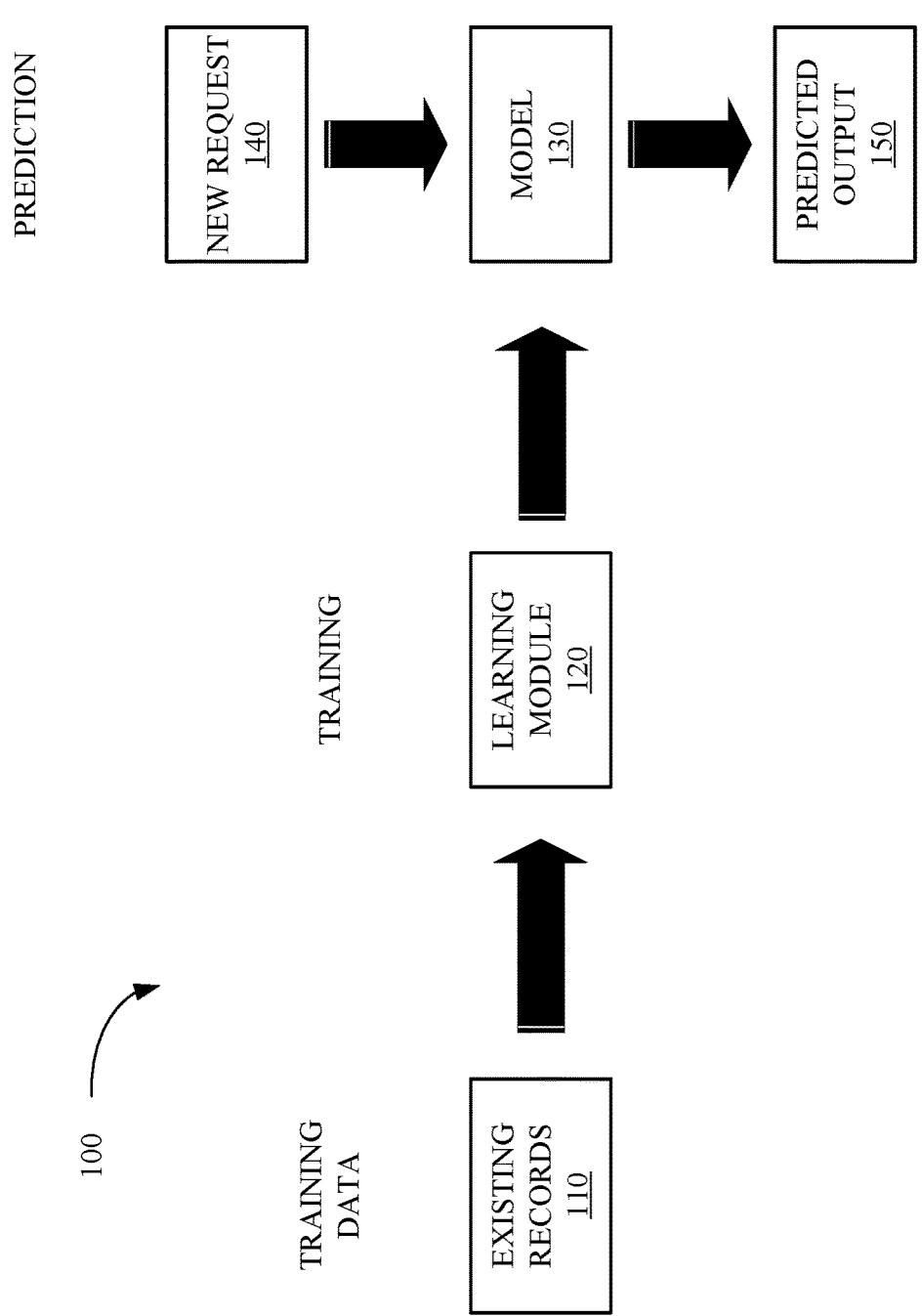
FIG. 1 shows a high-level diagram depicting a process for training and using a machine learning model.

Prior to discussing embodiments of the invention, description of some terms may be helpful in understanding embodiments of the invention.

The term "server computer" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers. The term "computer system" may generally refer to a system including one or more server computers, which may be coupled to one or more databases.

A "machine learning model" can refer to a set of software routines and parameters that can predict an output(s) of a real-world process (e.g., a diagnosis or treatment of a patient, identification of an attacker of a computer network, authentication of a computer, a suitable recommendation based on a user search query, etc.) based on a set of input features. A structure of the software routines (e.g., number of subroutines and relation between them) and/or the values of the parameters can be determined in a training process, which can use actual results of the real-world process that is being modeled.

The term "training computer" can refer to any computer that is used in training the machine learning model. As examples, a training computer can be one of a set of client computers from which the input data is obtained, or a server computer that is separate from the client computers.

The term "secret-sharing" can refer to any one of various techniques that can be used to store a data item on a set of training computers such that each training computer cannot determine the value of the data item on its own. As examples, the secret-sharing can involve splitting a data item up into shares that require a sufficient number (e.g., all) of training computers to reconstruct and/or encryption mechanisms where decryption requires collusion among the training computers.

DETAILED DESCRIPTION

Privacy-preserving machine learning is difficult to implement efficiently. The present disclosure provides techniques for efficient implementation that allows multiple client computers (e.g., from different companies, possibly competitors) to use their private data in creating a machine learning model, without having to expose the private data. The private data from multiple sources can be secret-shared among three or more training computers. For example, different parts of a single data item of the private data can be stored on different training computers such that the data item itself is not known to any one of the training computers.

The training of the model can use iterative techniques that optimize the predicted result based on a set of training data for which the result is known. As part of the training, the secret-shared parts can be multiplied by weights and functions applied to them in a privacy-preserving manner. Such multiplications and secret-sharing can be performed in various ways.

To increase computational efficiency, the private input data can be represented as integers (e.g., by shifting bits of floating-point numbers). To avoid storage of the integers from escalating when performing multiplications, a secret-shared result (e.g., the delta value for updating the weights) can be truncated by truncating the secret-shared parts at the training computers, thereby allowing efficient computation and limiting the amount of memory for storing the integer values. The efficiency of multiplications involving vectors, matrices, and tensors can be further improved using a delayed reshare technique.

It is often beneficial to switch back and forth between arithmetic operations (e.g., multiplications and addition) and non-arithmetic operations (e.g., non-linear activation functions, max-pooling, averages, etc.). Some embodiments provide new and optimized protocols that facilitate efficient conversions between all three types of secret-sharing: arithmetic, binary (Boolean), and Yao.

An efficient method of performing three-party oblivious transfer, which allows for the efficient computation of polynomial piecewise functions that are used in the machine learning process, e.g., as activation functions in logistic regression or neural networks.

I. Introduction to Privacy-Preserving Machine Learning

Aspects of the disclosure focus on privacy-preserving machine learning algorithms in a three-party model for training linear regression, logistic regression, and neural network models, although embodiments are applicable to other machine learning techniques. Examples adopt a three-server architecture, whereas previous systems focused on two-servers. PCT application, PCT/US2017/023652, describes privacy-preserving machine learning in a two-party model, which is hereby incorporated by reference in its entirety. Two-party computation is referred to as 2PC, whereas three-party computation is referred to as 3PC.

In multiparty computation, a given number of participating computers, $p_1, p_2, \ldots, p_N$, (also referred to as clients) each have private data, respectively $d_1, d_2, \ldots, d_N$. The participating computers want to compute the value of a public function on the private data: $F(d_1, d_2, \ldots, d_N)$ while keeping their own inputs secret. Embodiments can use various public functions (e.g., multiplication, inner product, activation functions, etc.) in the process of training a machine learning model. A goal of MPC is to design a protocol, where one can exchange messages only with other participants (or with untrusted servers) to learn F without revealing the private data to any of the participating computers. Ideally, the only information that can be inferred about the private data is whatever could be inferred from seeing the output of the function alone.

A. Machine Learning

FIG. 1 shows a high-level diagram depicting a process 100 for training and using a machine learning model. Process 100 starts with training data, shown as existing records 110. The training data can comprise various data samples, where each data sample includes input data and known output data. For an example data sample, the input data can be the pixel values of an image, and the output data can be a classification of what is in the image (e.g., that the image is of a dog).

After training data is obtained, a learning process can be used to train the model. A learning module 120 is shown receiving existing records 110 and providing a model 130 after training has been performed. As data samples include outputs known to correspond to specific inputs, a model can learn the type of inputs that correspond to which outputs (e.g., which images are of dogs). Once the model 130 has been trained, it can be used to predict the output for a new request 140 that includes new inputs. For instance, the model 130 can determine whether a new image is of a dog. The model 130 is shown providing a predicted output 150 based on the new request 140. Examples of the predicted output 150 include a classification of a threat, a classification of authentication, or a recommendation. In this manner, the wealth of the training data can be used to create artificial intelligence that can be advantageously used for a particular problem.

Common machine learning algorithms include linear regression, logistic regression, and neural networks. Machine learning is widely used in practice to produce predictive models for applications such as image processing, speech, and text recognition. These models are more accurate when trained on a large amount of data collected from different sources. The use of different sources can provide a greater variance in the types of training samples, thereby making the model more robust when encountering new inputs (e.g., new images, text, vocal intonations in speech, etc.). However, the massive data collection raises privacy concerns.

While recent technological advances enable more efficient storage, processing, and computation on big data, combining data from different sources remains an important challenge. Competitive advantage, privacy concerns and regulations, and issues surrounding data sovereignty and jurisdiction prevent many organizations from openly sharing their data. Privacy-preserving machine learning via secure multiparty computation provides a promising solution by allowing different entities to train various models on their joint data without revealing any information beyond the outcome.

B. 3-Party Privacy Preserving

Data from different sources can be useful in training machine learning models. It can be beneficial to use data collected from other companies in the same technical field. However, in some cases data cannot be shared between companies. For example, the companies that wish to share data may be under legal requirements to not share unencrypted data. Additionally, companies may collect data from users that wish to maintain their privacy. Embodiments of the invention provide techniques for an efficient implementation that allows client computers to use their provided data in creating a machine learning model, without having to expose the private data.

The private data from multiple sources can be secret-shared among three training computers. For example, different parts of a single data item of the private data can be stored on different training computers such that the data item is not known to any one of the training computers. An example case may include a payment network operator, a bank, and an ecommerce company. Each of the three companies may have data about fraudulent transactions that they wish to share with one another. However, data sharing may be prohibited for competitive or regulatory reasons. The three companies may secret-share their private data such that the other two companies cannot determine the original data. The secret-shared private data may be used to create fraud models using machine learning linear regression techniques, as well as other techniques. By using data from all three companies, rather than only from the payment network operator, the model may be stronger and better fit to a large number of parameters pertaining to fraudulent transactions.

Figure 2:
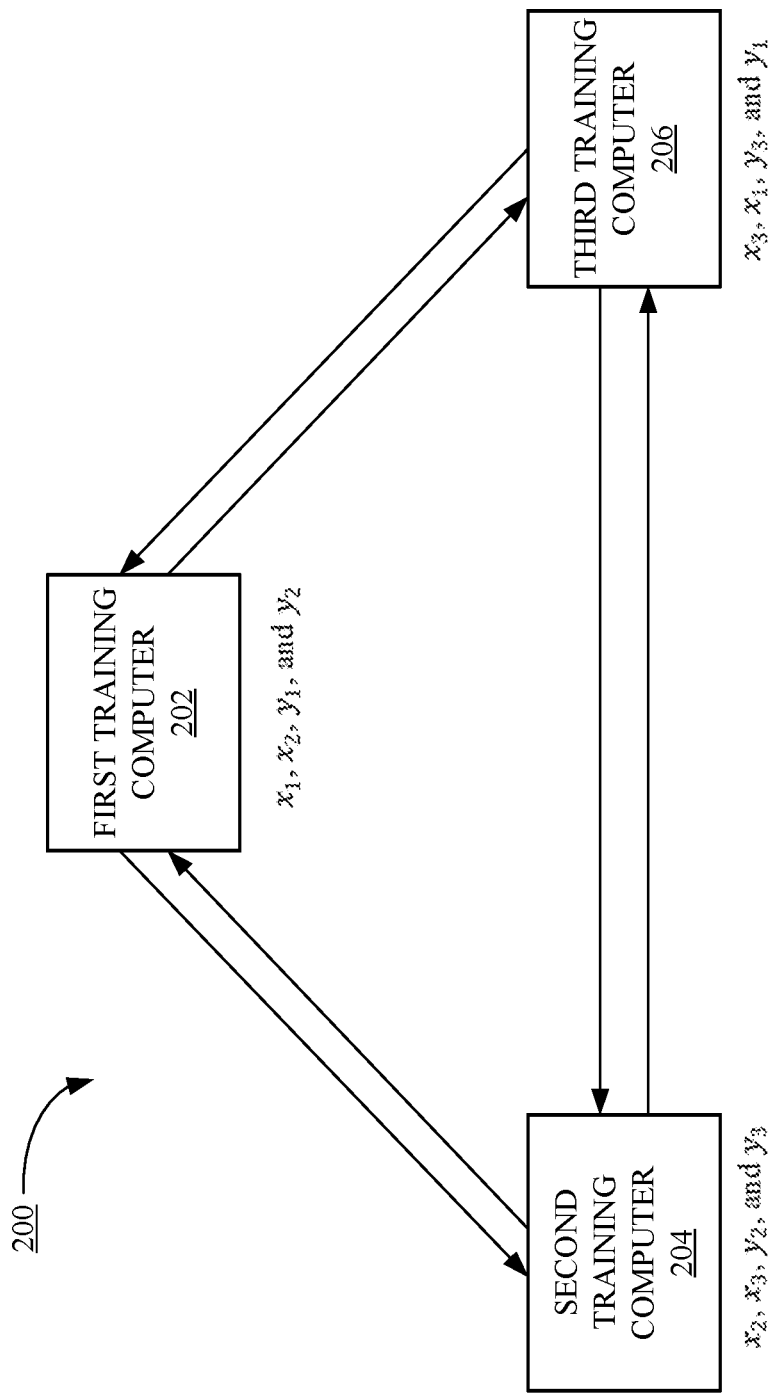
FIG. 2 shows a three-server architecture for secret-sharing data according to embodiments of the present invention.

FIG. 2 shows a three-server architecture 200 for secret-sharing data according to embodiments of the present invention. FIG. 2 includes a number of components, including a first training computer 202, a second training computer 204, and a third training computer 206. The first training computer 202, the second training computer 204, and the third training computer 206 may be in operative communication with one another through any suitable communication network.

Message between the entities, providers, networks, and devices illustrated in FIG. 2 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The communication network between entities, providers, networks, and devices may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

A starting point for three-party privacy preserving may be a semi-honest three-party secure computation protocol of Araki et al. [10] based on replicated secret-sharing. In this protocol, a data item x may be represented by linearly secret-sharing the data item x into three random values $x_1$, $x_2$ and $x_3$ such that the sum of the three random values equals the value of the data item x. Each of the three parties may store two of the three random values such that any two parties can reconstruct x. A data item x that is secret-shared between multiple training computers may be written as $[\![x]\!]$. For example, in reference to FIG. 2, the first training computer 202 may store $x_1$ and $x_2$, the second training computer 204 may store $x_2$ and $x_3$, and the third training computer 206 may store $x_3$ and $x_1$. Similarly, a second data item y may be shared between the training computers. Overall, the first training computer 202 may hold $x_1$, $x_2$, $y_1$, and $y_2$, the second training computer 204 may hold $x_2$, $x_3$, $y_2$, and $y_3$, and the third training computer 206 may hold $x_3$, $x_1$, $y_3$, and $y_1$. In some embodiments, any number of data items may be secret-shared between the training computers. In other embodiments, the data item x and the second data item y may originate from different client computers.

Figure 3:
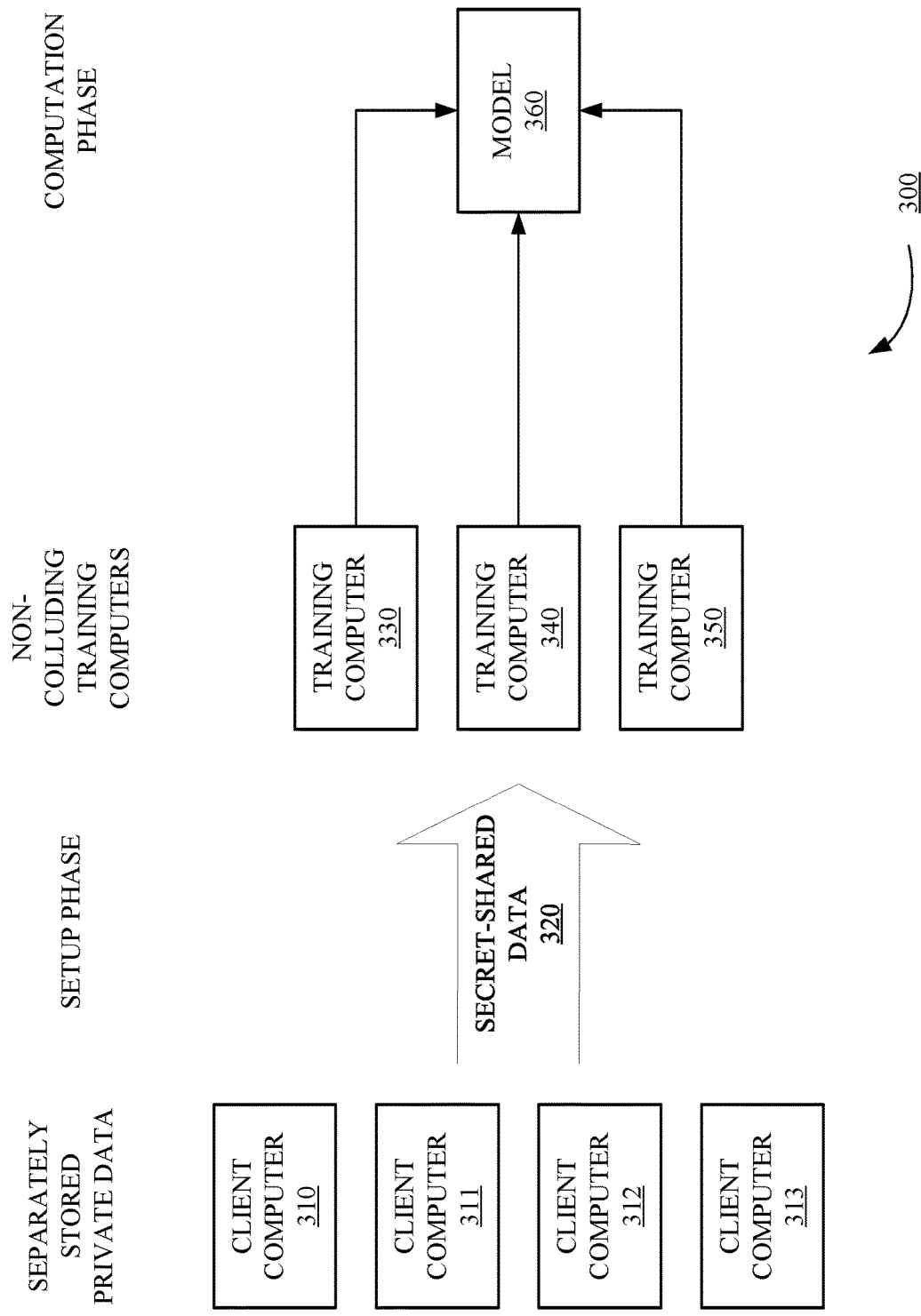
FIG. 3 shows a three-server architecture for use in training a machine learning model using secret-shared data from data clients according to embodiments of the present invention.

FIG. 3 shows a three-server architecture 300 for use in training a machine learning model using secret-shared data from client computers according to embodiments of the present invention. FIG. 3 depicts client computers 310-313, secret-shared data 320, training computers 330-350, and a model 360. Although three training computers are shown, more training computers may be used. Further, one or more of the training computers may be selected from the client computers. For example, in some embodiments, the training computer 330 may be the client computer 310.

Each of the client computers 310-313 can store private data that they do not wish to share with the other client computers. In a setup phase, the client computers 310-313 can secret-share their private data among the training computers 330, 340, and 350. Examples of secret-sharing include arithmetic sharing, Boolean (binary) sharing, and Yao sharing, and may involve encryption. Each client computer 310-313 can generate shares of its own private data and then send each share to one of the training computers 330, 340, and 350. Thus, training computers 330, 340, and 350 can collectively store all of the private data, but individually the training computers 330, 340, and 350 do not have access to the private data. The training computers 330, 340, and 350 may be non-colluding in that they cannot exchange messages to re-create the private data. However, some embodiments can work when a training computer is semi-honest or malicious.

As mentioned above, a client computer can secret-share its private data among the training computers 330, 340, and 350. The client computers 310-313 can secret-share a data item to create separate parts of the data item and allocate each part (share) to a different training computer. The data item can be reconstructed only when a sufficient number t of shares (e.g., all) are combined together. But, since the training computers 330, 340, and 350 are non-colluding, the secret parts (shares) are not shared among the training computers 330, 340, and 350, thereby keeping the data item secret. Thus, if the machine learning model used profile data of a user to predict actions by the user, each data item in the profile can be split among the three training computers 330, 340, and 350. This is beneficial since user profile data from any given client computer is not wholly shared with other client computers.

The sharing can be done in a secure manner. A non-secure example would be to give a third of the characters (e.g., numbers or letters) of a data item to each of the training computers 330-350. This system is not a "secure" secret-sharing scheme, because a server with fewer than t secret-shares may be able to reduce the problem of obtaining the secret without first needing to obtain all of the necessary shares.

In a computation phase, the training computers 330, 340, and 350 can train a model 360 on the secret-shared data 320 without learning any information beyond the trained model. This computation phase can include multiplication of input data by weights to obtain a predicted output. Further functions may be applied, such as addition and activation functions. These functions can be performed without the secret-shared data 320 being reconstructed on any one of the training computers 330-350. Various embodiments can use multiplication triplets, garbled circuits, and/or oblivious transfer as mechanisms for performing such functions in a privacy-preserving manner. Later sections describe techniques for efficiently computing such functions in a privacy-preserving manner.

In addition to the original input data, intermediate values may be secret-shared. Such intermediate values can occur during the training and/or evaluation of the model 360. Examples of intermediate values include the output of a node in a neural network, an inner product of input values, weights prior to evaluation by a logistic function, etc. The intermediate values are sensitive because they can also reveal information about the data. Thus, every intermediate value can remain secret-shared.

C. Earlier Work on Privacy Preserving Machine Learning and Drawbacks

Earlier work on privacy preserving machine learning considered decision trees [36], k-means clustering [33], [14], support vector machine (SVM) classification [56], [54], linear regression [23], [24], [48] and logistic regression [51]. These papers propose solutions based on secure multiparty computation, but appear to incur high efficiency overheads. We will now discuss these previous methods and their drawbacks.

1. Linear Regression

Privacy-preserving linear regression in the two-server model was first considered by Nikolaenko et. al. [43] who presented a privacy preserving linear regression protocol on horizontally partitioned data using a combination of linearly homomorphic encryption (LHE) and garbled circuits; and was evaluated on datasets with millions of samples. More recent work of Gascon et. al. [27] and Giacomelli et. al. [28] extend the results to vertically partitioned data and show improved performance. However, to do so they reduce the problem to solving a linear system using either Yao's garbled circuit protocol or a LHE scheme, which introduces a high overhead on the training time and cannot be generalized to non-linear models. In contrast, embodiments of the invention may use a stochastic gradient decent (SGD) method for training which yields faster protocols and may enable training non-linear models such as logistic regression and neural networks.

Recent work of Mohassel and Zhang [41] also use the SGD for training, using a mix of arithmetic, binary, and Yao sharing in 2PC via an ABY (arithmetic, binary, Yao) framework. They also introduce a novel method for approximate fixed-point multiplication that avoids Boolean operations for truncating decimal numbers and yields state-of-the-art performance for training linear regression models. However, the above are limited to the two-server model and do not extend to the three-server model considered in this paper.

Recently, Gilad-Bachrach et. al. [30] proposed a framework for secure data exchange which supports privacy preserving linear regression. However, the framework does not scale well due to extensive use of garbled circuits.

2. Logistic Regression

Privacy preserving logistic regression is considered by Wu et. al. [55]. They propose to approximate the logistic function using polynomials and then train the model using LHE. However, the complexity of this method is exponential in the degree of the approximation polynomial, and as shown in [41], the accuracy of the model is degraded compared to simply using the logistic function.

Aono et. al. [9] considered a different security model where an untrusted server collects and combines the encrypted data from multiple clients and then transfers it to a trusted client to train the model on the plaintext. However, in this setting, the plaintext of the aggregated data is leaked to the client who trains the model.

3. Neural Networks

Privacy preserving machine learning with neural networks is more challenging. Shokri and Shmatikov [49] proposed a solution where instead of sharing the data, the two servers share the changes on a portion of the coefficients during the training. Although the system is efficient (no cryptographic operation is needed at all), the leakage of these coefficient changes is not well-understood and no formal security guarantees are obtained. In addition, each server should be able to perform the training individually in order to obtain the coefficient changes, which implies each server holds a big portion of a horizontally partitioned data in plaintext.

Privacy preserving prediction using neural networks models has also been considered in several recent works. In this setting, it is assumed that the neural network is trained on plaintext data and the model is known to one party who evaluates it on private data of another. One recent line of work uses fully homomorphic or somewhat homomorphic encryption to evaluate the model on encrypted data [29], [32], [16], [13]. Another line of work takes advantage of garbled circuits or a combination of LHE and garbled circuits to solve this problem [38], [47], [18]. Riazi et al. [44] and Liu et al. [38] each propose efficiency improvements to the ABY framework and use it for privacy preserving neural network training. However, these constructions are all based on two-party protocols and do not benefit from major speed-ups due to new 3PC techniques [10], [26], [40]. They also only provide security against a semi-honest adversary. In section IX, below, we give an explicit performance comparison to these frameworks and demonstrate that ours is significantly more efficient.

Mohassel and Zhang [41] customized the ABY framework for this purpose and propose a new approximate fixed-point multiplication protocol that avoids binary circuits, and use them to train neural network models. However, their fixed-point multiplication technique is limited to 2PC.

Chase et al. [19] considered training neural networks by using a hybrid of secure computation and differential privacy. Their technique allows for almost all of the computation to be performed locally by the parties and can, therefore, be more efficient than previous methods. This performance improvement is achieved by updating a public model via a differentially private release of information. In particular, a differentially private gradient of the current model is repeatedly revealed to the participating parties. However, this approach is limited to the case where the training data is horizontally partitioned.

The above-mentioned privacy-preserving machine learning techniques are only suitable for computation over a $\mathbb{Z}_{2^k}$ ring, i.e., the ring module $2^k$. However, in machine learning computation, both training data and intermediate parameters are decimal values that cannot be natively handled using modular arithmetic. The two most common solutions are to (i) represent decimal values as integers where the least significant bits represent the fractional part, and choose a large enough modulo to avoid a wrap around. This approach fails when performing many floating point multiplications, which is the case in standard training algorithms (e.g., stochastic gradient descent) where millions of sequential multiplications are performed. Moreover, a large modulo implies a more expensive multiplication that further reduces performance. (ii) Perform fixed-point multiplication using a Boolean multiplication circuit inside the MPC. This prevents the values from growing too large by truncating the product to a fixed number of decimal digits. Such a Boolean circuit can be evaluated using either the secret-sharing based [10] or the garbled circuit based [40] techniques, however this leads to a significant increase in either round cost or communication cost, respectively, in the solution.

Additionally, most machine learning procedures switch back and forth between arithmetic operations, such as multiplication and addition, and non-arithmetic operations such as approximate activation functions (e.g., logistic function), and polynomial piecewise functions (e.g., the rectified linear unit (ReLU)). The former is most efficiently instantiated using arithmetic secret-sharing while the latter can be implemented using either binary secret-sharing or Yao secret-sharing. Standard ways of converting between different sharing types is costly and quickly becomes a major performance bottleneck.

Addressing the above challenges efficiently is even harder in the presence of an attacker who can behave arbitrarily malicious.

II. Improvements to 3-Party Privacy Preserving Operations

Below, we describe frameworks for privacy-preserving machine learning in the three-party model in the semi-honest setting, as well as in the malicious setting. General improvements over prior methods and systems are as follows.

A challenge in using the secret-sharing protocol of Araki [10], described above, is that replicated secret-sharing does not support fixed-point multiplication and, as we show later, the truncation technique introduced in [41] for approximate fixed-point multiplication fails in the three-party setting. We design new truncation techniques in the semi-honest and malicious settings.

Other optimizations include a delayed re-share technique that can reduce round and communication complexity for vectorized operations. We also describe efficient conversions between arithmetic sharing, binary sharing, and Yao sharing. Further in the disclosure, we describe customized 3PC protocols that can evaluate polynomial piecewise functions based on a generalized three-party oblivious transfer primitive.

The frameworks and building blocks described herein may be instantiated in both the semi-honest and the malicious setting. In some cases, different techniques may be used in the malicious setting than were used in the semi-honest setting.

Experiments are performed in the semi-honest setting, which include running experiments for training linear, logistic regression and neural network models. The results of the experiments are up to 1300× faster than the two-party solution for SecureML [41], and the framework can do 5089 linear regression training iterations per second compared to 3.7 iterations by [41]. Similarly, the neural network experiment can generate a hand writing prediction in 10 milliseconds compared to the state-of-the-art Chameleon [44] protocol requiring 2700 milliseconds.

A. Approximate Fixed-Point Multiplication:

We design two new constructions for approximate fixed-point multiplication in the three-party setting. A first approach can be to switch from 2-out-of-3 replicated sharing to a 2-out-of-2 sharing between two of the three training computers, perform a truncation technique of [41], and then switch back to a 2-out-of-3 sharing. This approach is only secure against a semi-honest adversary.

A second approach can first generate an offline truncation pair, e.g., composed of shared random values $[\![ r' ]\!] \in \mathbb{Z}_{2^k}$ and $[\![ r ]\!] \in \mathbb{Z}_{2^k}$ where $r=r'/2^d$. Given such a truncation pair, the training computers can truncate a shared data item $[\![ x' ]\!]$ by first revealing $x'-r'$ to a first training computer, to a second training computer, and to a third training computer. The training computers can then jointly compute the truncation of the data item (i.e., $[\![ x ]\!] = [\![ r ]\!] + (x'-r')/2^d$), i.e., each would truncate their respective share. With high probability, x is a correct truncation of x' with at most 1 bit of error in the least significant bit. Below, we describe this approach in further detail, including how to efficiently generate the pair $[\![ r ]\!]$ and $[\![ r' ]\!]$ using a ripple-carry adder binary circuit. Many such offline truncation pairs can be generated in the same number of rounds. In some embodiments, batching techniques may be implemented to further improve performance. This approach can be made secure against malicious adversaries when the standard building blocks it uses are maliciously secure as in [26].

New approximate fixed-point multiplication protocols for shared decimal numbers can be performed at a cost close to standard secret-shared modular multiplication in both the semi-honest and the malicious case without evaluating a Boolean circuit. On our benchmark machine, as described in further detail below, the new approximate fixed-point multiplications protocols result in a 50× improvement in throughput and a 24× improvement in latency compared to an optimized Boolean circuit. These improvements can be further increased by several orders of magnitude when combined with additional optimizations as described below (see Section IX).

B. Delayed Resharing

Moreover, fixed-point multiplication can be further optimized when working with vectors and matrices. In particular, the inner product of two n-dimensional vectors can be performed using O(1) (i.e., on the order of 1) communication and a single offline truncation pair, by delaying the re-sharing and truncation until the end.

C. Converting Between Arithmetic, Binary, and Yao Sharing in a Three Party Setting:

A new framework for efficiently converting between binary sharing, arithmetic sharing [10], and Yao sharing [40] in the three-party setting can be implemented. The framework for efficiently converting between binary sharing, arithmetic sharing, and Yao sharing can extend the ABY framework [21] to the three-party setting with security against malicious adversaries. The framework is of more general interest given that several recent privacy-preserving machine learning solutions [41], [37], [44] only utilize the two-party ABY framework. Furthermore, its use cases go beyond machine learning [20]. For example, in a computation that mixes arithmetic and non-arithmetic (e.g., binary and Yao) computations. These mixed computations can be during unsupervised learning such as clustering, statistical analysis, scientific computation, solving linear systems, etc.

For training some linear regression models, arithmetic sharing (i.e., additive replicated sharing over $\mathbb{Z}_{2^k}$ where k is a large value, such as 64) may be the only necessary sharing. However, in logistic regression and neural network training, it may be necessary to perform computations using bit-level operations. A way to perform such computations is to either use binary sharing (i.e., additive sharing over $\mathbb{Z}L_2$) or Yao sharing based on three-party garbling [40]. The former can be more communication efficient, with O(n) bits communicated for a circuit with n gates, but with a number of rounds proportional to the circuit depth, while the latter can be performed in 1 or 2 rounds but at a higher communication cost. Efficient conversions between all three sharing types, with the goal of minimizing both round and communication cost, is described in further detail below. We refer to arithmetic sharing using the notation $[\![x]\!]^A$, binary sharing using the notation $[\![x]\!]^B$, and Yao sharing using the notation $[\![x]\!]^Y$.

D. 3-Party Oblivious Transfer for Polynomial Piecewise Functions:

Polynomial piecewise functions can be used in many machine learning processes. Polynomial piecewise functions can allow for the computation of a different polynomial at each input interval. Activation functions such as ReLU can be a special case of polynomial piecewise functions. Many of the proposed approximations for other non-linear functions computed during machine learning training and prediction are also polynomial piecewise functions [37], [41]. While the new ABY framework can enable efficient three-party evaluation of such functions, a more customized solution can be designed. The more customized solution can be based on an optimized construction for the following two building blocks: (i) a private data item a stored at a single training computer multiplied by a binary secret-shared data item $[\![b]\!]^B$ (i.e., $a[\![b]\!]^B = [\![ab]\!]^A$) and (ii) a arithmetic secret-shared data item $[\![a]\!]^A$ multiplied by a binary secret-shared data item $[\![b]\!]^B$ (i.e., $[\![a]\!]^A[\![b]\!]^B = [\![ab]\!]^A$), wherein the binary secret-shared data item $[\![b]\!]^B$ can be a single bit $b \in \mathbb{Z}_{2^k}$.

This mixed computation can be instantiated using a generalized three-party oblivious transfer protocol where a bit $b_i$ can be a receiver's input and an integer a can be a sender's input. A third party can be a helper, which has no input/output, but may know the receiver's input bit. New protocols for this task, as described below, with both semi-honest and malicious security can run in 1 and 2 rounds, respectively, and may require between 2 k to 4 k bits of communication, respectively.

III. Preliminaries

In this section, we describe the construction of efficient three-party protocols that can form the building blocks of our protocols for training linear regression, logistic regression, and neural network models. We also provide a general framework for performing mixed computation on shared data (i.e., an ABY framework [21] for the three-party setting).

Details of the secret-sharing based three-party secure computation techniques, arithmetic sharing, binary sharing, Yao sharing, and the security model are described in the following sections.

A. Secret-Sharing Based Three Party Secure Computation Techniques:

Throughout the framework, the default representation of encrypted data uses the replicated secret-sharing technique of Araki, et al. [10], described above, however there are some differences.

A data item $x \in \mathbb{Z}_{2^k}$ can be shared by sampling three random values $x_1, x_2, x_3 \in \mathbb{Z}_{2^k}$ such that $x = x_1 + x_2 + x_3$. These shares can be distributed as the pairs $\{(x_1, x_2), (x_2, x_3), (x_3, x_1)\}$, where each party can hold one of the pairs. Such a sharing will be denoted as $[\![x]\!]$. Sometimes, for brevity, we refer to shares of x as the tuple $(x_1, x_2, x_3)$, though we still mean the replicated secret-sharing where each party of three parties can hold a pair of shares. We will use the notation i±1 to refer to the next (+) or previous (−) party with wrap around. For example, party 3+1 can be party 1 and party 1−1 can be party 3.

Figure 4:
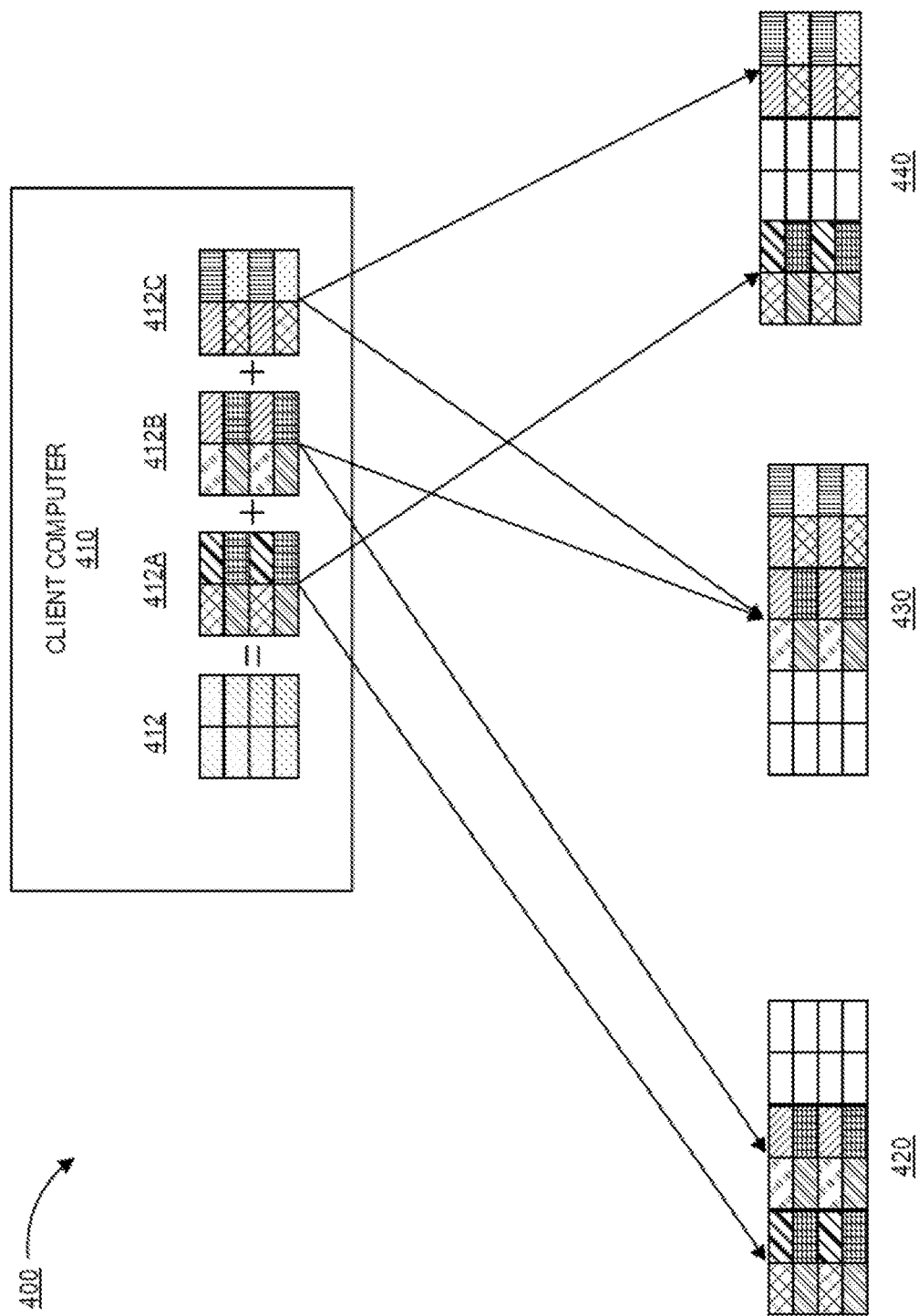
FIG. 4 shows a three-server architecture for secret-sharing data according to embodiments of the present invention.

FIG. 4 shows a three-server architecture 400 for secret-sharing data according to embodiments of the present invention. The three-server architecture 400 includes a client computer 410, a first server computer 420, a second server computer 430, and a third server computer 440. In some embodiments, there can be more than one client computer 410. In other embodiments, the server computers can be training computers.

The client computer 410 can store a private data item 412. The private data item 412 can be data which should not be publically shared. The private data item 412, for example, can relate to user profile information. The client computer 410 may want to train a machine learning model on the user profile information, along with user profile information from a second client computer (not shown). However, due to privacy concerns or data regulations, the client computers may not be able to share the user profile information. The client computer 410 can secret-share the private data item 412 such that the second client computer and the server computers cannot determine the private data item 412, thus preserving the privacy of the private data item 412.

The client computer 410 can split the private data item 412 into three shares. The private data item 412 can be split into a first share 412A, a second share 412B, and a third share 412C. The client computer 410 can transmit the first share 412A and the second share 412B to the first server computer 420. The client computer 410 can transmit the second share 412B and the third share 412C to the second server computer 430. The client computer 410 can also transmit the third share 412C and the first share 412A to the third server computer 440.

Two out of the three parties (server computers) may have sufficient information to reconstruct the private data item 412, x. For example, the first server computer 420 can store the pair $(x_1, x_2)$ and the second server computer 430 can store the pair $(x_2, x_3)$. Between the first server computer 420 and the second server computer 430 there can be sufficient information to reconstruct the actual data item $x=x_1+x_2+x_3$. This immediately implies that such a secret-sharing scheme can tolerate up to a single corruption. All of the protocols presented can achieve the same threshold.

In some embodiments, the parties can perform a reveal all protocol. To reveal a secret-shared value to all parties, party i can send $x_i$ to party i+1, and each party can reconstruct x locally by adding the three shares. In some embodiments, the parties can perform a reveal one protocol. The reveal one protocol can include revealing the secret-shared value only to a party i by party i−1 sending $x_{i-1}$ to party i who can reconstruct the data item locally.

Furthermore, arithmetic operations can be applied to these shares. To add two values $[\![x]\!]+[\![y]\!]$ all parties can define $[\![x]\!]+[\![y]\!]$ by adding together the local shares, i.e. $[\![x]\!]+[\![y]\!]=[\![x+y]\!]:=\{(x_1+y_1, x_2+y_2), (x_2+y_2, x_3+y_3), (x_3+y_3, x_1+y_1)\}$. Addition of a public constant with a shared value $c+[\![x]\!]=[\![c+x]\!]$ can also be done by defining the three shares of $[\![c+x]\!]$ as $(c+x_1, x_2, x_3)$. Subtraction can also be performed in a similar way.

To multiply a shared value $[\![x]\!]$ with a public constant c we can define the shares of $[\![cx]\!]$ as $(cx_1, cx_2, cx_3)$. Note that all of these operations can be with respect to the group $\mathbb{Z}_{2^k}$. To multiply two shared values (i.e., $[\![x]\!]*[\![y]\!]$) the parties can interactively compute $[\![xy]\!]$. First observe that $xy=(x_1+x_2+x_3)(y_1+y_2+y_3)$. Collectively, the parties can compute all such cross terms. This can be multiplied out to be:

$$= x_1y_1 + x_1y_2 + x_1y_3 + x_2y_1 + x_2y_2 + x_2y_3 + x_3y_1 + x_3y_2 + x_3y_3$$

$[\![x]\!]$ can be defined as $[\![x]\!]=[\![xy]\!]$ such that:

$z_1:=x_1y_1+x_1y_2+x_2y_1+\alpha_1,$ $z_2:=x_2y_2+x_2y_3+x_3y_2+\alpha_2,$ $z_3:=x_3y_3+x_3y_1+x_1y_3+\alpha_3.$ For example, the first party can compute $z_1$ since it holds $x_1, x_2, y_1$ and $y_2$. The second party can compute $z_2$ and the third party can compute $z_3$. In general party i can locally compute $z_i$ given its shares of $[\![x]\!]$ and $[\![y]\!]$.

After computing $z_i$, party i can send $z_i$ to party i−1. Thus, each party can end with a pair of values relating to z. For example, after computing $z_3$, the first party can send $z_3$ to the third party. Thus, the first party can end with $z_1$ and $z_2$, the second party can end with $z_2$ and $z_3$, and the third party can end with $z_3$ and $z_1$. In some embodiments, these shares can then be stored at the respective parties.

The additional terms $\alpha_1$, $\alpha_2$, and $\alpha_3$ can be used to randomize the shares of z. In some embodiments, the additional terms $\alpha_1$, $\alpha_2$, and $\alpha_3$ can be random elements of $\mathbb{Z}_{2^k}$ subject to $\alpha_1+\alpha_2+\alpha_3=0$. Each party can know exactly one of the three values. Each party can generate its share of the additional terms in such a way that its share is correlated with the shares of the other parties. For example, the three parties can generate these additional terms (i.e., $\alpha_1$, $\alpha_2$, and $\alpha_3$) using a pre-shared PRF key. Such a triple is referred to as a zero sharing and can be computed without any interaction after a one time setup, see [10].

As an example use of randomizing, a party i can hold a private data item x. If party i wishes to construct a sharing of its private data item x, the three parties can first generate a zero sharing $\alpha_1$, $\alpha_2$ and $\alpha_3$. The shares of $[\![x]\!]$ are then defined as $(x_1, x_2, x_3):=(\alpha_1+x, \alpha_2, \alpha_3)$. The sharing of x can be completed by party i sending the share $x_1$ to party i−1. For example, the first party can send $x_1=\alpha_1+x$ to the third party. The second party can send $x_2=\alpha_2$ to the first party. The third party can send $x_3=\alpha_3$ to the second party. In the case of a malicious adversary, additional care can be taken to ensure these operations are performed correctly. For more details on these we refer to [26].

FIG. 5 shows round and communication cost of various protocols for the malicious and semi-honest settings. A round may be a number of messages sent/received. A communication may be a number of bits exchanged, wherein the ring is $\mathbb{Z}_{2^k}$. The protocols in FIG. 5 include "add," "mult," "zero share," "rand," "reveal all," "reveal one," and "input," which are described above.

In both the malicious setting and the semi-honest setting, the "add" protocol may be performed with zero communications between parties and in zero rounds. The "mult" protocol may be performed with 4 k communications in one round in the malicious setting. In the semi-honest setting, the "mult" protocol may be performed with 11 k communications in 1 round.

In both the malicious setting and the semi-honest setting, the "zero share" protocol may be performed with zero communications between parties and in zero rounds. Similarly, the "rand" protocol may be performed with zero communications between parties and in zero rounds in both the malicious setting and the semi-honest setting.

The "reveal all" protocol may be performed in three communications between parties and in one round in the malicious setting. In the semi-honest setting, the "reveal all" protocol may be performed in six communications and in one round. The "reveal one" protocol may be performed in one communication and in one round in the malicious setting. In the semi-honest setting, the "reveal one" protocol may be performed in two communications between parties and in one round. In both the malicious setting and the semi-honest setting, the "input" protocol may be performed in three communications and in one round.

B. Arithmetic Vs. Binary Sharing:

Some embodiments can make use of two different versions of each of the above protocols. The first may correspond to the case of k=64 or some suitably large value that may support traditional arithmetic operations such as +, −, and *. We refer to this as arithmetic sharing and use the notation $[\![x]\!]^A$. The latter case may be for k=1, which can support binary operations, where the binary operations $\oplus$ and $\wedge$ can correspond to + and *. The advantage of a binary representation is that it can be more flexible and efficient when computing functions that cannot easily be framed in terms of modular addition and multiplication. We refer to this as binary sharing and use the notation $[\![x]\!]^B$.

C. Yao Sharing:

In general, Yao sharing may use garbled circuits to secret-share the private data items between training computers. A garbled circuit is a cryptographic protocol that enables parties to jointly evaluate a function over their private inputs. Next, we review Yao sharing in the two-party setting as well as in the three-party setting.

1. Yao Sharing in the Two-Party Setting:

In the two-party setting, Yao's garbled circuit protocol allows a first party (called a garbler) to encode a Boolean function into a garbled circuit that can be evaluated by a second party (called the evaluator). The garbling scheme first assigns two random keys $k_w^0$, and $k_w^1$ to each wire w in the circuit corresponding to values 0 and 1 for that wire. Each gate in the circuit can then be garbled by encrypting each output wire key using different combinations (according to the truth table for that gate) of input wire keys as encryption keys. The ciphertexts may be randomly permutated so their position does not leak real values of the intermediate wires during the evaluation. The evaluator can obtain the keys corresponding to input wires to the circuit which may enable the evaluator to decrypt one ciphertext in each gabled gate and learn the corresponding output wire key. The evaluator can decode the final output and may give a translation table that maps the circuit's final output wire keys to their real values.

Various optimizations to this basic garbling idea have been introduced over the years, the most notable of which are the point-and-permute [12], Free-XOR [34] and the half-gate [57] techniques.

However, these optimizations require some modifications to how the keys are generated. For example, the Free-XOR techniques may require that a second random key is equal to the first random key XORed with a global random string (i.e., $k_w^1 = k_w^0 \oplus \Delta$) for every wire w, where $\Delta$ may be the global random string. The global random sting $\Delta$ may be kept secret.

To use the point-and-permute technique, we can let the least significant bit of $\Delta$ be 1 (i.e., $\Delta[0]=1$). The least significant bit of each key ($p_w \oplus i = k_w^i[0]$) can be referred to as the permutation bit. As discussed in the two-party ABY framework [21], two-party Yao's sharing of an input bit x for wire w, can be seen as one party holding $k_w^0$ and $\Delta$, while the other party holds $k_w^x$.

2. Yao Sharing in the Three-Party Setting:

Mohassel et al. [40], extend Yao's garbled circuit protocol to the three-party setting with one corruption, and obtain security against a malicious adversary with a cost comparable to that of the semi-honest two-party Yao's protocol. The high level idea is as follows. A first party may play a role of the evaluator. A second party and a third party may play a role of the garblers. The two garblers may exchange a random seed that is used to generate all the randomness and keys for the garbled circuit. They may separately generate the garbled circuit and may send their copy to the evaluator. Since at least one garbler is honest, one of the garbled circuits is computed honestly. The evaluator can enforce honest garbling behavior by checking equality of the garbled circuits and aborting if the check fails.

Yao sharing in the three-party setting, denoted by $[\![x]\!]^Y$, can be seen as the evaluator holding $k_w^x$ and the two garblers each holding $k_w^0$ and $\Delta$. In the semi-honest case, a garbler may share its input bit x by sending $k_w^0 \oplus x\Delta$ to the evaluator. In the malicious case, both garblers may send commitments to both keys (i.e., $\text{Comm}(k_w^b)$ and $\text{Comm}(k_w^{\neg b})$) to the evaluator. Both keys may be permuted. The garbler that is sharing its input may send the opening for one of the commitments. The evaluator may then check that the two pairs of commitments are equal (the same randomness is used to generate and permute them), and that the opening succeeds.

In some embodiments, the evaluator may share its input by performing an oblivious transfer with one of the garblers to obtain one of the two keys. Mohassel et al. [40] remove the need for OT by augmenting the circuit such that each input wire corresponding to evaluator is split into two input bits that XOR share the original input. The circuit may first XOR these two bits (for free) and then may compute the expected function. The evaluator may share its input bit x by generating two random bits $x_2$ and $x_3$ where $x = x_2 \oplus x_3$ and then sending $x_i$ to party i. The party i can then share $x_i$ as it would share its own input, except that there is no need to permute the commitments since party 1 knows the $x_i$s.

As an example of Yao sharing in a three party setting, a first training computer (the evaluator) can hold $k_X^x$ while the other two parties, i.e., a second training computer and a third training computer, can hold $k_X^0 \in \{0,1\}^K$ and a global random value $\Delta \in \{0,1\}^K$ such that $k_X^1 := k_X^0 \oplus \Delta$. A useful primitive for conversions to and from Yao shares is the ability for two parties to provide an input that is known to both of them. For example, the first training computer and the second training computer may hold a bit x and determine to generate a sharing of $[\![x]\!]^Y$. In the semi-honest setting, the second training computer can locally generate $[\![x]\!]^Y$ and then send $[\![x]\!]^Y$ to the first training computer. The first training computer may then use $[\![x]\!]^Y$ to evaluate a garbled circuit.

However, in a malicious setting, the first training computer may verify that $[\![x]\!]^Y$ actually encodes x without learning $\Delta$. In the current example, the third training computer can be used to allow the first training computer to check the correctness of the sharing by having the first training computer and the second training computer send $\text{Comm}(k_X^0)$ and $\text{Comm}(k_X^1)$ generated using the same randomness shared between them. In some embodiments, the second training computer can send a hash of the commitments. The first training computer may verify that both parties sent the same commitments and that $\text{Comm}(k_X^x)$ decommits to $k_X^x$. This interaction may take two commitments, one decommitment, and at most one round. In the case that x is known to the first training computer and the third training computer, the roles of the second training computer and the third training computer above can simply be reversed.

When sharing many input bits (n>>$\lambda$, for a statistical security parameter $\lambda$), we show that the number of commitments can be capped at 2$\lambda$. After receiving the input labels $k_{X_1}^{x_1}, \ldots, k_{X_n}^{x_n}$ (without commitments) and before revealing any secret values which are dependent on these input labels, the first training computer may compute $\lambda$ random linear combinations $k_{C_1}^{c_1}, \ldots, k_{C\lambda}^{c_\lambda}$ of $k_{X_1}^{x_1}, \ldots, k_{X_n}^{x_n}$ in $(\mathbb{Z}_2)^\lambda$ with coefficients in $\mathbb{Z}_2$. The second training computer and the third training computer may receive the combinations from the first training computer. After receiving the combinations, the second training computer and the third training computer may both compute the $\lambda$ combinations of $k_{X_1}^{0_1}, \ldots, k_{X_n}^{0_n}$ to obtain $k_{C_1}^0, \ldots k_{C_\lambda}^0$. Using the same randomness, the second training computer and the third training computer may send $\text{Comm}(k_{C_i}^0)$ and $\text{Comm}(k_{C_i}^1 = \text{gcLabel0}c_i \oplus \Delta)$ for $i \in \{1, \ldots, \lambda\}$ to the first training computer. In some embodiments, one of the second training computer and the third training computer can send a hash of the commitments instead.

After receiving the commitments, the first training computer may then verify that the two sets of commitment are the same. The first training computer may determine whether or not $\text{Comm}(k_{C_j}^{c_i})$ decommits to $k_{C_j}^{c_i}$ for all i. The probability that the first training computer received an incorrect label, determined that the two sets of commitments match, determined that $\text{Comm}(k_{C_j}^{c_i})$ decommits to $k_{C_j}^{c_i}$ for all i and is $2^{-\lambda}$. For example, consider a case wherein one of the garblers (e.g., the second training computer) sends an incorrect input label to the first training computer. For the ith linear combination pass, either this input label should not be in the sum (happens with Pr. ½) or was canceled out by another incorrect label $\ell$. Fixing all previous labels, the probability that $\ell$ is included in the sum is ½. We therefore have that cheating is caught with probability $1-2^{-\lambda}$ and set $\lambda$ to be the statistical security parameter to ensure that cheating is undetected negligible probability.

In some embodiments, where the second training computer and the third training computer both know x, it is possible to generate $[\![x]\!]^Y$ with no communication using a shared (among all three training computers) source of randomness. For example, all three training computers may locally sample $k_X^x \leftarrow \{0,1\}^K$. The second training computer and the third training computer can then define $k_X^0 := k_X^x \oplus (x\Delta)$.

D. Security Model

A similar security model and architecture as SecureML [41] is used, except that we extend it to the three party case with an honest majority and consider both semi-honest and malicious adversaries. In particular, data owners (clients) secret-share their data among three servers (training computers) who perform 3PC to train and evaluate models on the joint data. We observe that security in this model can reduce to standard security definitions for 3PC. Hence, we follow the same security definitions and refer to [10] and [26] for a formal description of these adversarial settings. Since all our building blocks are reduced to the composition of existing 3PC building blocks, their security is implied via standard composition theorems [15].

IV. Fixed-Point Arithmetic

Fixed-point arithmetic is needed during computations in the machine learning processes (e.g., linear regression). Since computation times can greatly increase when values become large, through multiplication and other operations, it is advantageous to truncate the values. However, applying the truncation method used in the two-party setting to the three-party setting fails.

A fixed-point value can be defined as a k bit integer using two's complement representation where the bottom d bits denote a decimal, i.e. a bit i denotes the (i-d)th power of 2. For example, a decimal value of 2 can be written as 0010, whereas a decimal value of 4 can be written as 0100. Addition and subtraction can be performed using the corresponding integer operation since the results are expected to remain below $2^k$. Multiplication can also be performed in the same manner, but the number of decimal bits doubles and hence can be divided by $2^d$ to maintain the d decimal bit invariant.

Fixed-point arithmetic in both the two-party setting and the three-party setting is described below. We then introduce share truncation in the semi-honest setting and in the malicious setting.

A. Two-Party Fixed-Point Arithmetic:

Next we review two-party fixed-point arithmetic as described in [41]. The technique described therein describes secret-shares of a fixed-point x using the ring modulo $\mathbb{Z}_{2^k}$ as $[\![x]\!] := (x+r, -r)$, for some secret $r \leftarrow [\![\cdot]\!]_{2^k}$. Addition and subtraction in $\mathbb{Z}_{2^k}$ may naturally work, but multiplication, due to a division by $2^d$ not being supported in $\mathbb{Z}_{2^k}$, may not work. Consider having a sharing $[\![x']\!] := [\![y]\!][\![z]\!]$ over $\mathbb{Z}_{2^k}$ and desire to compute $[\![x]\!]$, wherein $[\![x]\!]$ is the truncation of $[\![x']\!]$ (i.e., $[\![x]\!] := [\![x'/2^d]\!]$). When x, y, and z are interpreted as fixed-point values, the quantity x=yz is true, assuming semantic values do not overflow.

Ideally, both shares of $[\![x']\!] = (x'+r', -r')$ can be locally divided by $2^d$ to obtain two k-bit shares $$[\![\tilde{x}]\!] := \left(\frac{x_1'}{2^d}, \frac{x_2'}{2^d}\right)$$

while holding the value $x=\tilde{x}=x'/2^d$. However, this final equality of $x=\tilde{x}$ does not always hold. First, there may be a bad event during the division by $2^d$, where the division may remove a carry bit from the first d bits that would have propagated into the d+1th bit. In other words, at bit position d of the addition $x'_1+x'_2=(x'+r')+(-r') \mod 2^k$ a carry may be generated (which we have eliminated due to separately dividing each share by $2^d$). However, this probabilistic error has a magnitude of $2^{-d}$ and is arguably acceptable given that fixed-point arithmetic naturally has limited precision.

Unfortunately, a more serious error can also be introduced due to the values being shared in the ring modulo $2^k$ combined with the use of two's compliment semantics. In particular, the desired computation of $x'/2^d$ is with respect to two's complement semantics (i.e., shift the bits of x' down by d positions and fill the top d bits with the most significant bit (MSB) of x'). The latter step can fail when x' is secret-shared in $\mathbb{Z}_{2^k}$. For example, $x'=-2^{k-1}$ which is represented in binary two's complement as 100 . . . 000. We then have that $x'/2^d$ is represented as 1 . . . 100 . . . 000 where there are d+1 leading ones. However, when secret-shared, it is likely that both shares $x'_1$ and $x'_2$ have zero in the most significant bit (MSB). As a result, when they are divided by $2^d$, the two shares will have at least d+1 leading zeros. When these shares are reconstructed the result will be incorrect.

A simple case analysis shows that a necessary condition for this error is that the MSB of x' is opposite of both $x'_1$ and $x'_2$. That is, the reverse of the example above can also result in this large error. In the reversed case, $x'_1$ and $x'_2$ can both have a MSB of one which overflows and is eliminated. However, after being sign extended/divided by 2', the carry results in 1+1+1 in all higher positions, resulting in the d most significant bits being incorrectly set to one, since by assumption the MSB of x' is zero. A fix to this problem is to maintain that $|x'|<2^\ell <<2^k$ where x' is interpreted as a two's complement integer. This ensures that there is a negligible probability that the MSB of $x'_1$ is the same as $x'_2$. As an example, observe that $x'_1:=x'+r'$ and $x'_2=r'$ when $r'\neq 0$ the sign/MSB of r' and -r' are always opposite. When x' is positive, the probability of $x'_1$ having the same MSB as $x'_2$ is the probability that the top $k-\ell$ bits of r' are all ones and that a carry is generated at the $\ell$ th bit of x'+r'. Due to r' being uniformly distributed, the probability that r' has this many leading ones is $2^{\ell-k}$ which can be made very small for appropriately chosen $\ell$ and k. A similar argument also holds when x' is negative.

B. Multi-Party Fixed-Point Arithmetic:

The truncation method used in the two-party setting does not extend to the three-party setting, where a secret-shared data item is represented as $[\![x]\!]=(x+r_1+r_2, (-r_1), (-r_2))$. The first source of error in the two-party system, described above, may now, in the three-party setting, have magnitude $2^{-d+1}$ due to the possibility of truncating two carry bits. However, a more serious issue that arises is that bounding $|x|<2^{\ell}$ no longer ensures that the large error happens with very small probability. The necessary condition for this error is more complex due to the possibility of two carry bits, but intuitively, bounding $|x|<2^{\ell}$ no longer ensures that exactly one of the shares $x_1$, $x_2$, and $x_3$ will be correctly sign-extended due to $r_1$ and $r_2$ both being uniformly distributed and independent.

There are two efficient solutions for using truncation in the three-party setting that yield approximate fixed-point multiplication on shared values for roughly the same cost as standard integer multiplication. These two new methods for performing three-party multiplication/truncation are described in detail below. The first technique can be performed in the semi-honest setting, while the second technique can be performed in the malicious setting. While presented in terms of three parties, we note that the second technique, can be extended to settings with more than three parties.

C. Share Truncation in the Semi-Honest Setting:

We propose an effective method to support three-party fixed-point arithmetic in the semi-honest setting. This method can minimize the overall communication at the expense of performing multiplication and truncation in two rounds. The method can include performing a two-party protocol between two of the three parties, wherein one of the three parties does not participate. Since we assume an honest majority, the security still holds in the semi-honest setting.

Figure 6:
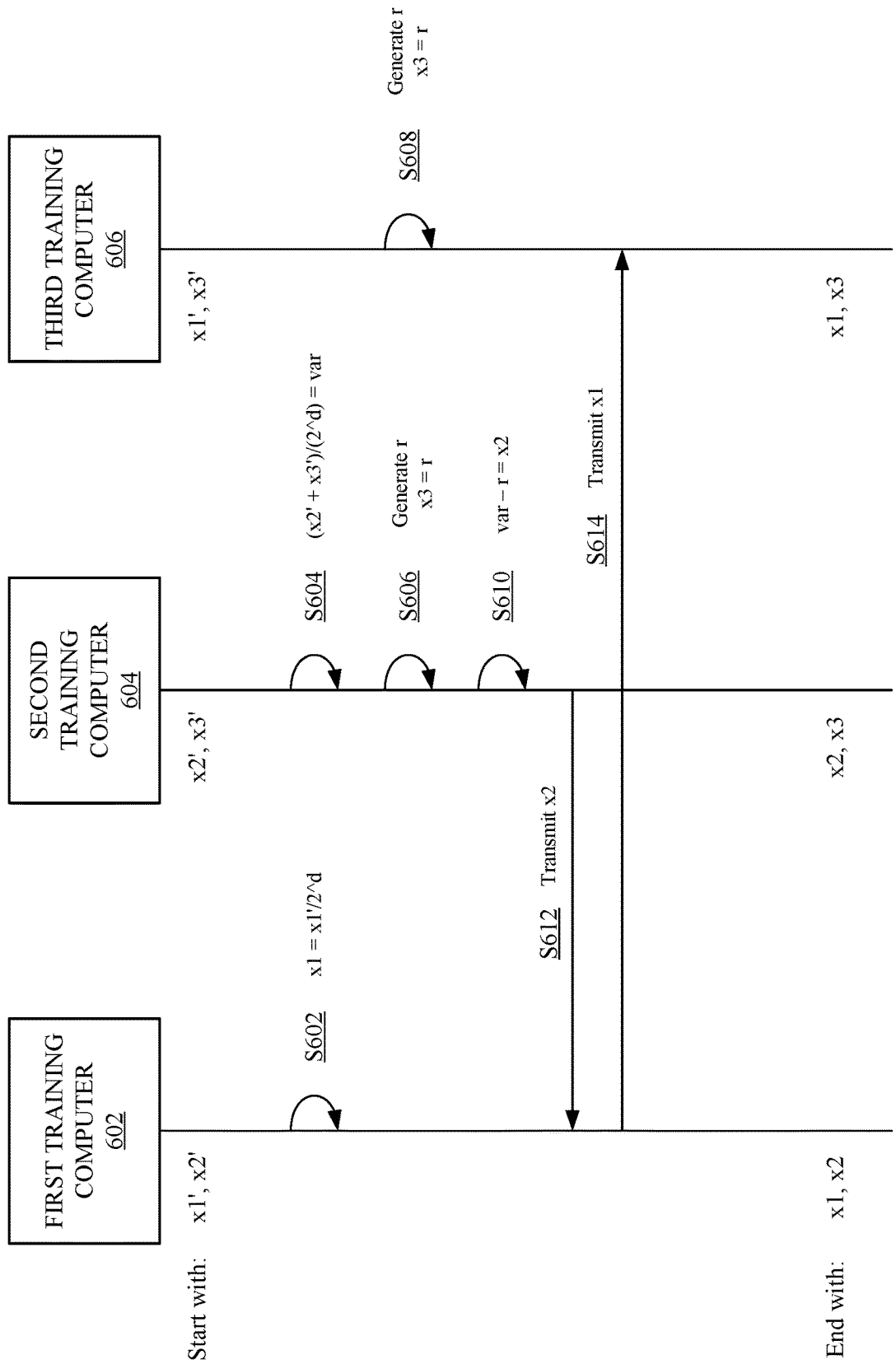
FIG. 6 shows a method of performing truncation during privacy-preserving machine learning in a semi-honest setting according to an embodiment of the invention.

FIG. 6 shows a method of performing truncation during privacy-preserving machine learning in a semi-honest setting according to an embodiment of the invention. The method illustrated in FIG. 6 will be described in the context of truncating a result of multiplications as part of training a machine learning model to determine weights. It is understood, however, that embodiments can be applied to other circumstances (e.g., truncating other values, etc.). Although the steps are illustrated in a specific order, it is understood that embodiments of the invention may include methods that have the steps in different orders. In addition, steps may be omitted or added and may still be within embodiments of the invention. FIG. 6 includes a first training computer 602, a second training computer 604, and a third training computer 606.

The three training computers can store secret-shared private data from a plurality of data clients. Each data item of the secret-shared private data can be represented by three parts when secret-shared. In some embodiments, the secret-shared private data can include a set of training samples, each training sample having d features and an output Y. The first training computer 602, the second training computer 604, and the third training computer 606 can perform multiplication as a part of training a machine learning model to determine weights. The result of the multiplication can be truncated. For example, the three training computers can truncate a result of a multiplication of a secret-shared feature and a secret-shared weight as part of training a machine leaning model. The result can comprise a first share, a second share, and a third share of a secret-shared data item. In some embodiments, the three training computers can multiply matrix-vectors X and Y such that half of the multiplications are done locally, and wherein each server shares a final result $Z_i$ with N communications, as described herein.

The training computers can hold a 2-out-of-3 sharing of $[\![x']\!]$, wherein $[\![x']\!]:=[\![y]\!] [\![z]\!]$ over the ring $\mathbb{Z}_{2^k}$. The training computers may desire to compute the truncation of a product of $[\![y]\!]$ multiplied by $[\![z]\!]$ (i.e., $$[\![x]\!] = \frac{[\![x']\!]}{2^d} = \frac{[\![y]\!][\![z]\!]}{2^d}).$$

As in the two party case, we assume that $x'<<2^k$. The first training computer 602 can hold $x'_1$ and $x'_2$, the second training computer 604 can hold $x'_2$ and $x'_3$, and the third training computer 606 can hold $x'_3$ and $x'_1$.

The training computers may begin by defining a 2-out-of-2 sharing between the first training computer 602 and the second training computer 604. The 2-out-of-2 sharing can be $(x'_1, x'_2+x'_3)$, wherein the first training computer 602 holds $x'_1$ and the second training computer 604 holds $x'_2+x'_3$.

At step S602, the first training computer 602 can truncate the first data share $x'_1$ by dividing the first share $x'_1$ by $2^d$ (i.e., $x_1=x'_1/2^d$), resulting in a truncated first share $x_1$. The first training computer 602 can perform the truncation of $x'_1$ locally.

At step S604, the second training computer 604 can compute a truncation of the sum of the second share $x'_2$ and the third share $x'_3$ (i.e., $(x'_2+x'_3)/2^d$). The second training computer 604 can perform the truncation of $x'_2+x'_3$ locally. The errors introduced by the division of $2^d$ mirror that of the two-party case and can guarantee the same correctness. The result of the truncation of the sum of the second share $x'_2$ and the third share $x'_3$ can be referred to as an intermediate value (also referred to as var in FIG. 6).

At steps S606 and S608, the second training computer 604 and the third training computer 606 can generate a random value r by invoking a pseudorandom function $F_K(\ )$, where F represents a pseudorandom function (PRF) and K is a secret key for the PRF. In some embodiments, the pseudorandom function can be instantiated using a block-cipher, such as AES. The secret key K for the PRF can be shared between the second training computer 604 and the third training computer 606, which may allow the second training computer 604 and the third training computer 606 to generate the same randomness independently, while the randomness is hidden from anyone who does not know the secret key K. The second training computer 604 and the third training computer 606 can set the random value r equal to a truncated third share $x_3$. In some embodiments, the second training computer 604 and the third training computer 606 can store the truncated third share $x_3$.

At step S610, after generating the random value r, the second training computer 604 can then subtract the random value r from the intermediate value $(x'_2+x'_3)/2^d$. In other words, the second training computer 604 can subtract the random value r from the truncation of the sum of the second share and the third share (i.e., $$\frac{x'_2+x'_3}{2^d}-r).$$

The second training computer 604 can then set $$\frac{x'_2 + x'_3}{2^d} - r$$

equal to a truncated second share $x_2$.

At step S612, after determining the truncated second share $x_2$, the second training computer 604 can transmit the truncated second share $x_2$ to the first training computer 602. After receiving the truncated second share $x_2$, the first training computer 602 can hold the truncated first share $x_1$ and the truncated second share $x_2$. In some embodiments, the training computers can determine to which training computer to transmit a share, or a truncated share. For example, a training computer i can store instructions indicating its shares and truncated shares can be transmitted to training computer i−1.

At step S614, after receiving the truncated second share $x_2$, the first training computer 602 can transmit the truncated first share $x_1$ to the third training computer 606. After receiving the truncated first share $x_1$, the third training computer can hold the truncated first share $x_1$ and the truncated third share $x_3$. In some embodiments, the third training computer 606 can compute the truncated first data share by truncating the first data share by $2^d$ (i.e., $[\![x_1]\!] = [\![x'_1/2^d]\!]$).

The result, i.e. the truncated data item, can be defined as $[\![x]\!] := (x_1, x_2, x_3) = (x'_1/2^d, (x'_2+x'_3)/2^d - r, r)$, where $r \in \mathbb{Z}_{2^k}$ is the random value known to the second training computer 604 and the third training computer 606. Now, the first training computer 602 can hold $x_1$ and $x_2$, the second training computer 604 can hold $x_2$ and $x_3$, and the third training computer 606 can hold $x_3$ and $x_1$. In some embodiments, training computer i can locally compute a share $x_i$ and therefore $[\![x]\!]$ can be made a 2-out-of-3 sharing by transmitting $x_i$ to party i−1. In this approach two rounds can be used to multiply and truncate.

Figure 7:
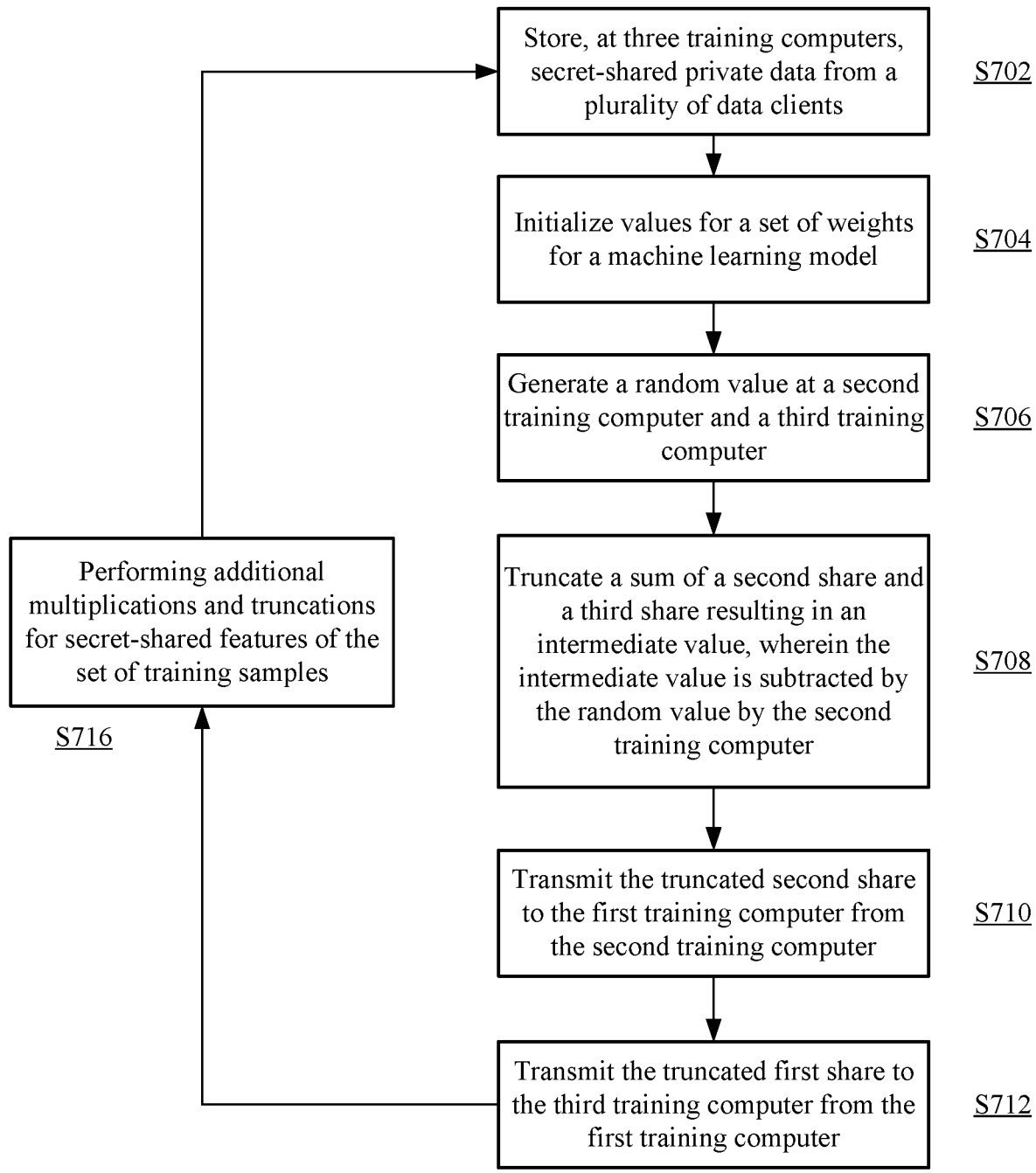
FIG. 7 shows a flowchart of performing truncation during privacy-preserving machine learning in a semi-honest setting according to an embodiment of the invention.

FIG. 7 shows a flowchart of performing truncation during privacy-preserving machine learning in a semi-honest setting according to an embodiment of the invention. The method illustrated in FIG. 7 will be described in the context of truncating a result of multiplications as part of training a machine learning model to determine weights. It is understood, however, that embodiments of the invention can be applied to other circumstances (e.g., truncating other values, etc.). Although the steps are illustrated in a specific order, it is understood that embodiments of the invention may include methods that have the steps in different orders. In addition, steps may be omitted or added and may still be within embodiments of the invention. In some embodiments, the machine learning model may use linear regression, logistic regression, or neural network techniques.

Before step S702, a plurality of data clients can send shares of private data items to three training computers. The private data items can be secret-shared among the three training computers using any suitable method described herein. At step S702, the three training computers can store secret-shared data items from the plurality of data clients. Each data item of the secret-shared private data can be represented by three parts when secret-shared. The secret-shared private data can include a set of training samples, each training sample having d features and an output Y.

At step S704, the three training computers can initialize values for a set of weights for a machine learning model. The weights can be secret-shared among the three training computers. The weights and the features can be stored as integers. The three training computers can determine a result of multiplications as part of training a machine learning model to determine weights. In some embodiments, the machine learning model can include more weights than the set of weights. The result of the multiplications may be a data item that is secret-shared among the three training computers. In some embodiments, the multiplication may be the multiplication of two data items that are both secret-shared among the three training computers (e.g., $[\![x']\!] := [\![y]\!][\![z]\!]$). The result of the multiplications can be secret-shared such that the first training computer can store a first share and a second share, the second training computer can store the second share and a third share, and the third training computer can store the third share and the first share. The three training computers can truncate the result of the multiplications by performing the following steps.

At step S706, the second training computer and the third training computer can generate a random value. The second training computer and the third training computer can both store a pseudorandom function and a secret key. The second training computer and the third training computer can generate the random value using the pseudorandom function and the secret key. The same random value may be generated at both the second training computer and the third training computer. In some embodiments, the second training computer and the third training computer can generate many random values prior to truncation. For example, the second training computer can store pre-generated random values in a memory. The third training computer can also store pre-generated random values in a memory. In some embodiments, the second training computer and the third training computer can both determine that the random value is a truncated third share.

At step S708, after generating the random value, the second training computer can truncate a sum of the second share and the third share, resulting in a value. The second computer can then subtract the random value from the value, resulting in a truncated second share. The second training computer can now hold the truncated second share and the truncated third share. The first training computer can hold the truncated first share. The third training computer can hold the truncated third share.

At step S710, after determining the truncated second share, the second training computer can transmit the truncated second share to the first training computer. The first training computer can now hold the truncated first share and the truncated second share.

At step S712, after receiving the truncated second share, the first training computer can truncate the first share of the data item, resulting in a truncated first share. For example, the first share of the data item may have a value of 5.25. The first training computer can truncate the first share of 5.25 to be the truncated first share of 5. After truncating the first share, the first training computer can transmit the truncated first share to the third training computer. The third training computer can receive the truncated first share from the first training computer and can then hold the truncated first share and the truncated third share. In some embodiments, the first training computer can determine and transmit the truncated first share to the third training computer after step S704.

At step S716, the training computers can perform additional multiplications and truncations for secret-shared features of the set of training samples and secret-shared weights to train a machine learning model for predicting the outputs Y of the set of training samples. For example, during training of a neural network, the three training computers can determine the weights for each node in the neural network and then determine the total error of the neural network.

D. Share Truncation in the Malicious Setting:

A second solution to share truncation can occur in the malicious setting. In this solution, the number of multiplication rounds can be reduced back to 1 with a more sophisticated technique which can leverage preprocessing. FIG. 8 shows a method of performing truncation during privacy-preserving machine learning in the malicious setting according to an embodiment of the invention. The method illustrated in FIG. 8 will be described in the context of truncating a result of multiplications as part of training a machine learning model to determine weights. It is understood, however, that embodiments of the invention can be applied to other circumstances (e.g., truncating other values, etc.). Although the steps are illustrated in a specific order, it is understood that embodiments of the invention may include methods that have the steps in different orders. In addition, steps may be omitted or added and may still be within embodiments of the invention.

FIG. 8 can be described in reference to three training computers comprising a first training computer, a second training computer, and a third training computer. The three training computers can store secret-shared private data from a plurality of data clients. Each data item of the secret-shared private data can be represented by three parts when secret-shared. The secret-shared private data can include a set of training samples. Each of the training samples can have features and an output.

The secret-shared private data, as an example, can consist of a first data item y and a second data item z. The secret-shared private data can be shared among the three training computers such that the first training computer stores $y_1$, $y_2$, $z_1$, and $z_2$, the second training computer stores $y_2$, $y_3$, $z_2$, and $z_3$, and the third training computer stores $y_3$, $y_1$, $z_3$, and $z_1$. However, it is understood that any number of other data items can be included in the secret-shared private data and can be secret-shared in any of the methods described herein.

The training computers can compute a secret-shared value $[\![x']\!]$ over the ring $\mathbb{Z}_{2^k}$, wherein $[\![x']\!]=[\![y]\!][\![z]\!]$. The training computers can multiply the first data item y and the second data item z as described above. As a result of the multiplication protocol, the first training computer can hold $x'_1$ and $x'_2$, the second training computer can hold $x'_2$ and $x'_3$, and the third training computer can hold $x'_3$ and $x'_1$. The training computers can now proceed to truncate a result of multiplication as part of training a machine learning model to determine weights $[\![x']\!]$ (i.e., divide it by $2^d$).

First, let us assume we have preprocessed the shares $[\![r']\!]$ and $[\![r]\!]$, wherein $[\![r]\!]$ is a truncation of $[\![r']\!]$ (i.e., $[\![r]\!]=[\![r'/2^d]\!]$). The value of r' may be $r'\in\mathbb{Z}_{2^k}$ and may be random. In some embodiments, $[\![r']\!]$ and $[\![r]\!]$ may be arithmetically shared (i.e., $[\![r']\!]^A$ and $[\![r]\!]^A$). The preprocessing steps S802-S810 describe the generation of the shares $[\![r']\!]$ and $[\![r]\!]$ and are described in detail below, but first, we will describe the online steps.

1. Online

At step S812, the three training computers can jointly compute the data item x' minus the random value r' (i.e., $[\![x'-r']\!]^A$). For example, the first training computer can compute $x'_1-r'_1$ and $x'_2-r'_2$, the second training computer can compute $x'_2$ $r'_2$ and $x'_3-r'_3$, and the third training computer can compute $x'_3-r'_3$ and $x'_1-r'_1$. In some embodiments, the data item x' can be a result of the multiplication and a share of the result can be a result share. Each of the three training computers can compute a respective result share minus the random arithmetic share resulting in intermediate shares of an intermediate value.

The three training computers can then perform the above mentioned "reveal all" protocol (i.e., $(x'-r')$:=Reveal All($[\![x'-r']\!]^A$). The reveal all protocol can result in each of the three training computers receiving the intermediate value x'-r'. For example, the first training computer can transmit $x'_1-r'_1$ to the second training computer. The second training computer can transmit $x'_2-r'_2$ to the third training computer. The third training computer can transmit $x'_3-r'_3$ to the first training computer.

In some embodiments, the "reveal all" protocol can be performed as the following: the first training computer can transmit $x'_2-r'_2$ to the third training computer. The second training computer can transmit $x'_3-r'_3$ to the first training computer. The third training computer can transmit $x'_1-r'_1$ to the second training computer.

In other embodiments, the shares of $[\![x'-r']\!]$ can be revealed to two of the three training computers; which two training computers can be predetermined. For example, the first training computer can transmit $x'_1-r'_1$ to the second training computer and the second training computer can transmit $x'_3-r'_3$ to the first training computer. In this way, the first training computer and the second training computer can both hold three of the three values of $[\![x'-r']\!]$, while the third training computer holds two of the three shares of x'-r'.

At step S814, after performing the "reveal all" protocol, the three training computers can locally compute $(x'-r')/2^d$. For example, the first training computer, which holds $x'_1-r'_1$, $x'_2-r'_2$, and $x'_3-r'_3$, can compute $(x'-r')=(x'_1-r'_1)+(x'_2-r'_2)+(x'_3-r'_3)$. The first training computer can then truncate $(x'-r')$ by $2^d$. The second training computer and the third training computer can also compute $(x'-r')/2^d$ in similar manners in embodiments where all three training computers have all shares of $[\![x'-r']\!]$.

After determining $(x'-r')/2^d$, the three training computers can then collectively compute the truncated data item $[\![\tilde{x}]\!]$ (i.e., $[\![\tilde{x}]\!]:=(x'-r')/2^d+[\![r]\!]$). For example, the first training computer can compute $\tilde{x}_1=(x'-r')/2^d+r_1$ and $\tilde{x}_2:=(x'-r')/2^d+r_2$. The second training computer can compute $\tilde{x}_2:=(x'-r')/2^d+r_2$ and $\tilde{x}_3:=(x'-r')/2^d+r_3$. The third training computer can compute $\tilde{x}_3:=(x'-r')/2^d+r_3$ and $\tilde{x}_1=(x'-r')/2^d+r_1$. After computing the truncated data item $[\![\tilde{x}]\!]$, the first training computer can hold $\tilde{x}_1$ and $\tilde{x}_2$, the second training computer can hold $\tilde{x}_2$ and $\tilde{x}_3$, and the third training computer can hold $\tilde{x}_3$ and $\tilde{x}_1$.

This computation can emulate the two-party truncation scenario, therefore the maximum error between $[\![\tilde{x}]\!]$ and $x=yz/2^d$ will be at most $2^{-d}$ with probability $1-2^{-k+\ell}$, which is overwhelming for correctly chosen k and $\ell$ where $x-\mathbb{Z}_{2^\ell}$. Therefore, with high probability, $[\![\tilde{x}]\!]==[\![x]\!]$.

In some embodiments, the above operations can be combined with the computation of $[\![x']\!]:=[\![y]\!][\![z']\!]$ and can be performed in a single round. First, recall that standard share multiplication can be performed in two steps: 1) locally compute a 3-out-of-3 sharing of $[\![x']\!]$ and 2) reshare it as a 2-out-of-3 sharing. Between steps 1 and 2, the training computers can compute a 3-out-of-3 sharing of $[\![x'-r']\!]$. Step 2 can then be replaced by revealing $[\![x'-r']\!]$ and defining $[\![x]\!]:=(x'-r')/2^d+[\![r]\!]$. The multiplication and truncation can be done in one round and the required communication may be 4 messages as opposed to 3 in standard multiplication.

2. Preprocessing

Preprocessing steps can occur before steps S812-S814. The preprocessing steps can result in a preprocessed truncation pair. There are several ways to compute the pair $[\![r']\!]^A$ and $[\![r]\!]^A = [\![r'/2^d]\!]^A$, wherein $[\![r']\!]^A$ can be a shared random value and $[\![r']\!]^A$ can be a truncated shared random value. The most immediate approach could be to use techniques of the previously described truncation method, but it is not easily implementable since the assumption that $r' < 2^\ell$ may no longer hold. This is because r can be a random element in $\mathbb{Z}_{2^k}$ and therefore the sharing would need to be modulo $2^{k'} \gg 2^k$. A more communication efficient method can use binary secret-sharing.

In some embodiments, the three training computers can determine to generate the preprocessed truncation pair. For example, the three training computers can determine to generate the preprocessed truncation pair after determining a result of multiplications during privacy-preserving machine learning. In other embodiments, the three training computers can generate many preprocessed truncation pairs prior to determining a result of multiplications. The three training computers can store any suitable number of preprocessed truncation pairs and retrieve them sequentially as needed.

At step S802, the three training computers non-interactively generate a random binary share $[\![r']\!]^B$. For example, the first training computer can generate $r'_1$ and $r'_2$, the second training computer can generate $r'_2$ and $r'_3$, and the third training computer can generate $r'_3$ and $r'_1$. In some embodiments, the non-interactive generation can be performed using a PRF and a secret key as described above.

At step S804, after generating the random binary share $[\![r']\!]^B$, the three training computers locally truncate $[\![r']\!]^B$ by removing the bottom d shares to obtain $[\![r]\!]^B$. The first training computer can truncate $r'_1$ and $r'_2$ to obtain $r_1$ and $r_2$, respectively. The second training computer can truncate $r'_2$ and $r'_3$ to obtain $r_2$ and $r_3$, respectively. The third training computer can truncate $r'_3$ and $r'_1$ to obtain $r_3$ and $r_1$, respectively. In some embodiments, $[\![r]\!]^B$ can be the k-d most significant shares of $[\![r']\!]^B$ (i.e., $r=r'/2^d$).

At step S806, after truncating the random binary share $[\![r']\!]^B$, resulting in the truncated random binary share $[\![r]\!]^B$, the first training computer and the second training computer jointly generate shares of the second random binary share $[\![r'_2]\!]^B$. The shares of the second random binary share $[\![r'_2]\!]^B$ can comprise a first share of the second random binary share $r'_{21}$, a second share of the second random binary share $r'_{22}$, and a third share of the second random binary share $r'_{23}$, wherein $r'_2 = r'_{21} + r'_{22} + r'_{23}$. For example, the first training computer can generate $r'_{21}$ and $r'_{22}$, whereas the second training computer can generate $r'_{22}$ and $r'_{23}$. The third training computer can receive $r'_{21}$ from the first training computer and can receive $r'_{23}$ from the second training computer.

Additionally, the second training computer and the third training computer jointly generate shares of the third random binary share $[\![r'_3]\!]^B$. The shares of the third random binary share $[\![r'_3]\!]^B$ can comprise a first share of the third random binary share $r'_{31}$, a second share of the third random binary share $r'_{32}$, and a third share of the third random binary share $r'_{33}$, wherein $r'_3 = r'_{31} + r'_{32} + r'_{33}$. For example, the second training computer can generate $r'_{32}$ and $r'_{33}$, whereas the third training computer can generate $r'_{33}$ and $r'_{31}$. The first training computer can receive $r'_{31}$ from the third training computer and can receive $r'_{32}$ from the second training computer. In some embodiments, the training computers can generate the shares of the second random binary share $[\![r'_2]\!]^B$ and the shares of the third random binary share $[\![r'_3]\!]^B$ using the rand protocol described above, for example, $\text{Rand}((\mathbb{Z}_2)^k)$.

Furthermore, the first training computer and the second training computer can jointly generate shares of the truncated second random binary share $[\![r_2]\!]^B$. The shares of the truncated second random binary share $[\![r_2]\!]^B$ can comprise a truncated first share of the truncated second random binary share $r_{21}$, a truncated second share of the truncated second random binary share $r_{22}$, and a truncated third share of the truncated second random binary share $r_{23}$, wherein $r_2 = r_{21} + r_{22} + r_{23}$. For example, the first training computer can generate $r_{21}$ and $r_{22}$, whereas the second training computer can generate $r_{22}$ and $r_{23}$. The third training computer can receive $r_{21}$ from the first training computer and can receive $r_{23}$ from the second training computer.

The second training computer and the third training computer can jointly generate shares of the truncated third random binary share $[\![r_3]\!]^B$. The shares of the truncated third random binary share $[\![r_3]\!]^B$ can comprise a truncated first share of the truncated third random binary share $r_{31}$, a truncated second share of the truncated third random binary share $r_{32}$, and a truncated third share of the truncated third random binary share $r_{33}$, wherein $r_3 = r_{31} + r_{32} + r_{33}$. For example, the second training computer can generate $r_{32}$ and $r_{33}$, whereas the third training computer can generate $r_{33}$ and $r_{31}$. The first training computer can receive $r_{31}$ from the third training computer and can receive $r_{32}$ from the second training computer. In some embodiments, the training computers can generate the shares of the truncated second random binary share $[\![r_2]\!]^B$ and the shares of the truncated third random binary share $[\![r_3]\!]^B$ using the rand protocol described above, for example, $\text{Rand}((\mathbb{Z}_2)^{k-d})$.

The three training computers can then perform the reveal one protocol, described above, to reveal the three shares of the second binary share $[\![r'_2]\!]^B$ and the three shares of the truncated second binary share $[\![r_2]\!]^B$ to the first training computer. The three training computers can also reveal the three shares of the second binary share $[\![r'_2]\!]^B$ and the three shares of the truncated second binary share $[\![r_2]\!]^B$ to the second training computer. Additionally, the three training computers can reveal the three shares of the third binary share $[\![r'_3]\!]^B$ and the three shares of the truncated third binary share $[\![r_3]\!]^B$ to the second training computer as well as the third training computer.

At this point, the first training computer has stored its shares of the random binary share $[\![r']\!]^B$ ($r'_1$ and $r'_2$), its shares of the truncated random binary share $[\![r]\!]^B$ ($r_1$ and $r_2$), all shares of the second random binary share $[\![r'_2]\!]^B$ ($r'_{21}$, $r'_{22}$, and $r'_{23}$), all shares of the truncated second random binary share $[\![r_2]\!]^B$ ($r_{21}$, $r_{22}$, and $r_{23}$), its shares of the third random binary share $[\![r'_3]\!]^B$ ($r'^{31}$ and $r'_{32}$), and its shares of the truncated third random binary share $[\![r_3]\!]^B$ ($r_{31}$ and $r_{32}$).

At step S808, the three training computers can securely compute addition binary circuits and then reveal shares of a first binary share $[\![r'_1]\!]^B := [\![r']\!]^B - [\![r'_2]\!]^B - [\![r'_3]\!]^B$ and shares of a truncated first binary share $[\![r_1]\!]^B := [\![r_2]\!]^B - [\![r_3]\!]^B$ to the first training computer and the third training computer. The three training computers can reveal $r'_1$ and $r_1$ to the first training computer and the third training computer. For example, the first training computer can determine a first share of the first binary share $r'_{11}$ (i.e., $r'_{11} = r'_1 - r'_{21} - r'_{31}$). In some embodiments, this computation can be done using a 3PC that computes an addition circuit. The 3PC can be instantiated using a binary 3PC or in other embodiments, a Yao 3PC.

The above computation of the shares of the first binary share $[\![r'_1]\!]^B$ and the shares of the truncated first binary share $[\![r_1]\!]^B$ with the addition binary circuit can be performed in parallel for all truncations in the preprocessing stage and hence may have little impact on the overall round complexity of the protocol. This optimization of the overall communication can use an optimized ripple carry full addition circuit using k−1 AND gates. In some embodiments, an optimized ripple carry full subtraction circuit can be used. As an additional optimization, the computation of $[\![r_1]\!]$ can be performed in $\mathbb{Z}_{2^{k-d}}$ and therefore can use k−d−1 AND gates per subtraction. In some embodiments, in the semi-honest setting, the subtractions of $r_2$ and $r_3$ can be performed locally by the second training computer.

In some embodiments, the ripple carry full addition circuit can comprise multiple full adder circuits in parallel. A full adder circuit can add two input operand bits (A and B) plus a carry in bit (Cin) and outputs a carry out bit (Cout) and a sum bit (S). A typical full adder circuit logic table is as follows:

| Inputs | | | Outputs | |
|---|---|---|---|---|
| A | B | Cin | Cout | S |
| 0 | 0 | 0 | 0 | 0 |
| 1 | 0 | 0 | 0 | 1 |
| 0 | 1 | 0 | 0 | 1 |
| 1 | 1 | 0 | 1 | 0 |
| 0 | 0 | 1 | 0 | 1 |
| 1 | 0 | 1 | 1 | 0 |
| 0 | 1 | 1 | 1 | 0 |
| 1 | 1 | 1 | 1 | 1 |

According to the full adder circuit logic table above, if the sum of the inputs equals zero, then the sum of the outputs will also equal zero. If the sum of the inputs equals one, then the outputs can include a carry out bit equal to zero and a sum bit equal to one. If the sum of the inputs equals two, then the outputs can include a carry out bit equal to one and a sum bit equal to zero. If the sum of the inputs equals three, then the outputs can include a carry out bit equal to one and a sum bit equal to one.

At step S810, after determining the shares of the first binary share $[\![r'_1]\!]^B$ and the shares of the truncated first binary share $[\![r_1]\!]^B$, the three training computers can determine the final shares to be $[\![r']\!]^A:=(r'_1, r'_2, r'_3)$ and $[\![r']\!]^A:=(r_1, r_2, r_3)$. The final shares can be the preprocessed shares. In some embodiments, the three training computers can convert the binary shares into arithmetic shares. Details of the conversion process are described in further detail below. Specifically, binary to arithmetic conversions are described in section VI.B.

An advantage of this protocol is its compatibility with the malicious setting. When the computations of $[\![x']\!] = [\![y]\!] [\![z]\!]$ are performed, initially all of the training computers hold a 3-out-of-3 sharing of $[\![x']\!]$ and then can reshare this to be a 2-out-of-3 sharing by sending $x'_i$ to party i−1.

Additionally, a proof $\pi_i$ can be sent demonstrating that $x'_i$ is indeed the correct value. In some embodiments, the $x'_i$ and the proof $\pi_i$ can be sent along with the reveal of $[\![x'-r']\!]$ which can be composed into a single round. However, it is possible for party i to send a correct reveal message $(x_i, \pi_i)$ to party i−1 and send an incorrect reveal message $x_i-r_i$ to party i+1. To ensure that such behavior is caught, in some embodiments, the party i−1 and the party i+1 can maintain a transcript of all $x_i-r_i$ messages from party i and compare them for equality before any secret value is revealed. When revealing the intermediate shares to the three training computers, the three training computers can update a log of reveal messages to include the intermediate shares. For example, if the first training computer receives $x'_3 r'_3$ from the third training computer, then the first training computer can update the log of reveal messages, stored by the first training computer, to include "$x'_3-r'_3$ from the third training computer." The training computers can then compare to log of reveal messages stored by each of the three training computers. This can be done, since the intermediate values are revealed to all three training computers. This general technique for ensuring consistency is referred to as compare view by [26] and we refer interested readers there for more details.

3. Flowchart for Preprocessing

Figure 9A:
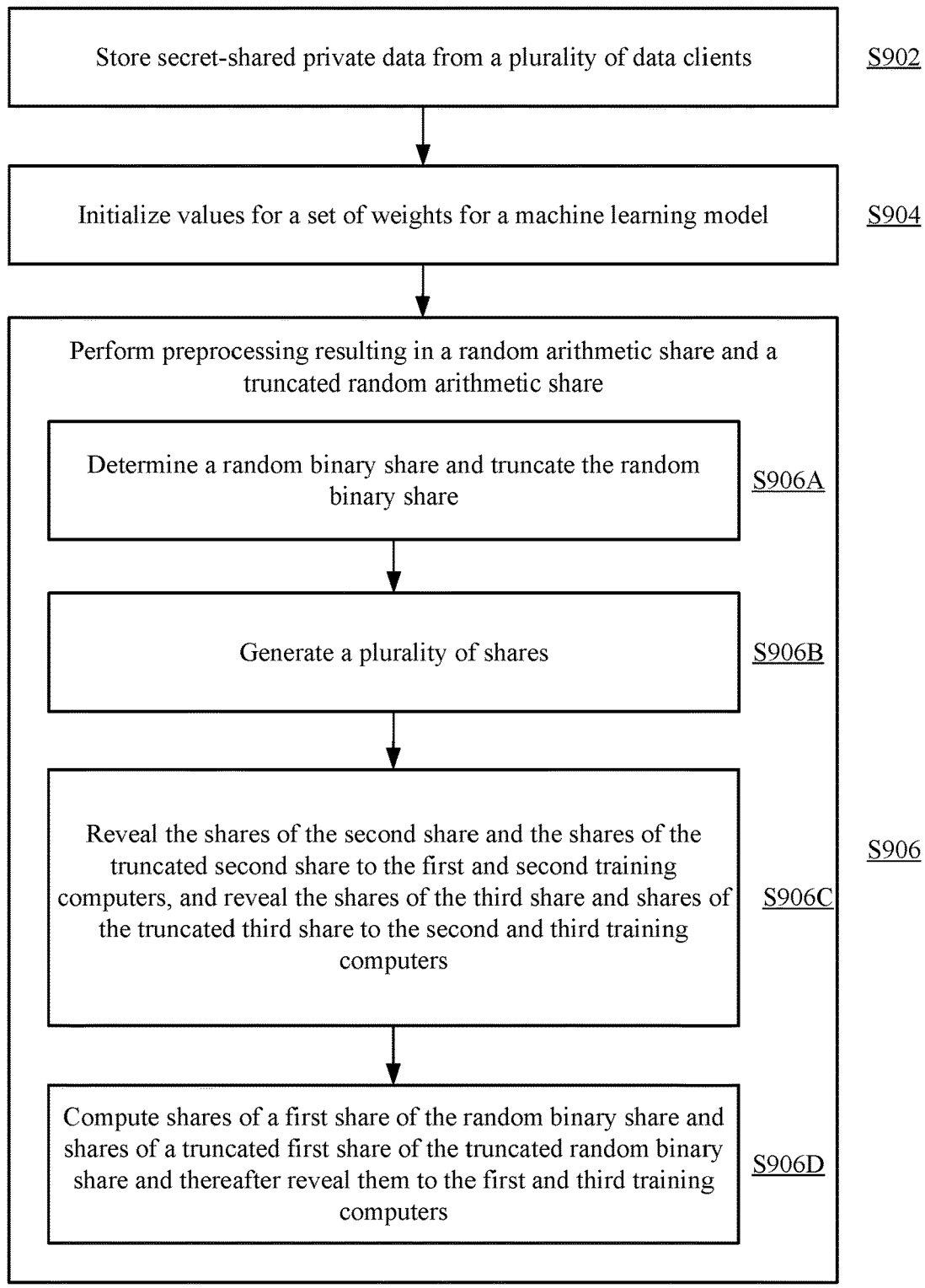
FIGS. 9A and 9B show a flowchart of performing truncation during privacy-preserving machine learning in the malicious setting according to an embodiment of the invention.
Figure 9B:
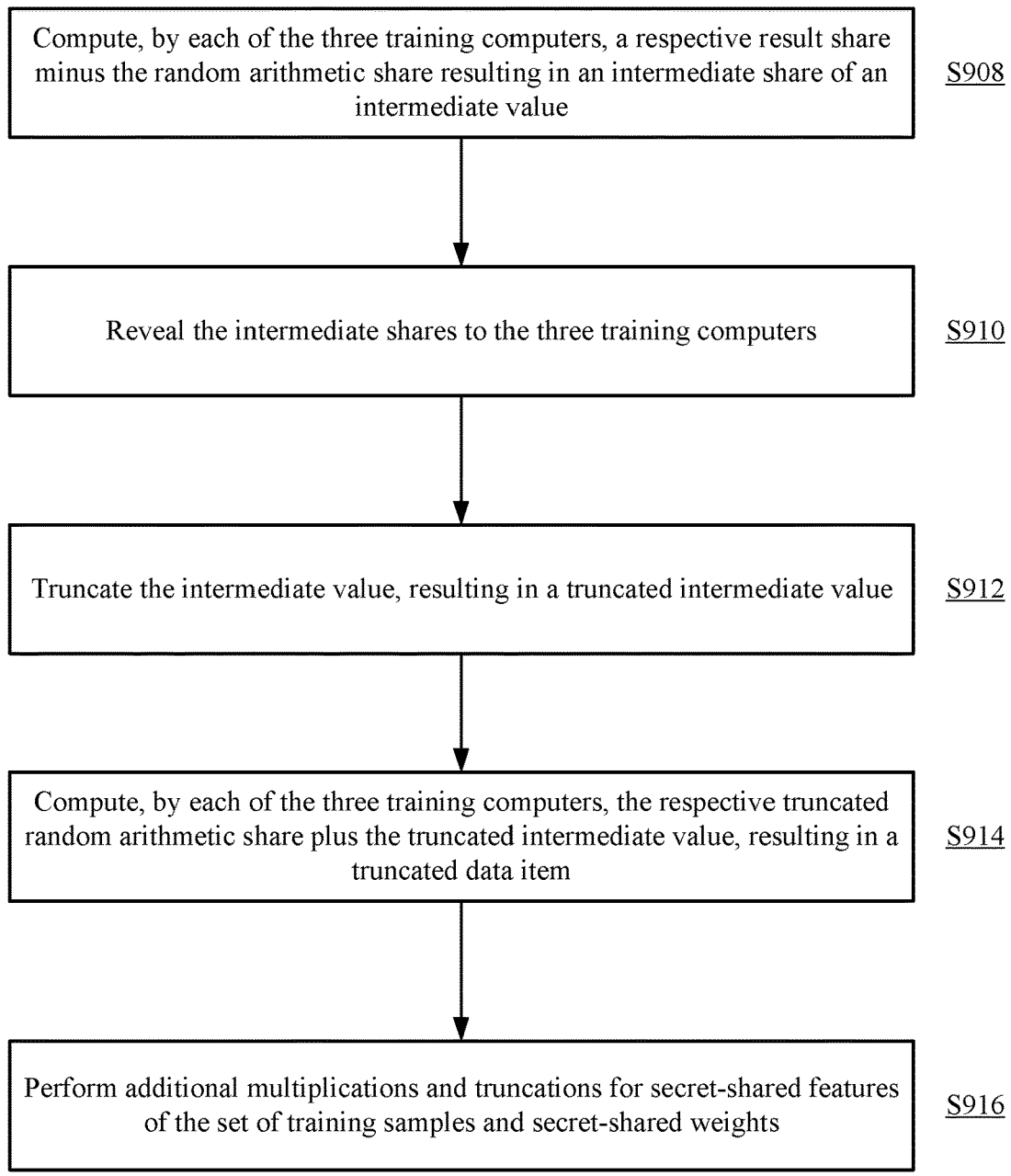

FIG. 9A and FIG. 9B show a flowchart of performing truncation during privacy-preserving machine learning in the malicious setting according to an embodiment of the invention. The method illustrated in FIGS. 9A and 9B will be described in the context of truncating a result of multiplications as part of training a machine learning model to determine weights in the malicious setting. It is understood, however, that embodiments of the invention can be applied to other circumstances (e.g., truncating other values, etc.). Although the steps are illustrated in a specific order, it is understood that embodiments of the invention may include methods that have the steps in different orders. In addition, steps may be omitted or added and may still be within embodiments of the invention. In some embodiments, the machine learning model may use linear regression, logistic regression, or a neural network.

At step S902, the three training computers can store secret-shared private data from a plurality of data clients. Each data item of the plurality of secret-shared private data is represented by three parts when secret-shared. The secret-shared private data can include a set of training samples. Each training sample can have d features and an output Y. In some embodiments, the three training computers can store any suitable number of secret-shared data items. For example, the three training computers can store 500 secret-shared data items among the three training computers. In this example, the secret-shared data items can relate to fraud data originating from four client computers, however it is understood that embodiments can relate to any suitable data from any suitable number of client computers.

At step S904, the three training computers can initialize values for a set of weights for the machine learning model. The weights can be secret-shared among the three training computers. The weights and the features used in training the machine learning model can be stored as integers. The three training computers can train a machine learning model on the 500 secret-shared data items. During training, the three training computers can multiply two secret-shared data items, for example, when determining a weight in a neural network, resulting in a result of the multiplications.

At step S906, after determining the result of multiplications, the three training computers can perform preprocessing prior to truncating the result of the multiplications. The result of the multiplications can be referred to as a first data item. The step of performing preprocessing can include steps S906A-5906D.

At step S906A, the three training computers can determine a random binary share. The random binary share can be secret-shared among the three training computers. The three training computers can determine the random binary share using any suitable method described herein, for example using a PRF and secret key. The three training computers can then truncate the random binary share, resulting in a truncated random binary share. The truncated random binary share can be secret-shared among the three training computers. In some embodiments, each training computer of the three training computers can locally truncate its shares of the random binary share.

At step S906B, after determining the random binary share and the truncated random binary share, the first training computer and the second training computer of the three training computers, can generate shares of a second share of the random binary share and shares of a truncated second share of the truncated random binary share. Additionally, the second training computer and the third training computer of the three training computers can generate shares of a third share of the random binary share and shares of a truncated third share of the truncated random binary share.

At step S906C, the three training computers can reveal the shares of the second share and the shares of the truncated second share to the first training computer and the second training computer, and can also reveal the shares of the third share and the shares of the truncated third share to the second training computer and the third training computer. The three training computers can reveal the shares using the reveal protocol described above. After revealing the shares of the second share, the shares of the truncated second share, the shares of the third share, and the shares of the truncated third share, the first training computer can store the shares of the second share and the truncated binary share. The second training computer can store the shares of the second share, the shares of the truncated second share, the shares of the third share, and the shares of the truncated third share. The third training computer can store the shares of the third share and the shares of the truncated third share.

At step S906D, the three training computers can compute a first binary share and a truncated first binary share. The three training computers can compute the first binary share and the truncated first binary share based on the random binary share, the truncated random binary share, the shares of the second share, the shares of the truncated second share, the shares of the third share, and the shares of the truncated third share using a ripple carry subtraction circuit. For example, the three training computers can compute the first binary share by computing the random binary share minus the shares of the second share minus the shares of the third share (i.e., $[\![r'_1]\!] := [\![r']\!]^B - [\![r'_2]\!]^B - [\![r'_3]\!]^B$). The three training computers can compute the truncated first binary share by computing the truncated random binary share minus the shares of the truncated second share minus the shares of the truncated third share (i.e., $[\![r'_1]\!]^B := [\![r']\!]^B - [\![r_2]\!]^B - [\![r_3]\!]^B$). The three training computers can thereafter reveal the first binary share and the truncated first binary share to the first training computer and the third training computer.

After determining the first binary share and the truncated first binary share, the three training computers can convert the binary shares into arithmetic shares. The three training computers can convert the first binary share, the shares of the second share, and the shares of the third share which make up a binary secret-shared data item into an arithmetic secret-shared data item including a first arithmetic share, a second arithmetic share, and a third arithmetic share. Similarly, the three training computers can convert the truncated first binary share, the shares of the truncated second share, and the shares of the truncated third share which make up a truncated binary secret-shared data item into a truncated arithmetic secret-shared data item. In other words, the three training computers can define the preprocessed shares as $[\![r']\!]^A := (r'_1, r'_2, r'_3)$ and $[\![r]\!]^A := (r_1, r_2, r_3)$. The arithmetic secret-shared data item can be referred to as a random arithmetic share or a preprocessed share, while the truncated arithmetic secret-shared data item can be referred to as a truncated random arithmetic share or a truncated preprocessed share. Details of the conversion from binary secret-sharing to arithmetic secret-sharing are described in detail below.

4. Flowchart after Preprocessing

At step S908, after performing preprocessing, the three training computers can compute the first data item minus the random arithmetic share resulting in a first result (i.e., $[\![x'-r']\!]^A$). The first result can be secret-shared among the three training computers.

At step S910, after computing the first result, the three training computers can reveal the first result to the three training computers. The three training computers can perform the reveal routine as described in detail above. Each of the three training computers can store the first result which may not be shared due to the reveal all. For example, each of the three training computers can store x'-r'.

At step S912, after revealing the first result to all three training computers, the three training computers can truncate the first result. The truncation of the first result can result in a truncated first result. For example, each of the three training computers can locally truncate the first result by $2^d$ bits, i.e., $(x'-r')/2^d$ to determine the truncated first result.

At step S914, after determining the truncated first result, the three training computers can compute a truncated data item by the truncated random arithmetic share plus the truncated first result. The truncated data item can be secret-shared among the three training computers. The truncated data item can be the truncation of the first data item, or in other words, the truncation of the result of the multiplications. Each of the three training computers can store two of three shares of the truncated data item.

At step S916, the three training computers can perform additional multiplications and truncations for secret-shared features of the set of training samples and secret-shared weights to train the machine learning model for predicting the outputs Y of the set of training samples.

E. Public Operations on Arithmetic Shares:

One advantage of an additively secret-shared value $[\![x]\!]^A$ is that $c+[\![x]\!]^A$, $[\![x]\!]^A-c$, and $c[\![x]\!]^A$ for any signed integer c can be computed locally on the training computers. This means that no extra communications between training computers are needed. When x is a fixed-point value, addition and subtraction may naturally work when c is also expressed as a fixed-point value. For multiplication and a two's complement integer c, standard multiplication with a public value can still be performed. When c is a two's complement integer, the result can be divided by $2^d$, by the training computers, using the semi-honest truncation protocol, above, to obtain a sharing $[\![cx]\!]^A$ with d decimal bits. One byproduct of fixed-point multiplication is that division by a public value c can now be supported, i.e. $[\![x]\!]^A/c = c^{-1}[\![x]\!]^A$.

V. Delayed Reshare

For many machine learning algorithms, a computation can be the multiplication of two matrices. Multiplication of two matrices can be implemented by a series of inner products, one for each row-column pair of a first matrix and a second matrix. An inner product can be defined as $\vec{x} \cdot \vec{y} = \Sigma_{i=1}^{n} x_i y_i$, where $\vec{x}, \vec{y} \in (\mathbb{Z}_{2^k})^n$ can be vectors of n elements. An element (term) of an inner product corresponds to $x_i y_i$. Thus, there are n elements in the inner product, and the elements are summed.

Delayed reshare can occur in both the semi-honest and malicious settings. The values determined in the delayed reshare process can be truncated using any suitable method described herein. For example, the training computers can first reveal the 3-out-of-3 sharing of $[\![z'+r']\!]$, which is equal to $[\![x]\!] [\![y]\!] + [\![r']\!]$. In this case, the training computers can multiply a first data item x and a second data item y. The final product can then be computed as $[\![z]\!] := (z'+r')/2^d - [\![r]\!]$. The primary non-linear step here is the computation of $[\![x]\!] [\![y]\!]$, after which a series of local transformations are made. As such, the computation of the inner product can be written as $[\![x]\!] \cdot [\![y]\!] := \text{reveal}((\Sigma_{i=1}^{n} [\![x_i]\!] [\![y_i]\!] + [\![r']\!])/2^d - [\![r]\!]$.

A. Vector Operations

A vector y can be secret-shared among the three training computers. For example, $y=[y^1, y^2, y^3]$ can be secret-shared such that each element of the vector y is secret-shared among the three training computers. The secret-shared vector y can be denoted as $[\![y]\!]$. A first element $y^1$ of the vector can be secret-shared into three parts $y_1^1$, $y_2^1$, and $y_3^1$. For example, a first training computer can store the first part of the first element $y_1^1$ and the second part of the first element $y_2^1$. A second training computer can store the second part of the first element $y_2^1$ and the third part of the first element $y_3^1$. The third training computer can store the third part of the first element $y_3^1$ and the first part of the first element $y_1^1$. In some embodiments, matrices and higher-ranked tensors can be secret-shared in a similar manner to the secret-sharing of a vector, for example, each element of a matrix can be secret-shared.

All three training computers can locally store a 3-out-of-3 sharing of each $[\![x_i]\!]$ and $[\![y_i]\!]$ and then compute a local share of each element of the resultant inner product z. The individual elements of the result z can be summed to provide z, masked using a random value, and then z can be truncated. The final truncated result for a local share of an element of a resulting tensor can then be reshared as a 2-out-of-3 sharing of the final result. An advantage of this approach is that the truncation induces an error of $2^{-d}$ with respect to the overall inner product, as opposed to individual multiplication terms, resulting in a more accurate computation. More generally, any linear combination of multiplication terms can be computed in this way, where the training computers communicate to reshare and truncate after computing the 3-out-of-3 secret-share of the linear combination (when the final result does not grow beyond the $2^\ell$ bound).

FIG. 10 shows two data items according to an embodiment of the invention. FIG. 10 includes a matrix X 1010 and a vector Y 1020, both examples of a data item. The matrix X 1010 and the vector Y 1020 can be secret-shared using any suitable method described herein. For example, the matrix X 1010 can be denoted by $[\![X]\!]$ and shared among three training computers. The matrix X 1010 includes a number of data elements, such as $x_{11}, x_{22}, x_{nd}$, etc. The vector Y 1020 also includes a number of data elements, such as $y_1, y_2$, and $y_n$. In this case, the subscripts denote the position of the element in the tensor. In this section, a share of an element or data item can be denoted as a superscript (e.g., a first share of the data element $x_{11}$ of matrix X 1010 can be denoted as $x_{11}^1$), whereas, in other embodiments, a share of an element or data item can be denoted as a subscript.

The training computers can determine a data item Z 1030, which can be the product of the matrix X 1010 and the vector Y 1020. The data item Z 1030 can comprise a number of local shares of an inner product $z_i$ 1040. The local shares of the inner product $z_i$ 1040 can be equal to $\Sigma_i x_{ij} y_j$. An element of the inner product $z_i$ 1040 can correspond to $x_{ij} y_j$. Each training computer can determine local shares of the inner product $z_1$ 1040 based on which shares of the matrix X 1010 and the vector Y 1020 that the training computer has stored.

B. Flowchart for Delayed Reshare

Figure 10B:
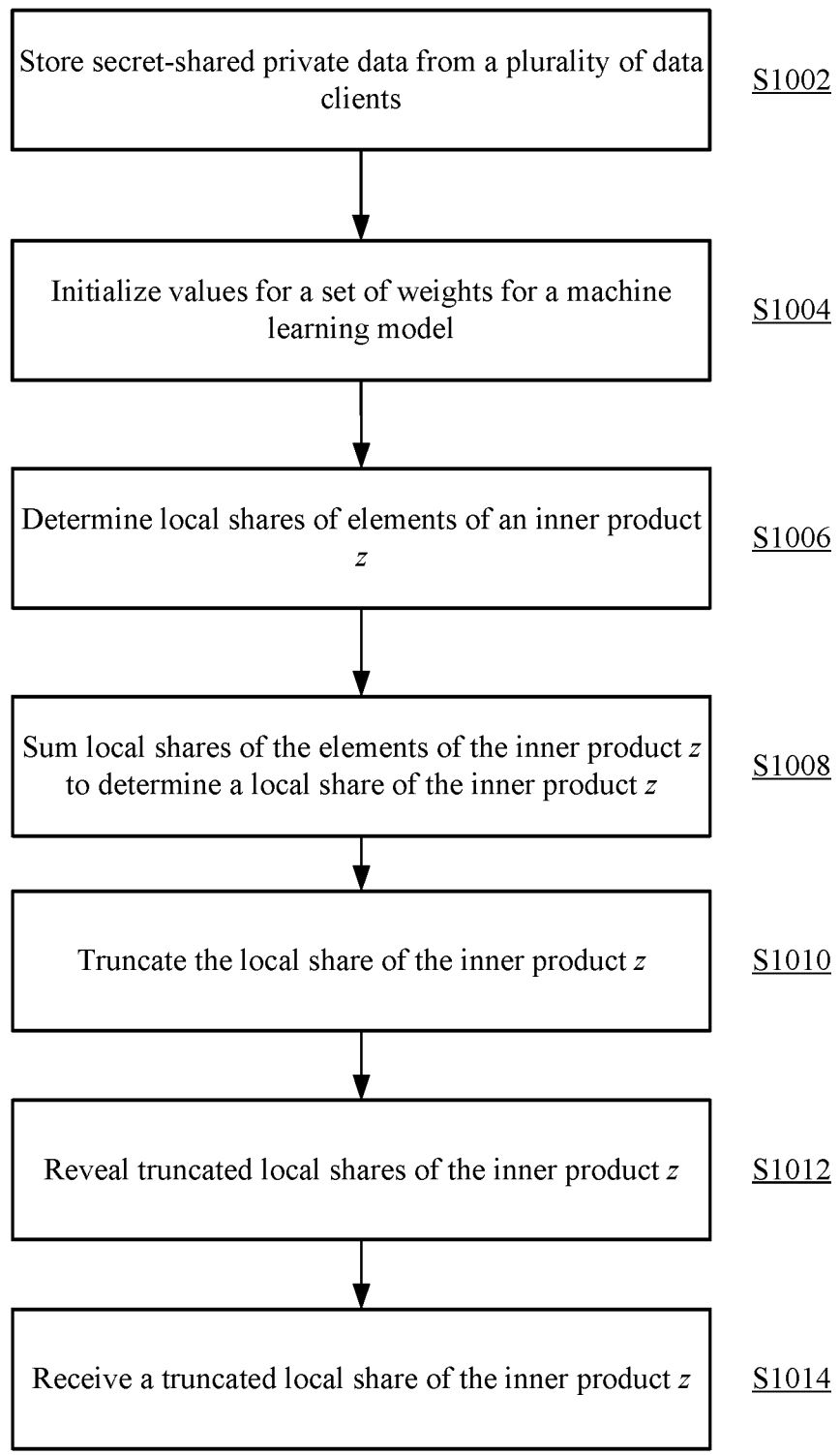
FIG. 10B shows a flowchart of performing a delayed reshare process during privacy preserving machine learning.

FIG. 10B shows a flowchart of performing a delayed reshare process during privacy preserving machine learning. The method illustrated in FIG. 10B will be described in the context of performing the delayed reshare process as part of training a machine learning model to determine weights. It is understood that embodiments of the invention can be applied to the semi-honest setting, where a semi-honest truncation method is performed, as well as the malicious setting, where a malicious truncation method is performed. Although the steps are illustrated in a specific order, it is understood that embodiments of the invention may include methods that have the steps in different orders. In addition, steps may be omitted or added and may still be within embodiments of the invention.

At step S1002, three training computers can store two of three shares of secret-shared private data from a plurality of data clients comprising shares of a first secret-shared tensor and shares of a second secret-shared tensor. The first secret-shared tensor and the second secret-shared tensor can be secret-shared as described herein, for example, each training computer can store two of three shares of the first secret-shared tensor. The secret-shared private data can include a set of training samples, each having features and an output.

At step S1004, the three training computers can initialize values for a set of weights for a machine learning model, the weights being secret-shared among the three training computers. The weights and the features can be stored as integers. A first shared tensor X can comprise secret-shared features and a second shared tensor Y can comprise secret-shared weights. In some embodiments, the first and second secret-shared tensors can be a first-order tensor (vector), a second-order tensor (matrix), or any other suitable order tensor.

At step S1006, each of the three training computers can determine local shares of elements of an inner product z of locally-stored shares of the first shared tensor X and locally-stored shares of the second shared tensor Y. Each training computer can determine respective local shares of elements of the inner product.

At step S1008, after determining local shares of elements of the inner product z, the three training computers can sum local shares of the elements of the inner product z to obtain a local share of the inner product z.

At step S1010, the three training computers can truncate the local share of the inner product z. Each training computer can truncate its respective local shares of the inner product. The three training computers can used any suitable truncation method described herein. In some embodiments, the training computers can perform a semi-honest truncation method. In other embodiments, the training computers can perform a malicious truncation method. A delayed reshare process with a malicious truncation process is described in further detail below.

At step S1012, after determining truncated local shares of the inner product z, the three training computers can reveal the truncated local shares of the inner product z to another training computer. Each of the three training computers can reveal the truncated local shares of the inner product z to one other training computer, using any suitable reveal method described herein. For example, the first training computer can transmit its local shares of the inner product z to the second training computer. The second training computer can transmit its local shares of the inner product z to the third training computer. The third training computer can transmit its local shares of the inner product z to the first training computer.

At step S1014, each of the three training computers can receive a truncated local share of the inner product from another training computer. For example, the first training computer can receive a truncated local share of the inner product from the second training computer.

In some embodiments, after each training computer receives a truncated local share of the inner product from another training computer, each training computer can perform additional multiplications and truncations for secret-shared features of the set of training samples and secret-shared weights to train a machine learning model for predicting the outputs Y of the set of training samples.

C. Flowchart for Delayed Reshare Truncation in Malicious Context

Figure 11:
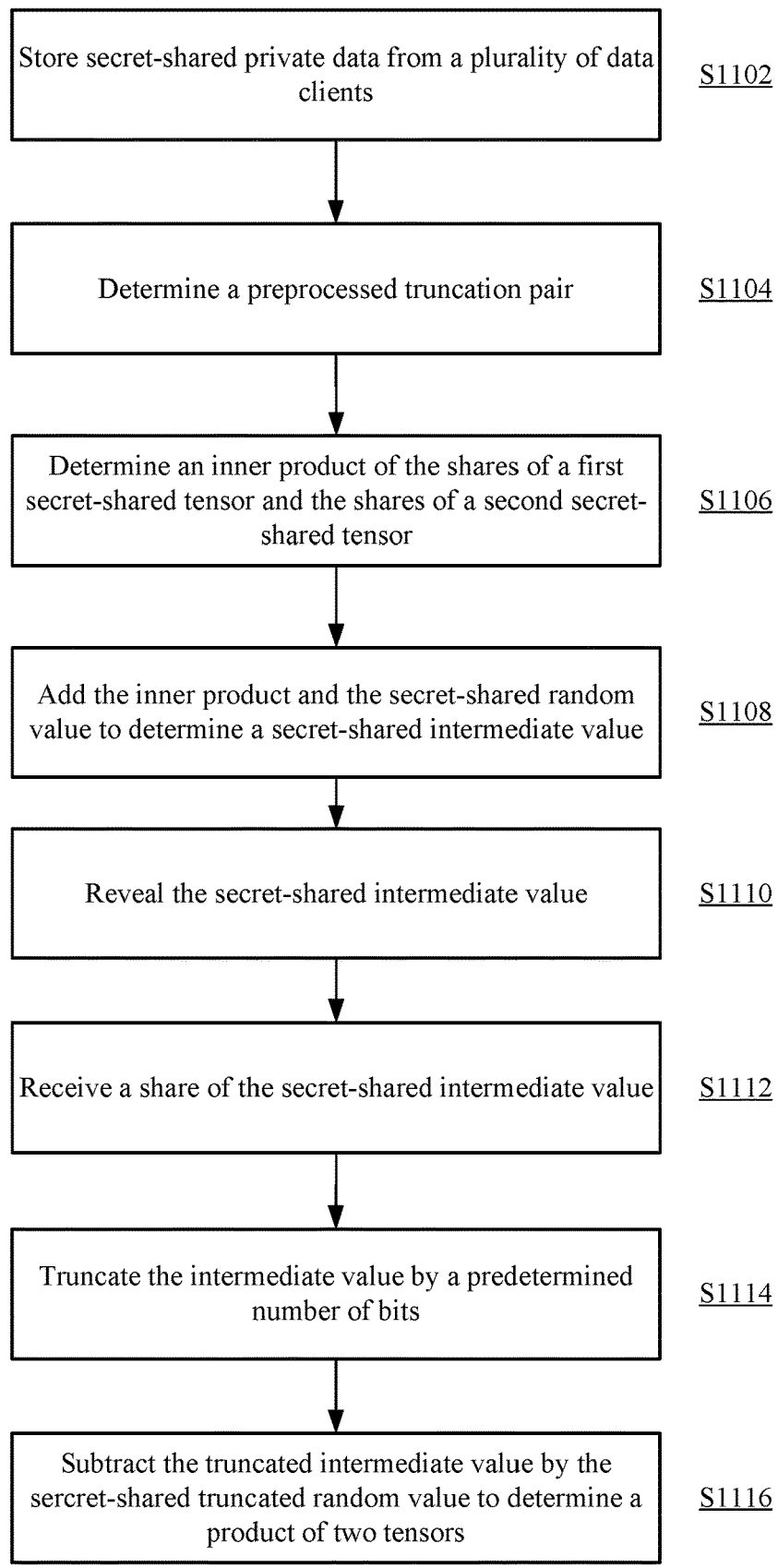
FIG. 11 shows a flowchart of performing a delayed reshare process with a malicious truncation technique during privacy preserving machine learning.

FIG. 11 shows a flowchart of performing a delayed reshare process during privacy preserving machine learning. The method illustrated in FIG. 11 will be described in the context of performing the delayed reshare process as part of training a machine learning model to determine weights in a malicious setting. It is understood, however, that embodiments of the invention can be applied to other circumstances, for example, in the semi-honest setting where a semi-honest truncation method, as described herein, is performed. Although the steps are illustrated in a specific order, it is understood that embodiments of the invention may include methods that have the steps in different orders. In addition, steps may be omitted or added and may still be within embodiments of the invention.

At step S1102, three training computers can store two of three shares of secret-shared private data from a plurality of data clients comprising shares of a first secret-shared tensor and shares of a second secret-shared tensor. The first secret-shared tensor and the second secret-shared tensor can be secret-shared as described herein, for example, each training computer can store two of three shares of the first secret-shared tensor. In some embodiments, the first and second secret-shared tensors can be a first-order tensor (vector), a second-order tensor (matrix), or any other suitable order tensor.

At step S1104, a first training computer of the three training computers can determine a truncation pair comprising a secret-shared random value $[\![r']\!]$ and a secret-shared truncated random value $[\![r]\!]$. The first training computer can determine the preprocessed truncation pair in conjunction with a second training computer and a third training computer. The preprocessed truncation pair can be generated using any suitable method described herein. For example, the generation of a preprocessed truncation pair is described in section IV.D.2. In some embodiments, the three training computers can generate and store any suitable number of preprocessed truncation pairs, and retrieve a preprocessed truncation pair when needed.

At step S1106, after determining the preprocessed truncation pair, the first training computer can determine local shares of an individual inner product $z_i$. The inner product can be of the shares of the first secret-shared tensor and the shares of the second secret-shared tensor. In some embodiments, each training computer can determine one of three local shares of the inner product $z_i$ based on which shares the training computer holds.

Each training computer can determine local shares of elements of the inner product z of locally-stored shares of the first shared tensor and locally-stored shares of the second shared tensor. For example, the first training computer can determine the first share of a first element of the inner product by computing $z_1^i = x_1^i y_1^i + x_1^i y_2^i + x_2^i y_1^i$, where the subscripts denote shares, and the superscripts denote the element. Each training computer can then sum local shares of the elements of the inner product z to obtain a local share of the inner product z. The training computers can then revel their local share of the inner product z to one other training computer, using any suitable method described herein. For example, the first training computer can transmit $z_1^i$ to the third training computer. The second training computer can transmit $z_2^i$ to the first training computer. The third training computer can transmit $z_3^i$ to the second training computer.

At step S1108, after determining the local shares of the inner product $z_i$, the first training computer can add its local shares of the inner product $z_i$ and its two of three shares of the secret-shared random value $[\![r']\!]$, resulting in a secret-shared intermediate value $z_i + [\![r']\!]$. For example, the first training computer can determine a first share of the intermediate value $z_1 + [\![r']\!]$. The second training computer and the third training computer can also add their local shares of the inner product $z_i$ and their shares of the secret-shared random value $[\![r']\!]$. In some embodiments, in the semi-honest setting, the training computers can truncate the shares of the inner product using any suitable method described herein, for example, as described in section IV.C.

At step S1110, after determining the first share of the intermediate value, the first training computer can reveal the first share of the intermediate value to the second training computer and the third training computer. In some embodiments, the three training computers can perform the reveal all function, as described herein, to reveal the shares of the intermediate value to the three training computers (i.e., reveal($z + [\![r']\!]$)). In some embodiments, there can be many inner products z, as in FIG. 10.

For example, the first training computer can transmit the first share of the intermediate value to the second training computer, wherein the second training computer can store all three shares of the intermediate value. Each training computer can reveal its share of the intermediate value with the other training computers, so that each training computer can store all three shares of the intermediate value.

At step S1112, the first training computer can receive shares of the secret-shared intermediate value that it does not have (e.g., a second share of the intermediate value and a third share of the intermediate value). In some embodiments, the first training computer can receive the third share of the intermediate value from the third training computer and the second share of the intermediate value from the second training computer. The first training computer can determine the intermediate value based on the three shares of the intermediate value. In some embodiments, the intermediate value can be equal to the sum of the three shares of the secret-shared intermediate value. Each training computer can determine the intermediate value locally.

By revealing the intermediate value, rather than the inner product, the training computers do not have access to, or information regarding, the inner product, thus keeping the inner product secret. The training computers can perform further computations using the intermediate value in a secure manner, since the intermediate value has been obfuscated using the random value.

At step S1114, after determining the intermediate value, the first training computer can truncate the intermediate value by a predetermined number of bits. The second training computer and the third training computer can also truncate the intermediate value by the same predetermined number of bits. For example, the three training computers can each locally truncate the intermediate value by $2^d$ bits.

At step S1116, after truncating the intermediate value to determine a truncated intermediate value, the first training computer can subtract the truncated intermediate value by its shares of the secret-shared truncated random value r to determine two of three shares of the inner product of two tensors (i.e., the product of the first secret-shared tensor and the shares of the second secret-shared tensor). For example, the first training computer can subtract the truncated intermediate value by the first share $r_1$ of the truncated random value as well as subtract the truncated intermediate value by the second share $r_2$ of the truncated random value.

Each training computer can subtract the truncated intermediate value by its two of three shares of the truncated random value r to determine two of three shares of the inner product of the two tensors. For example, the third training computer can determine the third and the first shares of the product of the two tensors. After determining the shares of the product of the two tensors, the three training computers can perform computations involving the shares of the inner product of the two tensors.

D. Proof of Correctness in the Malicious Setting

In the malicious setting, a proof of correctness can be provided for each multiplication $[\![x_i]\!][\![y_i]\!]$. Each of the three training computers can verify the proof of correctness provided by the other training computers. However, the use of a proof of correctness results in increasing the number of communications to O(n) elements. A naive solution would require n independent multiplication protocols and O(n) communications. However, we show how the training computers can be optimized to only communicate O(1) ring elements and compute one pre-processed truncation-pair $[\![r']\!]$ and $[\![r]\!]$ when computing the multiplication of two tensors.

To compute $[\![X]\!][\![B]\!]$ the three training computers can first generate two random matrices $[\![A]\!]$ and $[\![B]\!]$ which are respectively the same dimension as $[\![X]\!]$ and $[\![Y]\!]$. During an offline phase, the training computers can compute the matrix triple $[\![C]\!]:=[\![A]\!][\![B]\!]$, using any suitable method described herein. Given this, the malicious secure multiplication protocol of [26] can be generalized to the matrix setting. In particular, the training computers can each locally compute the 3-out-of-3 sharing $[\![Z]\!]:=[\![X]\!][\![Y]\!]$ and then training computer i can send $Z_i$ (i.e., training computer i's local share) to training computer i−1. Training computer i can also prove the correctness of $Z_i$ using the matrix triple ($[\![A]\!]$, $[\![B]\!]$, $[\![C]\!]$) along with a natural extension of protocol 2.24 in [26] where scaler operations are replaced with matrix operations.

The online communication of the malicious protocol can be proportional to the sizes of X, Y, and Z and can be almost equivalent to the communication of the semi-honest protocol. The offline communication can be proportional to the number of scaler multiplications, which is cubic in the dimensions of X and Y.

VI. Share Conversion

Due to the complexity of many machine learning functions, it is often beneficial to switch back and forth between arithmetic operations (e.g., multiplications and addition) and non-arithmetic operations (e.g., non-linear activation functions, max-pooling, averages, etc.). Some operations can be efficiently performed using Boolean circuits on binary shared or Yao shared inputs. It can be beneficial to convert between different share representations. We design new and optimized protocols that facilitate efficient conversions between all three types of sharing: arithmetic, binary, and Yao. There are six conversions that can occur; arithmetic to binary, binary to arithmetic, Yao to binary, binary to Yao, Yao to arithmetic, and arithmetic to Yao.

FIG. 12, shows a list of conversion protocols, described herein, and their cost in terms of communication cost and round cost, in both the semi-honest and the malicious settings. For example, the conversion from arithmetic to binary, in both the semi-honest and malicious settings, can take k+k log (k) communications and 1+log(k) rounds, wherein k is the number of bits converted. The conversions included in FIG. 12 include arithmetic to binary $[\![x]\!]^A \rightarrow [\![x]\!]^B$, arithmetic to binary with a single bit $([\![x]\!]^A, i) \rightarrow [\![x]\!]^B$, binary to arithmetic $[\![x]\!]^B \rightarrow [\![x]\!]^A$, binary to arithmetic with a single bit $[\![b]\!]^B \rightarrow [\![b]\!]^A$, Yao to binary $[\![b]\!]^Y \rightarrow [\![b]\!]^B$, binary to Yao $[\![b]\!]^B \rightarrow [\![b]\!]^Y$, Yao to arithmetic $[\![x]\!]^Y \rightarrow [\![x]\!]^A$, and arithmetic to Yao $[\![x]\!]^A \rightarrow [\![x]\!]^Y$.

A. Arithmetic to Binary:

A first conversion can include converting from an arithmetic secret-shared data item to a binary secret-shared data item. There can be several ways to perform the conversion. One way to perform the conversion can be to use randomly generated binary shares. The training computers can generate two random binary shares and determine a third binary share based on the arithmetic shares and the two random binary shares. The three binary shares are then the new binary shares. Another, more efficient, way to convert an arithmetic secret-shared data item to a binary secret-shared data item can include converting shares of the arithmetic data item to vectors of bits and then determining sums of certain bits using full adder circuits and a parallel prefix adder. Methods of converting from arithmetic to binary are described in further detail below.

1. Arithmetic to Binary Using Randomly Generated Binary Shares

First, an embodiment of converting from an arithmetic secret-shared data item to a binary secret-shared data item using randomly generated binary shares will be described. Consider $[\![x]\!]^A = (x_1, x_2, x_3)$ where $x = x_1 + x_2 + x_3$. Through the use of the previously described replicated sharing, a first training computer can store both $x_1$ and $x_2$, and can compute $x_1 + x_2$ locally. The second and third training computers can store their shares, as described herein. The first training computer can input $(x_1 + x_2)$ and the third training computer can input $x_3$, to a binary sharing (or a garbled circuit) 3PC that can compute an addition circuit that computes $[\![(x_1 + x_2)]\!]^B + [\![x_3]\!]^B$.

The training computers can locally generate a binary secret-shared second random value $[\![y_2]\!]^B$ and a binary secret-shared third random value $[\![y_3]\!]^B$ using any suitable method described herein. Then, the second random value $[\![y_2]\!]^B$ can be revealed to the first training computer and the second training computer. The third random value $[\![y_3]\!]^B$ can be revealed to the second training computer and the third training computer. The second random value $[\![y_2]\!]^B$ and the third random value $[\![y_3]\!]^B$ can be revealed using any suitable technique described herein.

The first training computer and the second training computer can set a second binary share equal to the second random value $[\![y_2]\!]^B$. The second training computer and the third training computer can set a third binary share equal to the third random value $[\![y_3]\!]^B$.

Each of the three training computers can then locally compute the first binary share $[\![y_1]\!]^B$ based on the result of the addition circuit (i.e., $([\![(x_1+x_2)]\!]+[\![x_3]\!]^B)$), the second random value, and the third random value, i.e., $[\![y_1]\!]^B = ([\![(x_1+x_2)]\!]^B+[\![x_3]\!]^B) \oplus [\![y_2]\!]^B \oplus [\![y_3]\!]^B$. The full adder circuits as well as the parallel prefix adder are described in further detail below.

The three training computers can reveal the first binary share $[\![y_1]\!]^B$ to the first training computer and the third training computer. This can complete the conversion to binary sharing $[\![x]\!]^B = (y_1, y_2, y_3)$, since the first training computer stores the first binary share and the second binary share, the second training computer stores the second binary share and the third binary share, and the third training computer stores the third binary share and the first binary share. When using a binary 3PC, an optimized parallel prefix adder [31] can be used to reduce the number of rounds from k to log (k) at the cost of 0 (k log k) bits of communication. When using a Yao sharing 3PC, which can require a single round by leveraging redundancies in the replicated secret-sharing, a ripple-carry full adder circuit can be used with k AND gates and O(κk) communications, wherein K can be a security parameter.

However this approach can only be secure against a semi-honest adversary. For example, a malicious party that has control of the first training computer can use a wrong value in place of $(x_1+x_2)$, which can go undetected since the addition is done locally. This can be prevented by performing the addition inside another malicious 3PC but this would double both round and communication cost. This extra cost can be avoided in the case of binary sharing 3PC.

Consider a traditional ripple-carry full adder where the full adder operation FA $(x_1[i], x_2[i], c[i-1]) \rightarrow (c[i], s[i])$ normally takes two input bits $x_1[i]$, $x_2[i]$ and a carry bit $c[i-1]$ and can then produce an output bit $s[i]$ and a next carry bit $c[i]$. The full adder can be modified to instead take $x_3[i]$ as a third input, therefore $x_1[i]+x_2[i]+x_3[i]=2c[i]+s[i]$. The parallel prefix adder can then be used to determine the sum of the outputs of the full adder. The three training computers can compute the full adder and parallel prefix adder circuits in a binary 3PC.

As a result, there can be k parallel invocations of the full adder, one for each bit of the shares of the first, second, and third binary shares, in a single round to compute c and s. Then, there is one evaluation of a parallel prefix adder circuit to compute 2c+s, which can be sufficient to compute x. This can result in log k+1 rounds and k log k+k bits of communication which is almost a factor of 2 better than 2 log k rounds and 2 k log k communication for previous approaches. Since the computation is done using a 3PC, the resulting protocol is secure against a malicious adversary.

2. Flowchart of Arithmetic to Binary

Next, another embodiment of performing a conversion from an arithmetic secret-shared data item to a binary secret-shared data item will be described. Each training computer can convert its shares of the arithmetic secret-shared data item into vectors of secret-shared bits. Each training computer can determine shares of each of the three vectors. The training computers can then determine sum bits and carry bits using full adder circuits, where the inputs to the full adder circuit are tuples comprising shares of the vectors. The training computers can then determine shares of a binary secret-shared data item using a parallel prefix adder.

Arithmetic to binary, can be referred to as bit decomposition and can be denoted as $[\![x]\!]^A \rightarrow [\![x]\!]^B$. The conversion cost for arithmetic to binary is shown in the first row of FIG. 12. An arithmetic sharing of a number x can be converted to a vector of secret-shared bits $x[1], \ldots x[k] \in \{0,1\}$ such that $x = \sum_{i=1}^{k} 2^{i-1} x[i]$. For example, in some embodiments, a first share of the arithmetic data item, equal to a value of 2, can be converted to a binary value of 10, wherein 10 is a first vector of secret-shared bits. The first bit of the first vector of secret-shared bits can be denoted as x[0] which, in this case, is equal to 1, whereas x[1]=0.

Each value of an arithmetic sharing of a data item, $[\![x]\!]^A := (x_1, x_2, x_3)$, can be converted into vectors of secret-shared bits. A first arithmetic share can be converted into a first vector, a second arithmetic share can be converted into a second vector, and a third arithmetic share can be converted into a third vector. The vectors can be secret-shared, as described herein, as shares of a first vector $[\![x_1]\!]^B := (x_1, 0, 0)$, shares of a second vector $[\![x_2]\!]^B := (0, x_2, 0)$, and shares of a third vector $[\![x_3]\!]^B := (0, 0, x_3)$. A binary shared data item $[\![x]\!]^B$, which is the final result of the conversion from arithmetic to binary, can be equivalent to the sum of the shares of the first vector $[\![x_1]\!]^B$, the shares of the second vector $[\![x_2]\!]^B$, and the shares of the third vector $[\![x_3]\!]^B$ (i.e., $[\![x]\!]^B = [\![x_1]\!]^B + [\![x_2]\!]^B + [\![x_3]\!]^B$).

First, the first share of the arithmetic data item $x_1$ is converted into a first vector of bits. The first vector of bits can be determined by the first training computer and the second training computer, both of which store the first share of the arithmetic data item $x_1$. The first vector of bits can be secret-shared among the three training computers, which can be denoted as $[\![x_1]\!]^B$. The shares of the first vector $[\![x_1]\!]^B$ can comprise three shares that are secret-shared among the three training computers, such that each training computer can store two of the three shares of the first vector $[\![x_1]\!]^B$. The three shares of the first vector $[\![x_1]\!]^B$ can be $x_{11}$, $x_{12}$, and $x_{13}$. Recall that the notation $[\![x_1]\!]^B := (x_1, 0, 0)$ means that the first training computer can store $x_{11} = x_1$ and $x_{12} = 0$, the second training computer can store $x_{12} = 0$ and $x_{13} = 0$, and the third training computer can store $x_{13} = 0$ and $x_{11} = x_1$.

Each bit of the shares of the first vector $[\![x_1]\!]^B$ can be shared among the three training computers. For example, a first bit $x_1[0]$ of the first vector $[\![x_1]\!]^B$ can be secret-shared such that $[\![x_1[0]]\!]^B = (x_1[0], 0, 0)$. In other words, the first training computer can store $x_{11}[0] = x_1[0]$ and $x_{12}[0] = 0$, the second training computer can store $x_{12}[0] = 0$ and $x_{13}[0] = 0$, and the third training computer can store $x_{13}[0] = 0$ and $x_{11}[0] = x_1[0]$. However, for notation, the secret-sharing of every bit in $x_1$ is referred to as $[\![x_1]\!]^B$. Any suitable number of bits can be secret-shared in this way, for example, a vector of secret-shared bits can comprise 64 bits.

As an example, the first share of the arithmetic data item $x_1$ can be equal to a value of 2, which can be converted to a binary value of 10 (i.e., a vector of bits). The first bit of the binary value of 10 can be secret-shared such that the first training computer can store $x_{11}[0] = 1$ and $x_{12}[0] = 0$, the second training computer can store $x_{12}[0] = 0$ and $x_{13}[0] = 0$, and the third training computer can store $x_{13}[0] = 0$ and $x_{11}[0] = 1$. The second bit of the binary value of 10 can be secret-shared such that the first training computer can store $x_{11}[1] = 0$ and $x_{12}[1] = 0$, the second training computer can store $x_{12}[1] = 0$ and $x_{13}[1] = 0$, and the third training computer can store $x_{13}[1] = 0$ and $x_{11}[1] = 0$.

In this way, a training computer can store the values of its shares of the arithmetic data item as binary values. If a training computer does not hold one of the arithmetic shares, then the training computer can set the corresponding binary shares equal to zero. For example, the third training computer, which does not hold the second share of the arithmetic data item $x_2$, can determine to set its shares of the second vector $[\![x_2]\!]^B$ equal to zero, i.e., $x_{21}=0$ and $x_{23}=0$. The third training computer can set each bit of its shares of the second vector equal to zero.

This conversion, from the shares of the arithmetic data item $[\![x]\!]^A$ to the shares of the first vector $[\![x_1]\!]^B$, the shares of the second vector $[\![x_2]\!]^B$, and the shares of the third vector $[\![x_3]\!]^B$, can be done with no communication, as each of the computers already store the corresponding share. For example, the first training computer can determine $x_{11}$ and $x_{12}$ since it already stores the first arithmetic share $x_1$. This is described in further detail herein.

After this conversion, from arithmetic shares to shares of vectors of bits, the training computers can determine a binary shared data item $[\![x]\!]^B$ by computing the sum of the shares of the first vector $[\![x_1]\!]^B$, the shares of the second vector $[\![x_2]\!]^B$, and the shares of the third vector $[\![x_3]\!]^B$ (i.e., $[\![x]\!]^B=[\![x_1]\!]^B+[\![x_2]\!]^B+[\![x_3]\!]^B$). The training computers can compute the summation, first with full adders in parallel and then a parallel prefix adder (PPA), which can be computed inside a binary 3PC circuit or, in some embodiments, a Yao 3PC circuit by converting to Yao sharing. The PPA can be used to avoid high round complexity. The PPA can take two inputs (i.e., the outputs of the full adders) and compute the sum of the two inputs, totaling log k rounds and k*log(k) gates. This computation would normally require two addition circuits. However, we show how to keep the cost close to that of a single PPA in both the semi-honest and malicious setting, hence reducing both the round and communication complexity by a factor of two. The computation of the full adder circuits and the parallel prefix adder is described in further detail herein.

This process of converting from arithmetic to binary is more efficient than the above described conversion from arithmetic to binary involving the generation of random binary shares. For example, during the generation of the random binary shares, the training computers communicate with one another during the reveal step, before performing the addition circuits. In contrast, in the bit decomposition process the training computers can determine the vectors of secret-shared bits with no communication, before performing the addition circuits. Since, fewer communications take place, the bit decomposition process is faster than the conversion involving the generation of random binary shares.

Figure 13:
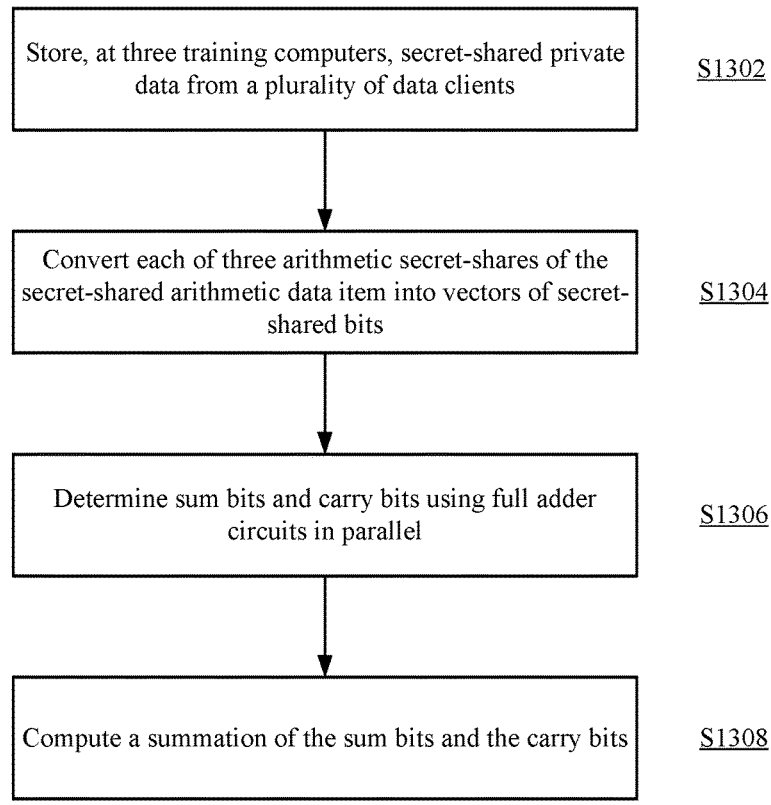
FIG. 13 shows a flowchart of performing a conversion from an arithmetic sharing of a data item into a binary sharing of the data item.

FIG. 13 shows a flowchart of performing a conversion from an arithmetic secret-shared data item into a binary secret-shared data item in the malicious setting. The conversion may take place during a machine learning process, however, it is understood that embodiments of the invention can be applied to other circumstances. Although the steps are illustrated in a specific order, it is understood that embodiments of the invention may include methods that have the steps in different orders. In addition, steps may be omitted or added and may still be within embodiments of the invention.

At step S1302, the three training computers can store secret-shared private data from a plurality of data clients. A data item x can be arithmetically secret-shared among the three training computers. The data item x can be secret-shared in three parts, including a first arithmetic share $x_1$, a second arithmetic share $x_2$, and a third arithmetic share $x_3$, such that each training computer stores two of the three parts. The arithmetic sharing of the data item, $[\![x]\!]^A=(x_1, x_2, x_3)$, can be secret-shared as described herein.

At step S1304, the three training computers can convert each of the three arithmetic secret-shares (i.e., $x_1$, $x_2$, and $x_3$) of the secret-shared arithmetic data item into vectors of secret-shared bits. Each share of the arithmetic data item can be converted into a vector of bits.

The three training computers can convert the first arithmetic share $x_1$ to a first vector. The first vector can be a binary value that is equivalent to the value of the first arithmetic share $x_1$. The first vector can comprise any suitable number of bits (e.g., 64 bits).

The three training computers can then secret-share the first vector as shares of the first vector $[\![x_1]\!]^B$. The shares of the first vector $[\![x_1]\!]^B$ can include three shares $x_{11}$, $x_{12}$, and $x_{13}$, wherein each represent i bits. For example, $x_{11}$ can comprise any suitable number of bits (e.g., 64). The ith bit $x_{11}[i]$ can be secret-shared among the three training computers. Therefore, the first arithmetic share $x_1$ can be represented by 64*3 bits that are secret-shared, i.e., 64 bits of $x_{11}$, 64 bits of $x_{12}$, and 64 bits of $x_{13}$. The shares of the first vector $[\![x_1]\!]^B$ can have the property that the value of the first vector is equal to the shares of the first vector XORed together (i.e., $x_1=x_{11}\oplus x_{12}\oplus x_{13}$). Furthermore, each bit can have this property (i.e., $x_1[i]=x_{11}[i]\oplus x_{12}[i]x_{13}[i]$).

The first training computer, which holds the first arithmetic share $x_1$, can determine the first share of the first vector $x_{11}$ and the second share of the first vector $x_{12}$. The third training computer, which holds the first arithmetic share $x_1$, can determine the third share of the first vector $x_{13}$ and the first share of the first vector $x_{11}$. The training computers that do not hold a particular share of the arithmetic data item (e.g., the first arithmetic share $x_1$) cannot determine the corresponding vector. Thus, said training computer can set their corresponding shares of the vector equal to zero. Converting the arithmetic secret-shares into vectors is described in further detail below, for example, in section VI.A.2.a.

The shares of the vectors (i.e., $[\![x_1]\!]^B$, $[\![x_2]\!]^B$, and $[\![x_3]\!]^B$), respectively stored at each training computer, can be represented as tuples. Each training computer can store a first tuple associated with the shares of the first vector, a second tuple associated with the shares of the second vector, and a third tuple associated with the shares of the third vector, wherein each tuple at each training computer is different based on which shares the training computer stores. For example, the first training computer can store a first tuple, which is associated with the shares of the first vector. The first tuple, at the first training computer, can comprise the first share of the first vector $x_{11}$ and the second share of the first vector $x_{12}$. The first tuple can be denoted as $(x_{11}=x_1, x_{12}=0)$. The first training computer can also store a second tuple $(x_{12}=0, x_{22}=x_2)$, associated with the shares of the second vector, and a third tuple $(x_{31}=0, x_{32}=0)$, associated with the shares of the third vector.

The second training computer can store three tuples including $(x_{12}=0, x_{13}=0)$, $(x_{22}=x_2, x_{23}=0)$, and $(x_{32}=0, x_{33}=x_3)$, associated with the first vector, second vector, and third vector, respectively. The third training computer can store three tuples including $(x_{13}=0, x_{11}=x_1)$, $(x_{23}=0, x_{21}=0)$, and $(x_{33}=x_3, x_{31}=0)$, associated with the first vector, second vector, and third vector, respectively.

Traditionally, the first share of each of the vectors can be summed to determine a first binary share, the second share of each of the vectors can be summed to determine a second binary share, and the third share of each of the vectors can be summed to determine a third binary share. In this case, full adders are chained together to compute the addition of two bits and a carry in bit. However, using a typical ripple-carry full adder (RCFA) circuit to perform the summation of the shares of the first vector $[\![x_1]\!]^B$, the shares of the second vector $[\![x_2]\!]^B$, and the shares of the third vector $[\![x_3]\!]^B$ would require 2 k rounds to compute a first RCFA of the shares of the first vector $[\![x_1]\!]^B$ and the shares of the second vector $[\![x_2]\!]^B$, then compute a second RCFA of the result of the first RCFA and the shares of the third vector $[\![x_3]\!]^B$, i.e., RCFA(RCFA($x_1$, $x_2$), $x_3$), when performing 3PC on binary shared values. Typically, this computation would require two addition circuits, however, we show how to keep the cost close to that of a single PPA in both the semi-honest setting and the malicious setting.

To avoid the high round complexity associated with this technique, the three training computers can first use full adders in parallel to compute sum bits and carry bits and then use a parallel prefix adder (PPA) [31] which can take two inputs (i.e., sum bits and carry bits) and compute the sum of the inputs, totaling log k rounds and k log k gates. The computation of the first shares of each vector of secret-shared bits, described above, can be reduced to computing $2[\![c]\!]^B + [\![s]\!]^B$, as an intermediate step, by executing k independent full adders.

At step S1306, the three training computers can determine sum bits and carry bits using full adder circuits in parallel based on the tuples stored by each training computer. The inputs to the full adder circuit can be the three tuples stored at each training computer. For example, the first training computer can input its first tuple, second tuple, and third tuple into a full adder circuit. Each training computer can input its respective tuples into full adder circuits.

If the vector of secret-shared bits, corresponding to a first arithmetic share, is k bits long, then there can be k full adder circuits operating in parallel. The full adders in parallel can reduce the 3 operands of using full adders in series to 2 operands, while using a single round of communication as opposed to k. Full adder circuits are described in further detail below, for example, in section VI.A.2.b.

At step S1308, after determining the sum bits and the carry bits, the three training computers can compute a summation of the sum bits and the carry bits with a parallel prefix adder to determine the shares of the binary data item. The three training computers can compute two times the carry bit plus the sum bit (i.e., $2[\![c]\!]^B + [\![s]\!]^B$) using a parallel prefix adder, resulting in shares of a binary data item $[\![x]\!]^B$. The parallel prefix adder is described in further detail below, for example, in section VI.A.2.c.

The three training computers can determine shares of a binary data item using the parallel prefix adder. There can be three shares of the binary data item, including a first binary share $x_1^B$, a second binary share $x_2^B$, and a third binary share $x_3^B$. After computing the parallel prefix adder, the first training computer can hold the first binary share $x_1^B$ and the second binary share $x_2^B$ of the binary secret-shared data item. The second training computer can hold the second binary share $x_2^B$ and the third binary share $x_3^B$. The third training computer can hold the third binary share $x_3^B$ and the first binary share $x_1^B$. The first, second, and third binary shares can each be k bits long. In some embodiments, the first, second, and third binary shares can be k+1 bits long due to a carry bit.

In some embodiments, in the semi-honest setting, the first training computer can provide the sum of the first vector and the second vector as private input to a 3PC, such as full adder circuits and/or a parallel prefix adder. The 3PC can compute $[\![x]\!]^B := [\![x_1 + x_2]\!]^B + [\![x_3]\!]^B$. This can be done since the first training computer stores the full value of the first vector and the full value of the second vector, rather than only shares. This can result in a total of 1+log k rounds, which is significantly better than a factor of two increase in rounds and communication, as in previous methods.

a) Converting Arithmetic Secret-Shares into Vectors

To convert arithmetic secret-shares into vectors, the first training computer, which holds the first arithmetic share $x_1$, can set the first share of the first vector $x_{11}$ equal to the value of the first vector (i.e., $x_1$). The first training computer can also set the second share of the first vector $x_{12}$ equal to zero. The conversion from arithmetic secret-shares into vectors of secret-shared bits can be performed in step S1304, described herein. This section provides further details for step S1304.

For example, if the first vector of secret-shared bits is equal to 0011, then the first share of the first vector $x_{11}$ can be equal to 0011. Each bit of the first share of the first vector $x_{11}$ can be shared, i.e., $x_{11}[0]=0$, $x_{11}[1]=0$, $x_{11}[2]=1$, and $x_{11}[3]=1$. Each bit of the second share of the first vector $x_{12}$ is equal to zero, i.e., $x_{12}[0]=0$, $x_{12}[1]=0$, $x_{12}[2]=0$, and $x_{12}[3]=0$. Each bit of the third share of the first vector $x_{13}$ is also equal to zero. Each of the shares of the first vector can be XORed together to obtain the first vector (i.e., $x_1 = x_{11} \oplus x_{12} \oplus x_{13}$).

The training computers can determine the shares of the first vector $[\![x_1]\!]^B$ with no communications. Each training computer can determine its shares of the first vector $[\![x_1]\!]^B$ in parallel. For example, the third training computer, which holds the first arithmetic share $x_1$, can determine the first share of the first vector $x_{11}$ and the third share of the first vector $x_{13}$, independently of the first and second training computers. Further, the second training computer does not have access to the first arithmetic share $x_1$. The second training computer can determine to set the value of its shares of the first vector equal to zero, i.e., set the second share of the first vector $x_{12}$ equal to zero and set the value of the third share of the first vector $x_{13}$ equal to zero, independently of the first and third training computers.

After converting the first arithmetic share $x_1$ to the shares of the first vector $[\![x_1]\!]^B := (x_1, 0, 0)$, the training computers can convert the second arithmetic share $x_2$ to shares of a second vector $[\![x_2]\!]^B := (0, x_2, 0)$. The second arithmetic share $x_2$ can be converted to a second vector of bits, which can then be secret-shared into three shares including $x_{21}=0$, $x_{22}=x_2$, and $x_{23}=0$. $x_{21}$ can denote the first share of the second vector, $x_{22}$ can denote the second share of the second vector, and $x_{23}$ can denote the third share of the second vector.

Since the first training computer and the second training computer both store the second arithmetic share $x_2$, the first training computer and the second training computer can convert the second arithmetic share $x_2$ into the second vector, equal to the value of $x_2$.

Each of the three training computers can determine its two of three shares of the second vector. The first training computer can determine the first share of the second vector $x_{21}$ and the second share of the second vector $x_{22}$. The second training computer can determine the second share of the second vector $x_{22}$ and the third share of the second vector $x_{23}$. The third training computer can determine the third share of the second vector $x_{23}$ and the first share of the second vector $x_{21}$. The shares of the second vector can be determined in a similar manner to the shares of the first vector, as described herein.

The training computers can also convert the third arithmetic share $x_3$ to a third vector of bits, which can then be secret-shared as shares of a third vector $[\![x_3]\!]^B := (0, 0, x_3)$. The third vector can be split into three shares including $x_{31} = 0$, $x_{32} = 0$, and $x_{33} = x_{33} \cdot x_{31}$ can denote the first share of the third vector, $x_{32}$ can denote the second share of the third vector, and $x_{33}$ can denote the third share of the third vector.

Each training computer can determine its two of three shares of the third vector. The first training computer can determine the first share of the third vector $x_{31}$ and the second share of the third vector $x_{32}$. The second training computer can determine the second share of the third vector $x_{32}$ and the third share of the third vector $x_{33}$. The third training computer can determine the third share of the third vector $x_{33}$ and the first share of the third vector $x_{31}$. The shares of the third vector can be determined in a similar manner to the shares of the first vector and the shares of the second vector, as described herein.

In some embodiments, the three training computers can determine the shares of the first vector $[\![x_1]\!]^B$, shares of the second vector $[\![x_2]\!]^B$, and shares of the third vector $[\![x_3]\!]^B$ in any suitable order. For example, the three training computers can determine the shares of the third vector, then the shares of the first vector, and then the shares of the second vector. Furthermore, since the training computers do not need to communicate to determine these shares, each of the three training computers can determine each of the shares in different orders than one another.

b) Full Adder Circuits

Figure 14:
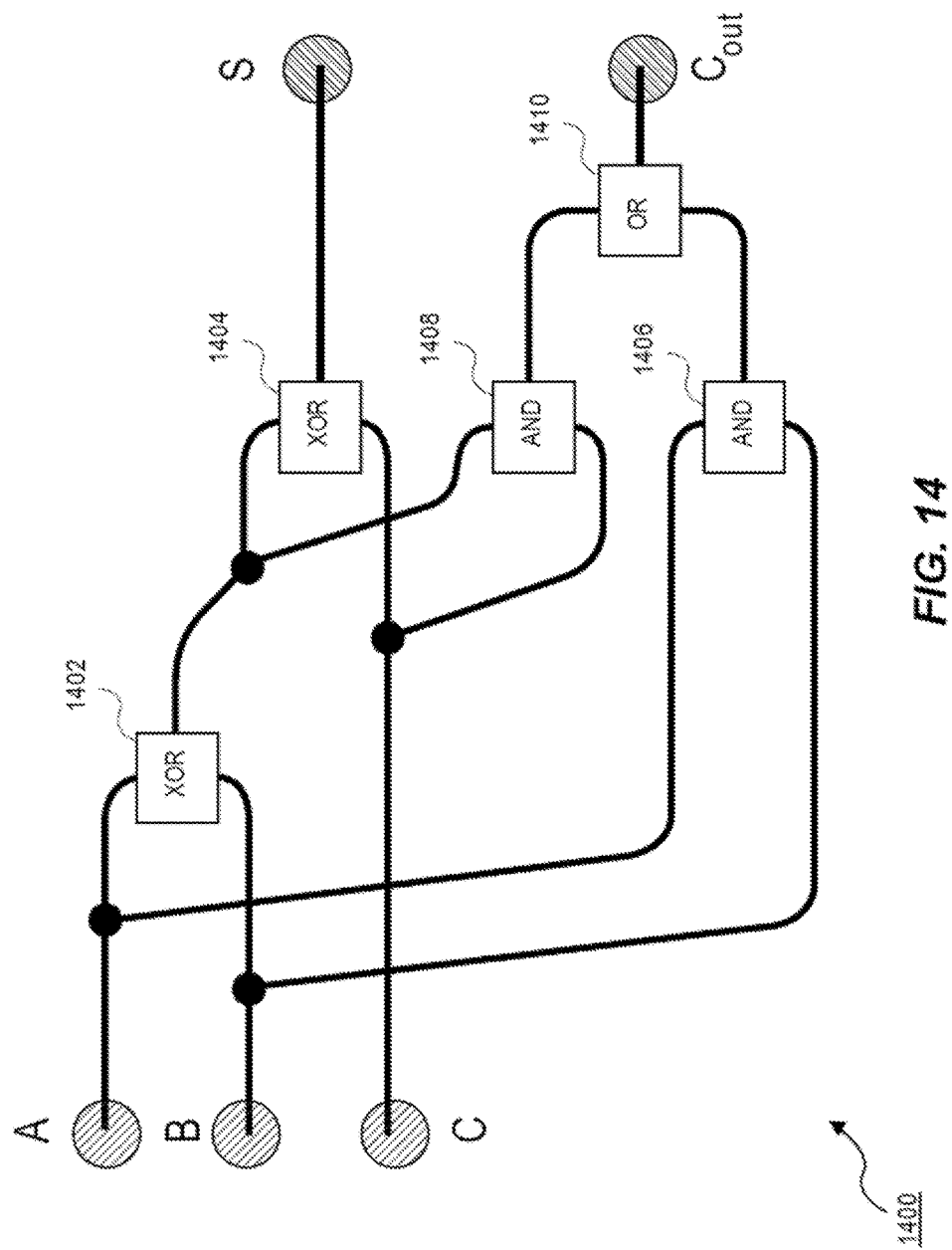
FIG. 14 shows a full adder circuit according to an embodiment of the invention.

FIG. 14 shows a full adder circuit diagram. A full adder circuit 1400 includes a first XOR gate 1402, a second XOR gate 1404, a first AND gate 1406, a second AND gate 1408, and an OR gate 1410. There are three inputs to the full adder circuit 1400, including A, B, and C. There are two outputs from the full adder circuit 1400, including S and $C_{out}$, wherein S is a sum bit and $C_{out}$ is a carry bit. The training computers can evaluate full adder circuits in step S1306, as described herein. This section provides further details for step S1306.

The inputs A, B, and C can be the tuples stored at the training computers. For example, the first training computer can input the first tuple $(x_{11}, x_{12})$, the second tuple $(x_{21}, x_{22})$, and the third tuple $(x_{31}, x_{32})$, corresponding to A, B, and C, respectively. Each training computer can input a first tuple, a second tuple, and a third tuple into full adder circuits, wherein the first tuple, the second tuple, and the third tuple are different for each training computer, as described herein.

The first training computer can input the first bit of each share in each tuple into a full adder circuit. The input A can be the first bit of each share of the first tuple, i.e., $A = (x_{11}[0], x_{12}[0])$. Similarly, the input B can be $(x_{21}[0], x_{22}[0])$ and the input C can be $(x_{31}[0], x_{32}[0])$. The second and third training computers can input the first bit of each share of its tuples into a full adder circuit.

At the first XOR gate 1402, the first training computer can XOR the input A and the input B. The first XOR gate 1402 can be computed by the first training computer locally, since XOR operations can be a binary representation of addition, which can be performed locally. The first training computer can perform the XOR operation using any suitable method described herein. The output of the first XOR 1402 can be a tuple. For example, a first element of the resulting tuple can be the first share of the first vector $x_{11}$ XOR the first share of the second vector $x_{21}$. A second element of the resulting tuple can be the second share of the first vector $x_{12}$ XOR the second share of the second vector $x_{22}$. Thus, the resulting tuple can be $(x_{11} \oplus x_{21}, x_{12} \oplus x_{22})$. Since the first share of the second vector $x_{21}$ and the second share of the first vector $x_{12}$ are both equal to zero, the resulting tuple is equivalent to $(x_{11}, x_{22})$. Each training computer can XOR the first bit of the first tuple and the second tuple. For example, the second training computer can compute $(x_{12}, x_{13}) \oplus (x_{22}, x_{23})$, which can be equivalent to $(x_{12} \oplus x_{22}, x_{13} \oplus x_{23})$, which can simplify to $(x_{22}, 0)$.

At the second XOR gate 1404, the first training computer can XOR the input C with the result of the first XOR gate 1402. The second XOR gate 1404 can be computed in a similar manner to the first XOR gate 1402. For example, the first training computer can XOR the third tuple $(x_{31}, x_{32})$ and the tuple resulting from the first XOR gate 1402 $(x_{11}, x_{22})$, i.e., $(x_{31} \oplus x_{11}, x_{32} \oplus x_{22}) = (x_{11}, x_{22})$. Each training computer can compute the second XOR gate 1404 locally.

The output tuple of the second XOR gate 1404 is equivalent to shares of a sum bit, i.e., the output S. Specifically, the first element of the first training computer's output of the second XOR gate 1404 is a first share of the sum bit, while the second element of the first training computer's output of the second XOR gate 1404 is a second share of the sum bit.

The output of the second XOR gate 1404 can include two of three shares of the sum bit at each training computer, wherein each training computer stores a different two of three shares of the sum bit. For example, the first training computer can store the first share of the sum bit $S_1$ and the second share of the sum bit $S_2$. The second training computer can store the second share of the sum bit $S_2$ and the third share of the sum bit $S_3$. The third training computer can store the third share of the sum bit $S_3$ and the first share of the sum bit $S_1$.

At the first AND gate 1406, the first training computer can AND the input A and the input B. The AND operation can be similar to a multiplication of two arithmetic values. For example, as described herein, the multiplication of x and y can be equal to z, wherein the shares of z are: $z_1 := x_1 y_1 + x_1 y_2 + x_2 y_1 + \alpha_1$, $z_2 := x_2 y_2 + x_2 y_3 + x_3 y_2 + \alpha_2$, and $z_3 := x_3 y_3 + x_3 y_1 + x_1 y_3 + \alpha_3$. At the first AND gate 1406, the first training computer can multiply the elements of the two input tuples, A and B, such that $x_{11} x_{22} + x_{11} x_{32} + x_{31} x_{22}$, which can simplify to $x_{11} x_{22}$ since $x_{31} = 0$ and $x_{32} = 0$. Each training computer can multiply the values in the input tuples as described herein.

The three training computers can then generate a zero sharing of $\alpha_1$, $\alpha_2$ and $\alpha_3$, as described herein. Each training computer can add their output from the first AND gate 1406 with its share of the zero sharing values (i.e., $\alpha_1$, $\alpha_2$ or $\alpha_3$). By adding the zero sharing value, the training computer can obfuscate the output of the first AND gate 1406. The training computers can then reveal their obfuscated output to one other training computer, as described herein. For example, the first training computer can send its obfuscated output to the second training computer and can receive an obfuscated output from the third training computer. Now, each training computer can store two of three outputs of the first AND gate 1406. The two outputs can make up a tuple.

At the second AND gate 1408, the first training computer can AND the result of the first XOR gate 1402 and the input C. The second AND gate 1408 can be computed in a similar manner to the first AND gate 1406, wherein the AND operation is performed locally, and the training computer communicates with the other two training computers to determine zero sharing values, and wherein each training computer reveals its obfuscated output to one other training computer.

At the OR gate 1410, the first training computer can perform can OR the output of the first AND gate 1406 and the output of the second AND gate 1408. The OR gate 1410 can be performed in a similar manner to the first AND gate 1406 and the second AND gate 1408. For example, during the OR gate 1410, the three training computers can generate zero sharing values and obfuscate their shares before revealing their shares to one other training computer.

The output of the OR gate 1410 can be a tuple comprising shares of a carry bit. For example, for the first training computer, the first element of the tuple is a first share of a carry bit $c_1$ and the second element of the tuple is a second share of the carry bit $c_2$. The second training computer can store the second share of the carry bit $c_2$ and a third share of the carry bit $c_3$. The third training computer can store the third share of the carry bit $c_3$ and the first share of the carry bit $c_1$.

After the training computers compute the shares of the sum bits and the carry bits from each of the k independent full adder circuits in parallel, the three training computers can compute the sum of the sum bits and the carry bits using a parallel prefix adder.

c) Full Adder Circuit with a Parallel Prefix Adder

Figure 15:
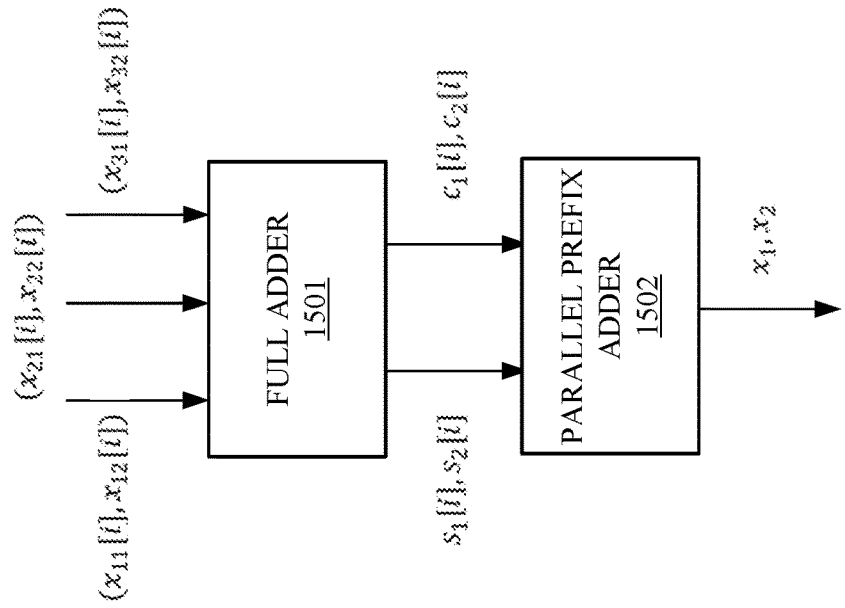
FIG. 15 shows a block diagram of a full adder circuit and a parallel prefix adder.

FIG. 15 shows a block diagram of a full adder circuit and a parallel prefix adder. FIG. 15 includes a full adder 1501 and a parallel prefix adder 1502. The inputs to the full adder 1501 can include the tuples stored at a training computer. In this case, the tuples stored at the first training computer are shown. Each bit i can be inputted into a unique full adder 1501. For example, if there are 64 bits in each of the tuples, then there can be 64 full adders. The full adder 1501 can include logic in any suitable manner described herein. For example, the full adder 1501 can have the logic as described in the full adder logic table above. The training computers can evaluate the parallel prefix adder at step S1308, as described herein. This section provides further details for step S1308.

The outputs of the full adder 1501 can be the sum bits and the carry bits, as described herein, which can be the inputs to the parallel prefix adder 1502. The parallel prefix adder 1502 can be used by the three training computers to determine two times the carry bits plus the sum bits, wherein each bit of the carry bits and each bit of the sum bits are added together. The output of the parallel prefix adder can be shares of a binary data item $[\![ x ]\!]^B$, including a first binary share $x_1^B$, a second binary share $x_2^B$, and a third binary share $x_3^B$.

The parallel prefix adder can include XOR gates, AND gates, and OR gates. In some embodiments, a parallel prefix adder can include any suitable gates. The training computers can perform the XOR gates, AND gates, and OR gates in the parallel prefix adder as described herein. For example, a training computer can perform an XOR gate locally, and can communicate with the other training computers to perform an AND gate. The parallel prefix adder can have a circuit depth. In some embodiments, the parallel prefix adder can have a circuit depth equal to log(k) gates, where k is the number of input bits. Each training computer can input respective two of three shares of the sum bits as well as respective two of three shares of the carry bits into the parallel prefix adder. The parallel prefix adder can be computed in any suitable manner described herein.

3. Arithmetic to Binary with a Single Bit

The conversion from arithmetic to binary can be further improved when the arithmetic shared data item is a single bit i. This special case of arithmetic to binary can be referred to as bit extraction and can be denoted as $[\![ x ]\!]^A \rightarrow [\![ x[i] ]\!]^B$. The cost of this conversion is shown in the second row of FIG. 12. Bit extraction can occur when a single bit of the arithmetic shared data item $[\![ x ]\!]^A$ should be decomposed into a binary shared data item (e.g. the ith bit of $[\![ x[i] ]\!]^B$). This case can be optimized such that O(i) AND gates and O(log i) rounds are required. This optimization can remove unnecessary gates from the parallel prefix adder. As a result the circuit logic can use 2i AND gates. For brevity, we refer the reader to inspect [31] to deduce exactly which gates can be removed.

B. Binary to Arithmetic:

The next conversion, binary to arithmetic, can be referred to as bit composition and can be denoted as $[\![ x ]\!]^B \rightarrow [\![ x ]\!]^A$. The cost of the conversion from binary to arithmetic is shown in the third row of FIG. 12. Bit composition can occur when a k bit binary secret-shared data item is converted into an arithmetic secret-shared data item. During a machine learning process it can be beneficial to convert between different secret-sharing representations. Some functions can be efficiently instantiated when using both arithmetic secret-shared data items and binary secret-shared data items. A circuit similar to the circuit used for arithmetic to binary conversations can be used with the order of operations altered. Next, we describe an efficient conversion from a binary secret-shared data item to an arithmetic secret-shared data item.

Figure 16:
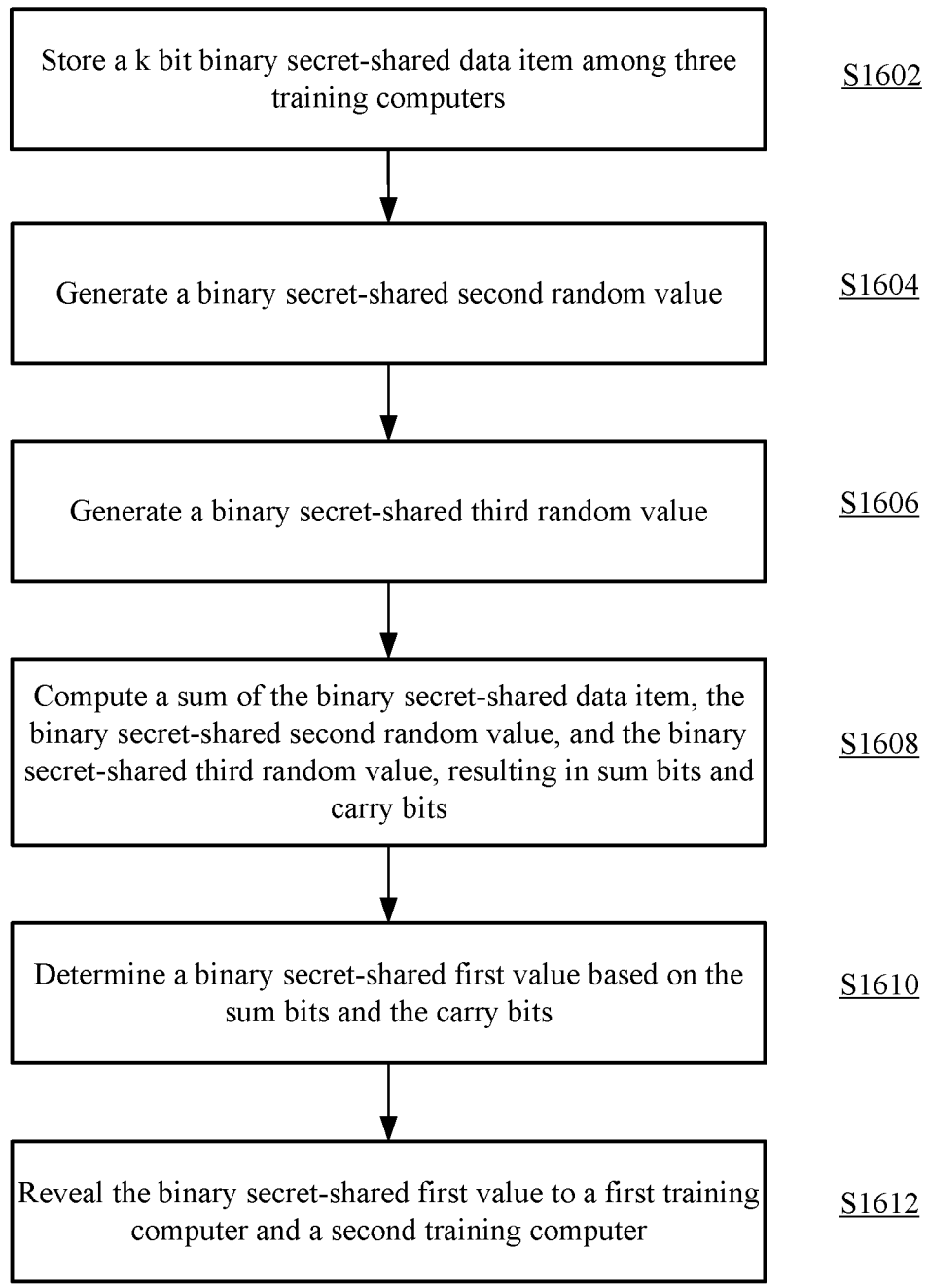
FIG. 16 shows a flowchart of performing a conversion a binary sharing of a data item into an arithmetic sharing of the data item.

FIG. 16 shows a flowchart of performing a conversion from a binary secret-shared data item to an arithmetic secret-shared data item. The method illustrated in FIG. 16 will be described in the context of converting a binary secret-shared data item into an arithmetic secret-shared data item as part of training a machine learning model to determine weights. It is understood, however, that embodiments of the invention can be applied to other circumstances where a conversion from binary to arithmetic is needed. Although the steps are illustrated in a specific order, it is understood that embodiments of the invention may include methods that have the steps in different orders. In addition, steps may be omitted or added and may still be within embodiments of the invention.

At step S1602, three training computers can store a k bit binary secret-shared data item among the three training computers. The data item can be secret-shared using any suitable method described above. In some embodiments, the k bit binary secret-shared data item can be a result of previous computations. For example, the three training computers can initially store an arithmetic secret-shared data item. The training computers can convert the arithmetic secret-shared data item into a binary secret-shared data item using methods described herein. Each of the three training computers can store the binary secret-shared data item and then perform operations using the binary secret-shared data item. Some functions can be more easily performed on binary values rather than arithmetic values, such as during logistic regression or neural network training. The three training computers can then determine to convert the binary secret-shared data item, or a newly determined k bit binary secret-shared data item, into an arithmetic secret-shared data item.

At step S1604, the second training computer can generate a binary secret-shared second random value $[\![ -x_2 ]\!]^B$. The second training computer can generate the binary secret-shared second random value $[\![ -x_2 ]\!]^B$ in conjunction with the first training computer, using any suitable method described herein. For example, the first training computer and the second training computer can generate the binary secret-shared second random value $[\![-x_2]\!]^B$ using pre-shared secret keys and a PRF. The second training computer can store a second part $-x_{22}$ and a third part $-x_{23}$ of the binary secret-shared second random value $[\![-x_2]\!]^B$.

Additionally, the first training computer and the second training computer can both store the full value of the binary secret-shared second random value $[\![-x_2]\!]^B$ (i.e., $-x_2$). This can be done using the reveal all protocol, described herein. The second training computer can transmit the third part $-x_{23}$ to the first training computer. The first training computer can transmit the first part $-x_{21}$ to the second training computer. The first and second training computers can determine the binary second random value $-x_2$ based on the first part $-x_{21}$, the second part $-x_{22}$, and the third part $-x_{23}$.

At step S1606, after generating the binary secret-shared second random value $[\![-x_2]\!]^B$, the second training computer can generate a binary secret-shared third random value $[\![-x_3]\!]^B$. The second training computer can generate the binary secret-shared third random value $[\![-x_3]\!]^B$ in conjunction with the third training computer, using any suitable method described herein. The second training computer can store a second part $-x_{32}$ and a third part $-x_{33}$ of the binary secret-shared third random value $[\![-x_3]\!]^B$.

Additionally, the second training computer and the third training computer can both store the full value of the binary secret-shared third random value $[\![-x_3]\!]^B$ (i.e., $-x_3$). This can be done using the reveal all protocol, described herein. For example, the second training computer can transmit the second part $-x_{32}$ to the third training computer. The third training computer can transmit the first part $-x_{31}$ to the third training computer. The second and third training computers can determine the binary third random value $-x_3$ based on the first part $-x_{31}$, the second part $-x_{32}$, and the third part $-x_{33}$.

The binary secret-shared second random value and the binary secret-shared third random value can be part of the final arithmetic share. For example, $-x_2$ can be determined to be a second arithmetic share, while $-x_3$ can be determined to be third arithmetic share.

At step S1608, the second training computer can compute a sum of the binary secret-shared data item $[\![x]\!]^B$, the binary secret-shared second random value $[\![-x_2]\!]^B$, and the binary secret-shared third random value $[\![-x_3]\!]^B$. This computation can be performed jointly between the first training computer, the second training computer, and the third training computer using a full adder circuit, as described herein, resulting in carry bits c[i] and sum bits s[i]. For example, the training computers can compute
$FA([\![x[i]]\!]^B, [\![-x_2[i]]\!]^B, [\![-x_3[i]]\!]^B) \rightarrow ([\![c[i]]\!]^B, [\![s[i]]\!]^B)$
for $i \in \{1, \ldots, k-1\}$. There can be i full adder circuits, corresponding to the i bits of each share.

At step S1610, after determining the carry bits c[i] and the sum bits s[i], the second training computer can determine a binary secret-shared first value $[\![x_1]\!]^B$ based on the carry bits c[i] and the sum bits s[i] using a parallel prefix adder, as described herein. The second training computer can compute the sum of two times the carry bits and the sum bits using the parallel prefix adder in conjunction with the first training computer and the third training computer. In other words, the three training computers can use a parallel prefix adder to compute $[\![x_1]\!]^B := 2 [\![c]\!]^B + [\![s]\!]^B$. The parallel prefix adder can be performed in series, after the full adder circuits, as described in FIG. 15.

In some embodiments, in the semi-honest setting, this can be further optimized by the second training computer determining $(-x_2-x_3)$ locally. The three training computers can then compute $[\![x_1]\!]^B := [\![x]\!]^B + [\![-x_2-x_3]\!]^B$ using a parallel prefix adder.

At step S1612, after computing $[\![x_1]\!]^B$, the shares of $[\![x_1]\!]^B$ can be revealed to the first training computer and the third training computer. Since, the first training computer and the third training computer both hold all of the shares of the binary secret-shared first value $[\![x_1]\!]^B$, the first training computer and the second training computer can determine $x_1$. Similarly, the first training computer and the second training computer both hold the binary secret-shared second random value $[\![-x_2]\!]^B$ and therefore both hold $-x_2$. Furthermore, the second training computer and the third training computer both hold the secret-shared third random value $[\![-x_3]\!]^B$ and therefore both hold $-x_3$. The final sharing can be defined as $[\![x]\!]^A := (x_1, x_2, x_3)$. Overall, the conversion can be performed in $1+\log k$ rounds and $k+k \log k$ gates.

In some embodiments, after converting the binary secret-shared data item to an arithmetic secret-shared data item, the training computers can perform other machine learning processes using the arithmetic secret-shared data item.

The conversion from binary to arithmetic can be further improved when the binary shared data item is a single bit. This special case of binary to arithmetic can be referred to as bit injection and can be denoted as $[\![x]\!]^B \rightarrow [\![x]\!]^A$. The cost of this conversion is shown in the fourth row of FIG. 12. Bit injection can be a special case of bit composition. Bit injection can occur when a single bit x encoded in a binary sharing $[\![x]\!]^B$ needs to be converted to an arithmetic sharing $[\![x]\!]^A$. For ease of presentation we defer the explanation of this technique to Section VII where a generalization of it is presented. In particular, we show how to efficiently compute $a[\![x]\!]^B \rightarrow [\![ax]\!]^A$.

C. Yao to Binary:

Another conversion is Yao to binary, which can be denoted as $[\![x]\!]^Y \rightarrow [\![x]\!]^B$. The cost of the conversion from Yao to binary is shown in the fifth row of FIG. 12. The conversion from Yao to binary can occur when a Yao secret-shared data item is converted into a binary secret-shared data item. As observed in [21], the least significant bit of the keys (i.e., a permutation bit $p_x$) can form a two-party sharing of x. The permutation bit $p_x$ can be the least significant bit of each key. A Yao shared data item can be secret-shared in any suitable method described herein.

The first training computer can be an evaluator. The second training computer and the third training computer can be garblers. The second training computer and the third training computer can exchange a random seed that can be used to generate the keys used by the garbled circuit, for example, a first key $k_x^0[0]$ and a second key $k_x^1[0]$. The first key $k_x^0[0]$ and the second key $k_x^1[0]$ can be random keys assigned to each wire in the circuit corresponding to the values 0 and 1, respectively, as described herein. Further, the first key $k_x^0[0]$ can be XORed with a global random $\Delta$ to determine the second key $k_x^1[0]$ (i.e., $k_x^1[0] = k_x^0[0] \oplus \Delta$).

A choice key $k_x^x$ can correspond to the data item x. A Yao secret-shared data item x can be shared such that $x \oplus p_x = k_x^x$ [0] where $p_x = k_x^0[0]$. The first training computer can store a choice key $k_x^x[0]$. The second training computer and the third training computer can store the permutation bit $p_x$. In some embodiments, the second training computer and the third training computer can store the same shares of the Yao shared data item.

The choice key $k_x^x$, the first key $k_x^0$, and the second key $k_x^1$ can each be a string of bits of any suitable length. For example, the choice key $k_x^x$ can be 80 bits long. The global random $\Delta$ can be any suitable length, for example, 80 bits.

In some embodiments, the choice key $k_x^x$, the first key $k_x^0$, the second key $k_x^1$, and the global random $\Delta$ can be the same length. In some embodiments, the training second training computer and the third training computer can set the least significant bit of the global random $\Delta$ equal to 1, thus allowing the point-and-permute techniques of [12] to be performed.

The first training computer can hold the choice key $k_x^x[0]$, but does not know if it corresponds to the case x=0 or x=1. The second and third training computers both hold the first key $k_x^0[0]$, corresponding to x=0, and the second key $k_x^1[0]$, corresponding to x=1, but do not know which of the two keys corresponds to the choice key $k_x^x[0]$ held by the first training computer.

Figure 17:
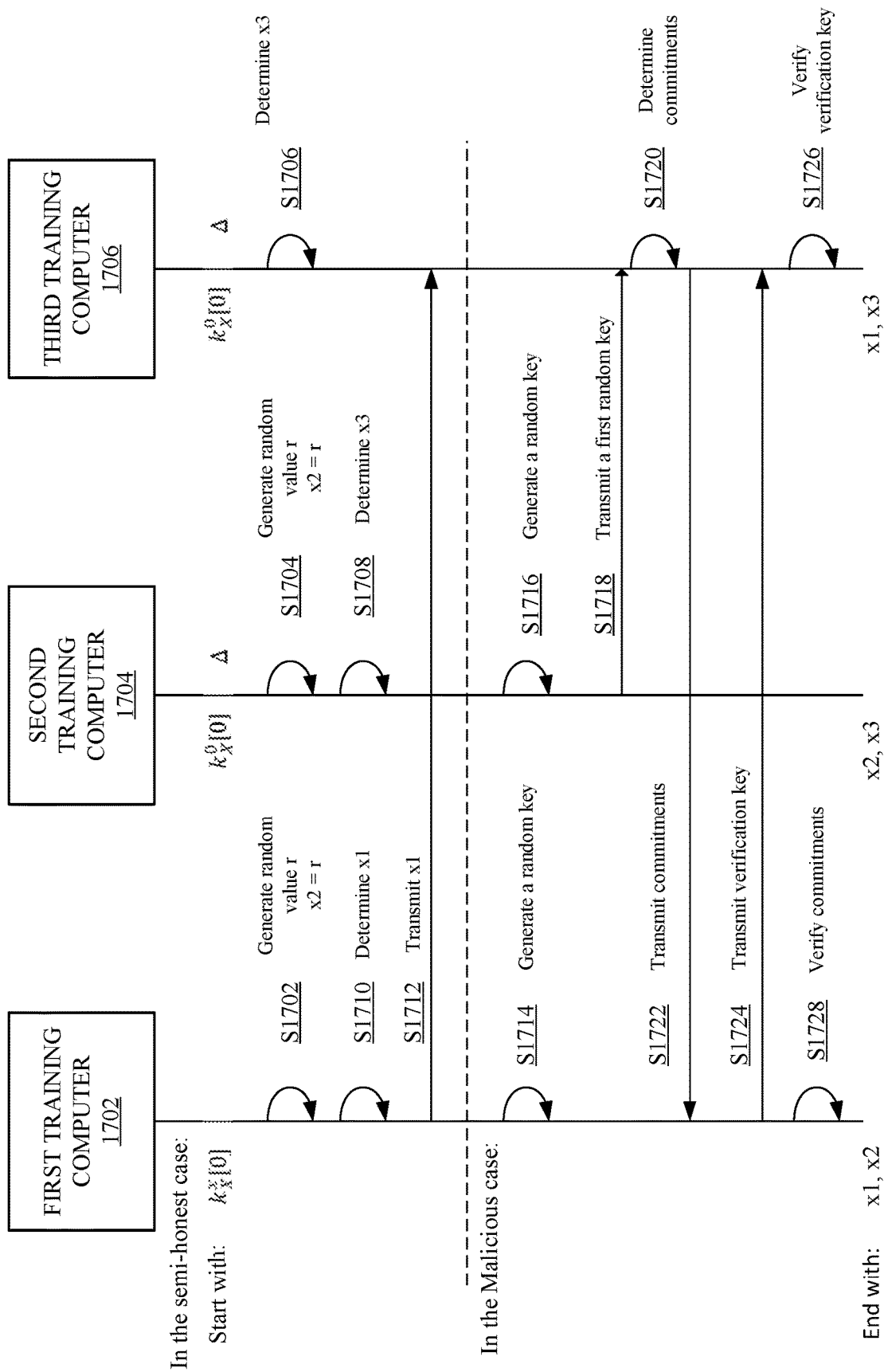
FIG. 17 shows a flowchart of performing a conversion a Yao sharing of a data item into a binary sharing of the data item.

FIG. 17 shows a method of performing a conversion from Yao to binary. The method illustrated in FIG. 17 will be described in the context of converting a Yao secret-shared data item to a binary secret-shared data item as part of training a machine learning model, however, it is understood that embodiments of the invention can be applied to other circumstances. Although the steps are illustrated in a specific order, it is understood that embodiments of the invention may include methods that have the steps in different orders. In addition, steps may be omitted or added and may still be within embodiments of the invention.

Prior to step S1702, the three training computers can store a Yao secret-shared data item. The first training computer 1702 can store the choice key $k_x^x[0]$, the second training computer 1704 and the third training computer 1706 can both store the first key $k_x^0[0]$ and the second key $k_x^1[0]$. The least significant bit of the first key $k_x^0[0]$ can be the permutation bit $p_x$. The second key $k_x^1[0]$ can be equal to the first key $k_x^0[0]$ XORed with the global random $\Delta$ (i.e., $k_x^0[0] \oplus \Delta$), as described herein.

1. Semi-Honest Setting

At steps S1702-S1704, the first training computer 1702 and the second training computer 1704 can both locally generate a random value r using any suitable method described herein. The random value r can be a random bit. In some embodiments, the random value r can comprise any suitable number of bits, such as the same number of bits as the keys. The first training computer 1702 and the second training computer 1704 can determine a new second share $x_2$, which can be set equal to the random value r. The new second share $x_2$ can be a second share of a binary data item $[\![x]\!]^B$, since two of the three training computers store the new second share $x_2$. The binary data item $[\![x]\!]^B$ can be a single secret-shared bit. In some embodiments, the binary data item $[\![x]\!]^B$ can be a vector of secret-shared bits, wherein the operations described herein can be performed for every bit of the vector of bits, i.e., a number of Yao shares can be converted into the vector of secret-shared bits.

At step S1706, the third training computer 1706 can determine a new third share $x_3$, which can be set equal to the permutation bit $p_x$. The third training computer 1706 can determine the new third share $x_3$ concurrently with steps S1702-S1704.

At step S1708, the second training computer 1704 can determine the new third share $x_3$, which can be set equal to the permutation bit $p_x$. The second training computer 1704 can determine the new third share $x_3$, before determining the new second share $x_2$. The new third share $x_3$ can be a third share of a binary data item $[\![x]\!]^B$, since two of the three training computers store the new third share $x_3$.

At step S1710, the first training computer 1702 can determine a new first share $x_1$. The new first share $x_1$ can be determined to be equal to the choice key $k_x^x[0]$ XORed with the random bit (i.e., $x_1[0]=k_x^x[0] \oplus r$). Since the choice bit $k_x^x[0]$ is equal to the data item x XORed with the permutation bit $p_x$, the training computer has computed $x_1[0]=k_x^x[0] \oplus r = x \oplus p_x \oplus r$.

At step S1712, the first training computer 1702 can then send the new first share $x_1$ (where $x_1=k_x^x \oplus r = x \oplus p_x \oplus r$) to the third training computer 1706. This yields the three-party sharing defined as $[\![x]\!]^B=(x \oplus p_x \oplus r, r, p_x)$ in a single round and one bit of communication. The one bit of communication can be the new first share $x_1$. The binary data item $[\![x]\!]^B$ can comprise the new first share $x_1$, the new second share $x_2$, and the new third share $x_3$. According to this three-party sharing, the first training computer 1702 can store $x_1=x \oplus p_x \oplus r$ and $x_2=r$, the second training computer 1704 can store $x_2=r$ and $x_3=p_x$, and the third training computer 1706 can store $x_1=x \oplus p_x \oplus r$ and $x_3=p_x$.

The data item x is now binary secret-shared. For example, the data item x can be equivalent to the new first share $x_1$ XOR the new second share $x_2$ XOR the new third share $x_3$ (i.e., $x=x_1 \oplus x_2 \oplus x_3$). In terms of the permutation bit $p_x$ and the random value r, the data item x can be equivalent to $(x \oplus p_x \oplus r) \oplus r \oplus p_x$. When reconstructing the data item, the random value r gets XORed with itself, thus, equaling zero. In this way, the data item x can be obfuscated when it is secret-shared by the random value r, but can be revealed using all three shares of the data item.

As an example, a Yao secret-shared data item x can equal to a value of 1. The permutation bit $p_x$ can be equal to a value of 0. Therefore, since $x \oplus p_x=k_x^x[0]$, the choice key $k_x^x[0]=1$. The first training computer 1702 and the second training computer 1704 can generate a random value r, for example, r=1. The first training computer 1702 and the second training computer 1704 can set the new second share $x_2$ equal to a value of 1 (i.e., $x_2=r=1$).

The second training computer 1704 and the third training computer 1706 can set the new third value $x_3$ equal to a value 0, since the permutation bit $p_x=0$. Then, the first training computer 1702 can determine the new first share as $x_1=k_x^x \oplus r$ which is $x_1=1 \oplus 1=0$. The first training computer 1702 can then transmit $x_1=0$ to the third training computer 1706. The new shares, that make up the binary share, comprise $x_1=0$, $x_2=1$, and $x_1=0$. The binary shared data item $[\![x]\!]^B=x_1 \oplus x_2 \oplus x_3=0 \oplus 1 \oplus 0=1$, which is equivalent to the initial Yao secret-shared data item x=1.

2. Malicious Setting

The training computers can perform a commitment scheme as described herein. A commitment scheme can allow a training computer to commit to a chosen value, while keeping the chosen value secret. In this way, a key can be obfuscated and confirmed. The third training computer 1706 can receive a verification key $k_y^{x \oplus r}$ without receiving the choice key $k_x^x$ or learning information regarding the choice key $k_x^x$. The third training computer 1706 can also verify that the verification key $k_y^{x \oplus r}$ is in the set comprising a first commitment key and a second commitment key $\{k_y^0, k_y^1\}$.

In some embodiments, in the malicious setting, the bit of the new first share $x_1=x \oplus p_x \oplus r$, that the first training computer 1702 transmits to the third training computer 1706, can be authenticated to ensure that the first training computer 1702 behaves honestly. For example, the first training computer 1702 can be corrupted by a malicious party and transmit the wrong value to the third training computer 1706. The following steps can allow the training computers verify the value sent by the first training computer 1702, in a privacy-preserving manner. The verification steps in the malicious setting can be performed after steps S1702-S1712.

At steps S1714-S1716, the first training computer 1702 and the second training computer 1704 can generate a random key $k_R^r \leftarrow \{0,1\}^\kappa$. The first training computer 1702 and the second training computer 1704 can generate the random key $k_R^r$ using any suitable method described herein. For example, the first training computer 1702 and the second training computer 1704 can generate the random key $k_R^r$ using a PRF and pre-shared secret-keys.

At step S1718, after generating the random key $k_R^r$, the second training computer 1704 can determine a first random key $k_R^0$ based on the random key $k_R^r$, the random value r, and the global random $\Delta$. The second training computer 1704 can compute the first random key $k_R^0$ by XORing the random key $k_R^0$ with the product of the random value r and the global random $\Delta$ (i.e., $k_R^0 := k_R^r \oplus r\Delta$)). After determining the first random key $k_R^0$, the second training computer 1704 can transmit the first random key $k_R^0$ to the third training computer 1706. The second training computer 1704 can transmit the first random key $k_R^0$ to the third training computer 1706 since the third training computer 1604 does not know the random value r, previously generated by the first raining computer 1602 and the second training computer 1704.

At step S1720, after receiving the first random key $k_R^0$ from the second training computer 1704, the third training computer 1706 can determine a first commitment key $k_y^0$, and a second commitment key $k_y^1$. The third training computer 1706 can determine the first commitment key $k_y^0$ to be equal to the first key $k_X^0$ XORed with the first random key $k_R^0$ (i.e., $k_y^0 = k_X^0 \oplus k_R^0$). The third training computer 1706 can determine the second commitment key $k_y^1$ to be equal to the first key $k_X^0$ XORed with the first random key $k_R^0$ XORed with the global random $\Delta$ (i.e., $k_y^1 = k_X^0 \oplus k_R^0 \oplus \Delta$).

At step S1722, after determining the first commitment key $k_y^0$ and the second commitment key $k_y^1$, the third training computer 1706 can transmit commitments of the first commitment key $k_y^0$ and the second commitment key $k_y^1$ to the first training computer 1702. In this way, the first training computer 1702 can receive keys that the third training computer 1706 has committed to. The third training computer 1706 cannot change the commitment keys later since the first training computer 1702 has received them.

At step S1724, after receiving the commitments of the first commitment key $k_y^0$ and the second commitment key $k_y^1$, from the third training computer 1706, the first training computer 1702 can determine a verification key $k_y^{x \oplus r}$ based on the choice key $k_X^x$ and the random key $k_R^r$. The first training computer 1702 can determine the verification key $k_y^{x \oplus r}$ by computing the choice key $k_X^x$ XOR the random key $k_R^r$ (i.e., $k_X^x \oplus k_R^r$). After determining the verification key $k_y^{x \oplus r}$, the first training computer 1702 can transmit the verification key $k_y^{x \oplus r}$ to the third training computer 1706. The verification key $k_y^{x \oplus r}$ can either be equal to the first commitment key $k_y^0$, or the second commitment key $k_y^1$.

At step S1726, after receiving the verification key $k_y^{x \oplus r}$ from the first training computer 1702, the third training computer 1706 can verify that the verification key $k_y^{x \oplus r}$ is in a set comprising the first commitment key and the second commitment key $\{k_y^0, k_y^1\}$. If the third training computer 1706 determines that the verification key $k_y^{x \oplus r}$ is in the set $\{k_y^0, k_y^1\}$, then the third training computer 1706 can determine that the new first share $x_1$ is valid. In some embodiments, if the third training computer 1706 determines that the verification key $k_y^{x \oplus r}$ is not in the set $\{k_y^0, k_y^1\}$, then the third training computer 1706 can abort the process. The third training computer 1706 can transmit a message to the first training computer 1702 and the second training computer 1704 indicating that it has received an incorrect the verification key $k_y^{x \oplus r}$. The message can include instructions to abort the process.

At step S1728, the first training computer 1702 can verify that the commitment $Comm(k_y^{x \oplus r})$ sent by the third training computer 1706 decommits to the verification key $k_y^{x \oplus r}$. The commitment $Comm(k_y^{x \oplus r})$ can be either the first commitment key $k_y^0$ or the second commitment key $k_y^1$. If the first training computer 1702 determines that the commitment $Comm(k_y^{x \oplus r})$ decommits to the verification key $k_y^{x \oplus r}$, then the first training computer 1702 can determine that the third training computer did not change its commitment. If the first training computer 1702 determines that the commitment $Comm(k_y^{x \oplus r})$ does not decommit to the verification key $k_y^{x \oplus r}$, then the first training computer 1702 can transmit a message to the second training computer 1704 and the third training computer 1706 indicating that it has received an incorrect $Comm(k_y^{x \oplus r})$. The message can include instructions to abort the process.

In some embodiments, the first training computer 1702 can verify that the commitment $Comm(k_y^{x \oplus r})$ sent by the third training computer 1706 decommits to the verification key $k_y^{x \oplus r}$ while the third training computer 1706 verifies that the verification key $k_y^{x \oplus r}$ is in the set comprising the first commitment key and the second commitment key $\{k_y^0, k_y^1\}$.

The training computers can then compute the three-party sharing $[\![x]\!]^B = (x \oplus p_x \oplus r, r, p_x)$. The third training computer 1706 can compute the new first share as $x_1 = x \oplus p_x \oplus r = k_y^{x \oplus r}[0] \oplus p_R$. In total, this conversion can take two rounds of communication, however the final sharing $[\![x]\!]^B$ is computable after a single round. Therefore, it is ok to use $[\![x]\!]^B$ after the first round so long as dependent values are not revealed in that round. In some embodiments, the verification steps can fail. If a training computer determines that the verification steps have failed, then the training computers can abort the process.

D. Binary to Yao:

Another conversion is binary to Yao, which can be denoted as $[\![x]\!]^B \rightarrow [\![x]\!]^Y$. The cost of the conversion from binary to Yao is shown in the sixth row of FIG. 12. The conversion from a binary secret-shared data item to a Yao secret-shared data item can be performed using a garbled circuit. The three training computers can convert the binary shares, which can comprise bits, into Yao shares, which can also comprise bits.

The training computers can Yao share their shares of the binary share $[\![x]\!]^B$ using a garbled circuit. For example, the first training computer, which stores $x_1$, can Yao share $x_1$ among the three training computers, resulting in first shares of a Yao secret-shared data item $[\![x_1]\!]^Y$. The second training computer can Yao share $x_2$ among the three training computers, resulting in second shares of a Yao secret-shared data item $[\![x_2]\!]^Y$. The third training computer can Yao share $x_3$ among the three training computers, resulting in third shares of a Yao secret-shared data item $[\![x_3]\!]^Y$. In some embodiments, the garbled circuits can be implemented in any suitable manner as described in [40].

Recall that a Yao secret-shared data item can include a choice key, a first key, and a second key. Two of the three training computers can store the first key and the second key. One of the three training computers can store the choice key. In some embodiments, the training computer that receives the choice key can be predetermined. For example, before receiving the data items, the three training computers can receive instructions indicating that the first training computer should receive the choice key and that the second and third training computers should both receive the first key and the second key.

The Yao secret-shared data item $[\![x]\!]^Y$ can be equal to the first shares $[\![x_1]\!]^Y$ XORed with the second shares $[\![x_2]\!]^Y$ XORed with the third shares $[\![x_3]\!]^Y$ (i.e., $[\![x]\!]^Y := [\![x_1]\!]^Y \oplus [\![x_2]\!]^Y \oplus [\![x_3]\!]^Y$). The training computers can determine the Yao secret-shared data item $[\![x]\!]^Y$ using a garbled circuit. For example, the first training computer can locally compute its shares of the Yao secret-shared data item $[\![x]\!]^Y$ by computing $[\![x]\!]^Y := [\![x_1]\!]^Y \oplus [\![x_2]\!]^Y \oplus [\![x_3]\!]^Y$ using a garbled circuit. The first training computer can reveal shares of the Yao secret-shared data item $[\![x]\!]^Y$ to the second training computer and the third training computer using any suitable method described herein.

In some embodiments, in the semi-honest setting, this can be further optimized since the second training computer holds $x_2$ and $x_3$, therefore the second training computer can locally compute $x_2 \oplus x_3$, before inputting the shares into the garbled circuit. The second training computer can send $[\![x_2 \oplus x_3]\!]^Y$ to the first training computer. After receiving $[\![x_2 \oplus x_3]\!]^Y$ from the second training computer, the first training computer can locally compute $[\![x]\!]^Y := [\![x_1]\!]^Y \oplus [\![x_2 \oplus x_3]\!]^Y$ to obtain $[\![x]\!]^Y$. In this way, the first training computer can XOR the first Yao share with the received value, rather than XORing all three Yao shares.

In the semi-honest setting, the conversation from a binary secret-shared data item to a Yao secret-shared data item can include 2κ/3 communications in 1 round, wherein κ is a computational security parameter. The computational security parameter κ can be a predetermined value which relates to the security of the protocol. For example, a larger computational security parameter κ can result in longer keys, which can make it more difficult for a malicious party to act maliciously. In the malicious setting, the conversion from a binary secret-shared data item to a Yao secret-shared data item can include 4κ/3 communications in 1 round.

E. Yao to Arithmetic:

Another conversion is Yao to arithmetic, which can be denoted as $[\![x]\!]^Y \rightarrow [\![x]\!]^A$. The cost of the conversion from Yao to arithmetic is shown in the seventh row of FIG. 12. A garbled circuit 3PC for the RCFA addition circuit can be used to convert $x \in \mathbb{Z}_{2^k}$ from Yao to arithmetic sharing. The conversion of a Yao secret-shared data item to an arithmetic secret-shared data item can be similar to the conversion from a binary secret-shared data item to an arithmetic secret-shared data item.

First, the first training computer and the second training computer can generate a random second share $x_2 \leftarrow \{0,1\}$ using any suitable method described herein. The random second share $x_2$ can be Yao shared among the three training computers, i.e., as $[\![x_2]\!]^Y$. The random second share $x_2$ can also be fully known by the training computers that generated it, i.e., the first training computer and the second training computer. The first training computer and the second training computer can set a second arithmetic share equal to the random second share, and store the second arithmetic share.

After the first training computer and the second training computer generate the random second share $x_2$, the second training computer and the third training computer can generate a random third share $x_3 \rightarrow \mathbb{Z}_{2^k}$. The random third share $x_3$ can also be Yao shared among the three training computers, i.e., as $[\![x_3]\!]$. The random third share $x_3$ can be fully known by the training computers that generated it, i.e., the second training computer and the third training computer.

The second training computer and the third training computer can set a third arithmetic share equal to the third random share, and store the third arithmetic share.

The three training computers can jointly input the Yao secret-shared data item $[\![x]\!]^Y$, the Yao secret-shared random second share $[\![x_2]\!]^Y$, and the Yao secret-shared random third share $[\![x_3]\!]^Y$ into a garbled circuit, using any suitable method described herein. The three training computers can compute $[\![x_1]\!]^Y := [\![x]\!]^Y - [\![x_2]\!]^Y - [\![x_3]\!]^Y$, using a garbled circuit, to determine shares of a first Yao share $[\![x_1]\!]^A$. In some embodiments, the garbled circuit can include full adders in parallel, one full adder for each bit of the Yao secret-shared data item. In some embodiments, the training computers can compute a sum of the Yao secret-shared data item, the Yao shares of the random second share, and the Yao shares, of the random third share, to determine a second arithmetic secret-shared data item, as described herein, when the values are added such that $[\![x_1]\!]^Y := [\![x]\!]^Y [\![-x_2]\!]^Y + [\![-x_3]\!]^Y$.

The training computers can then reveal the shares of the first Yao share $[\![x_1]\!]^Y$ to the first training computer and the third training computer, such that the first training computer and the third training computer hold all shares of the first Yao share $[\![x_1]\!]^Y$. Since the first training computer and the third training computer hold all shares of the first Yao share $[\![x_1]\!]^Y$, the first training computer and the second training computer can determine the first share $x_1$ of the arithmetic share $[\![x]\!]^A$. In this process, the training computers can communicate k joint input bits (e.g., only $x_2$) and 2 k garbled gates.

The first training computer and the second training computer can determine the first arithmetic share, of the arithmetic data item $[\![x]\!]^A$, by computing the sum of the three shares of the first arithmetic share $[\![x_1]\!]^A$.

The arithmetic data item $[\![x]\!]^A$ is now secret shared among the three training computers since the first training computer holds the first arithmetic share $x_1$ and the second arithmetic share $x_2$, the second training computer holds second arithmetic share $x_2$ and the third arithmetic share $x_3$, and the third training computer holds the third arithmetic share $x_3$ and the first arithmetic share $x_1$.

In some embodiments, in the semi-honest setting, this can be further optimized by the third training computer locally computing $x_2 - x_3$ and providing the solution as an input to $[\![x_1]\!]^A := [\![x]\!]^Y - [\![x_2 - x_3]\!]^Y$. As a result the cost of the conversion is reduced by a factor of 2.

In the semi-honest setting, the conversation from a Yao secret-shared data item to an arithmetic secret-shared data item can include 4 kκ/3 communications in 1 round. In the malicious setting, the conversion from a Yao secret-shared data item to an arithmetic secret-shared data item can include 5 kκ/3 communications in 1 round.

F. Arithmetic to Yao:

Another conversion is arithmetic to Yao, which can be denoted as $[\![x]\!]^A \rightarrow [\![x]\!]^Y$. The cost of the conversion from arithmetic to Yao is shown in the eighth row of FIG. 12. The conversion from an arithmetic secret-shared data item to a Yao secret-shared data item can include the use of a garbled circuit.

First, the three training computers can jointly input arithmetic shares of a data item x, wherein $[\![x]\!]^A = (x_1, x_2, x_3)$, to generate $[\![x_1]\!]^Y$, $[\![x_2]\!]^Y$, and $[\![x_3]\!]^Y$. For example, the first share of the arithmetic secret-shared data item $x_1$ can be inputted into a garbled circuit. The output of the garbled circuit can be shares of a first share of a Yao secret-shared data item $[\![x_1]\!]^Y$. Similarly, the second share of the arithmetic secret-shared data item $x_2$ can be inputted into a garbled circuit. The output of the garbled circuit can be shares of a second share of a Yao secret-shared data item $[\![ x_2 ]\!]^Y$. The third share of the arithmetic secret-shared data item $x_3$ can also be Yao secret-shared as described herein.

The training computers can then use a garbled circuit to compute the Yao secret-shared data item by computing the summation of the share of the first share, the shares of the second share, and the shares of the third share of the Yao secret-shared data item (i.e., $[\![ x ]\!]^Y := [\![ x_1 ]\!]^Y + [\![ x_2 ]\!]^Y + [\![ x_3 ]\!]^Y$).

In some embodiments, in the semi-honest setting this can be optimized by the third training computer locally computing the summation of the second share of the arithmetic secret-shared data item $x_2$ and the third share of the arithmetic secret-shared data item $x_3$ (i.e., $x_2+x_3$). The third training computer can send the sharing $[\![ x_2+x_3 ]\!]^Y$ to the first training computer. The first training computer can then compute the final sharing $[\![ x ]\!]^Y := [\![ x_1 ]\!]^Y + [\![ x_2+x_3 ]\!]^Y$.

In the semi-honest setting, the conversation from a Yao secret-shared data item to an arithmetic secret-shared data item can include 4 kκ/3 communications in 1 round. In the malicious setting, the conversion from a Yao secret-shared data item to an arithmetic secret-shared data item can include 8 kκ/3 communications in 1 round.

VII. 3-Party Oblivious Transfer for Piece-Wise Activation Functions

Converting between share representations can allow for combinations of shares to be used together, however, it can be more efficient to provide custom protocols to directly perform the computation on mixed representation. For example, we provide a mixed-protocol for performing the multiplication of an arithmetic secret-shared data item with a binary secret-shared data item, i.e., $[\![ a ]\!]^A [\![ b ]\!]^B = [\![ ab ]\!]^A$. This operation can be performed repeatedly when computing piecewise linear or polynomial functions that are used to approximate non-linear activation functions in training logistic regression and neural network models.

This mixed computation can be instantiated using a generalized three-party oblivious transfer protocol involving three parties, such as three training computers, three server computers, etc. The three parties can comprise a sender, a receiver, and a helper. Three-party oblivious transfer can include a bit $b_i$, which can be a receiver's input, and an integer a, which can be the sender's input. The helper, which has no input/output, can know the receiver's input bit $b_i$. The three-party oblivious transfer protocol can maintain privacy of secret-shared data items.

A. Three Party Oblivious Transfer in the Semi-Honest Setting:

We begin by providing an oblivious transfer protocol in the three-party honest majority setting. As with the two-party, 1-out-of-2 oblivious transfer, case there can be a sender and a receiver. The three-party case can include a third party called a helper that can receive no output and can know the receiver's choice bit. Our approach is efficient and information-theoretic secure.

1. Overview of 3-Party OT

The functionality for the (sender, receiver, helper) can be expressed as $((m_0, m_1), c, c) \mapsto (\bot, m_c, \bot)$. In other words, the sender can store a first message $m_0$ and a second message $m_1$, the receiver can store a choice bit c, and the helper can store the choice bit c. After the oblivious transfer, the receiver can store a choice message $m_c$, which can either be the first message $m_0$ or the second message $m_1$. Several works consider multi-party OT [42], [25], [17], [35], however, none of which appear to consider the particular functionality with an honest majority as described herein.

The first message $m_0$ and the second message $m_1$ can be messages that are k bits long. One of the first message $m_0$ and the second message $m_1$ can correspond to a value of a data item. However, the sender, which holds $m_0$ and $m_1$, may not know which of the messages corresponds to the value of the data item. The choice bit c can be a binary value. The value of the choice bit c can determine which message (i.e., $m_0$ or $m_1$) corresponds to the value of the data item. For example, the choice bit c can be a value of 0, which corresponds to $m_0$, or can be a value of 1, which corresponds to $m_1$. Since the receiver and the helper store the choice bit c, but do not store the first message $m_0$ and the second message $m_1$, the receiver and the helper cannot determine the data item.

Figure 18:
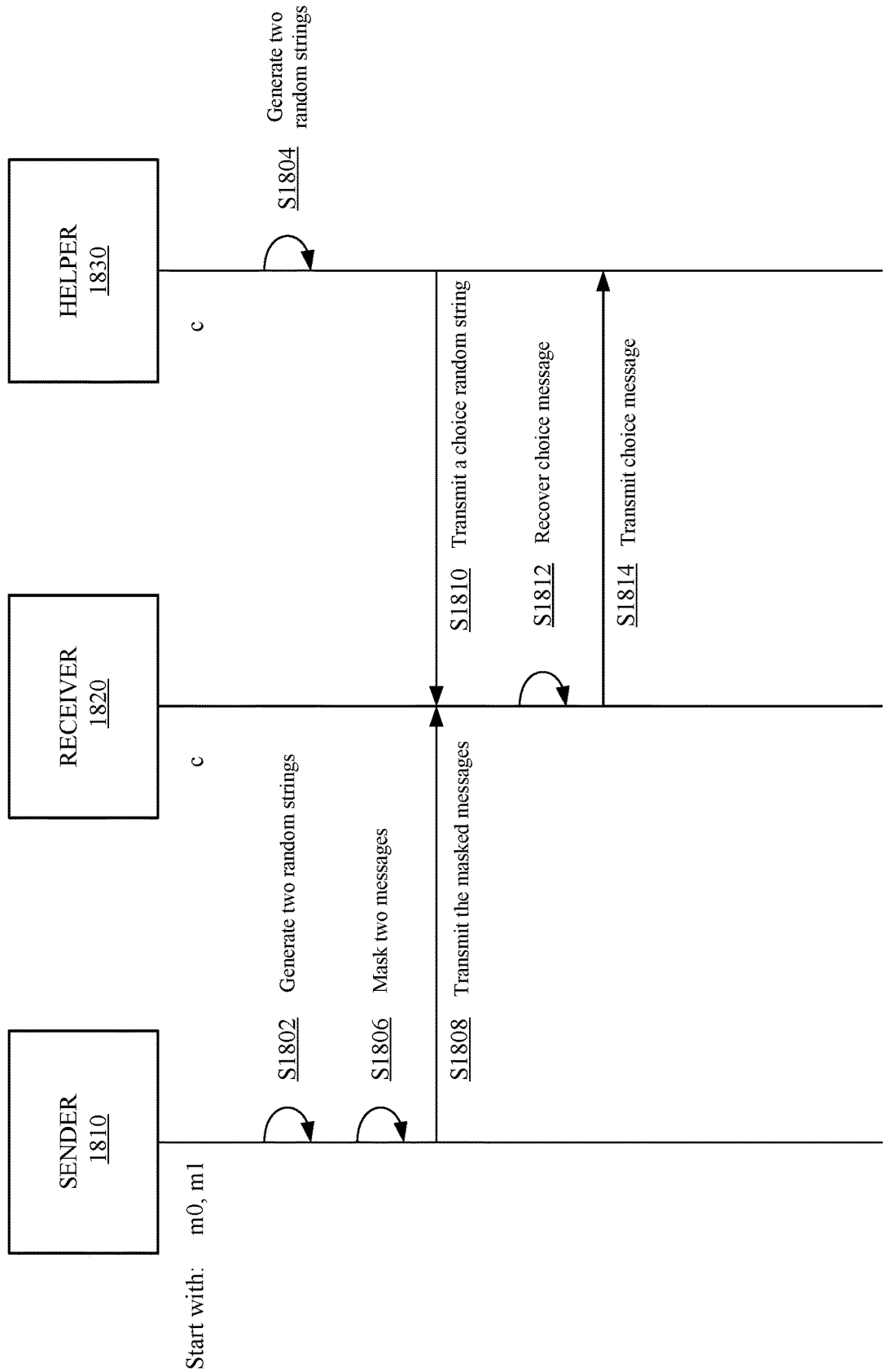
FIG. 18 shows a method of performing three-party oblivious transfer.

FIG. 18 shows a method of performing three-party oblivious transfer. The method illustrated in FIG. 18 will be described in the context of three-party oblivious transfer between three devices. It is understood, however, that embodiments of the invention can be applied to other circumstances, such as between training computers during training of a machine learning model. Although the steps are illustrated in a specific order, it is understood that embodiments of the invention may include methods that have the steps in different orders. In addition, steps may be omitted or added and may still be within embodiments of the invention. The three devices can comprise a sender 1810, a receiver 1820, and a helper 1830.

The sender 1810, the receiver 1820, and the helper 1830 can be any suitable devices such as training computers, server computers, desktop computers, etc. In some embodiments, the sender 1810 can be a first training computer, the receiver 1820 can be a second training computer, and the helper 1830 can be a third training computer. The roles of sender, receiver, and helper can alternate between the three training computers. For example, the second training computer can be a receiver and then, later, be a helper.

At steps S1802 and S1804, the sender 1810 and the helper 1830 first generate two random strings $w_0, w_1 \leftarrow \{0,1\}^k$. The two random strings $w_0$ and $w_1$ can be generated using any suitable method described herein. The two random strings $w_0$ and $w_1$, referred to as a first random string $w_0$ and a second random string $w_1$, can be k bits long. In some embodiments, the two random strings $w_0$ and $w_1$ can be the same length as the first message $m_0$ and the second message $m_1$, respectively.

At step S1806, after generating the first random string $w_0$ and the second random string $w_1$, the sender 1810 masks the first message $m_0$ and the second message $m_1$. The sender 1810 can mask $m_0$ and $m_1$ using the two random strings $w_0$ and $w_1$, respectively. For example, the sender 1810 can XOR the first message $m_0$ with the first random string $w_0$ (i.e., $m_0 \oplus w_0$). Each bit of the first message $m_0$ can be XORed with the bits of the first random string $w_0$. The sender 1810 can also XOR the second message $m_1$ with the second random string $w_1$ (i.e., $m_1 \oplus w_1$). A first masked message $m_0 \oplus w_0$ and a second masked message $m_1 \oplus w_1$ can obfuscate the first message $m_0$ and the second message $m_1$, respectively, from the receiver 1820.

At step S1808, after masking the two messages, the sender 1810 can send the two masked messages (i.e., $m_0 \oplus w_0$ and $m_1 \oplus w_1$) to the receiver 1820. The two masked messages can be transmitted in any suitable manner described herein.

At step S1810, after generating the first random string $w_0$ and the second random string $w_1$, the helper 1830 can determine a choice random string w, based on the choice bit c. For example, if the choice bit c is 0, then the helper 1830 can set the choice random string $w_c$ to be equal to the first random string $w_0$. If the choice bit c is 1, then the helper 1830 can set the choice random string $w_c$ to be equal to the second random string $w_1$. After determining the choice random string $w_c$, the helper 1830 can transmit the choice random string $w_c$ to the receiver 1820. In some embodiments, the helper 1830 can determine the choice random string $w_c$, while the sender 1810 masks the two messages and transmits the two masked messages to the receiver 1820.

At step S1812, after receiving the masked messages (i.e., $m_0 \oplus w_0$ and $m_1 \oplus w_1$) from the sender 1810 and receiving the choice random string $w_c$ from the helper 1830, the receiver 1820 can recover a choice message $m_c$ based on the masked messages and the choice random string $w_c$. Since the receiver 1820 holds the choice bit c, the receiver 1820 can determine which masked message of the first masked message $m_0 \oplus w_0$ and the second masked message $m_1 \oplus w_1$ is associated with the choice bit c. After determining which masked message is associated with the choice bit c, the receiver 1820 can recover the choice message $m_c$ by XOR-ing the choice random string $w_c$ with the masked message.

For example, if the choice bit c is equal to a value of 0, then the choice random string $w_c$ is the first random string $w_0$. The receiver 1820 can XOR the first random string $w_0$ (i.e., the choice random string $w_c$) with the first masked message $m_0 \oplus w_0$ (i.e., $m_0 \oplus w_0 \oplus w_0 = m_0$). In this case, the first message $m_0$ is the choice message $m_c$. The receiver 1820 can either determine that the choice message $m_c$ is equal to the first message $m_0$, when the choice bit c is equal to 0, or that the choice message $m_c$ is equal to the second message $m_2$, when the choice bit c is equal to 1.

The receiver 1820 can then store the choice message $m_c$. In this way, the choice message $m_c$ can be transferred from the sender 1810 to the receiver 1820, without the sender 1810 knowing which message ($m_0$ or $m_1$) was transmitted. Overall, this method involves sending three messages over one round.

In some embodiments, at step S1814, after determining the choice message $m_c$, the receiver 1820 can transmit the choice message $m_c$ to the helper 1830.

In other embodiments, the receiver 1820 and the helper 1830 can swap roles (i.e., helper and receiver) to perform the three-party oblivious transfer to transfer either the first message $m_0$ or the second message $m_1$ to the helper 1830. The sender 1810, the receiver 1820, and the helper 1830 can perform the three-party oblivious transfer twice in parallel. The receiver 1820 and the helper 1830 can both receive the choice message $m_c$ from the sender 1810, without the sender 1810 knowing which of the two messages was transferred.

2. 3-Party OT with a Data Item and a Binary Secret-Shared Bit

Next, three-party oblivious transfer with a data item and a secret-shared bit when performing the mixed computation of a $[\![ b ]\!]^B = [\![ ab ]\!]^A$ will be discussed. This can involve multiplying the data item $a \in \mathbb{Z}_{2^k}$ with a shared bit $b \in \{0,1\}$. The data item a can be a data item that is fully known by the first training computer and unknown to the second training computer and the third training computer. The data item a can be an arithmetic value. The shared bit b can be a bit that is binary secret-shared among the three training computers, as described herein.

In some embodiments, the shared bit b can be a vector of bits (i.e., $b_1, \ldots, b_m \in \{0,1\}$) of any suitable length. The vector of bits can represent whether or not a value x is in a certain interval of the data item a, which can be a polynomial piecewise function $f_i(x)$. The computation of a $[\![ b ]\!]^B$ can be the computation of $b_i f_i(x)$. For example, if x is in a certain interval of the polynomial piecewise function $f_i(x)$, then the shared bit b can be equal to a value of 1, whereas, if x is not in a certain interval of the polynomial piecewise function $f_i(x)$, then the shared bit b can be equal to a value of 0.

Figure 19:
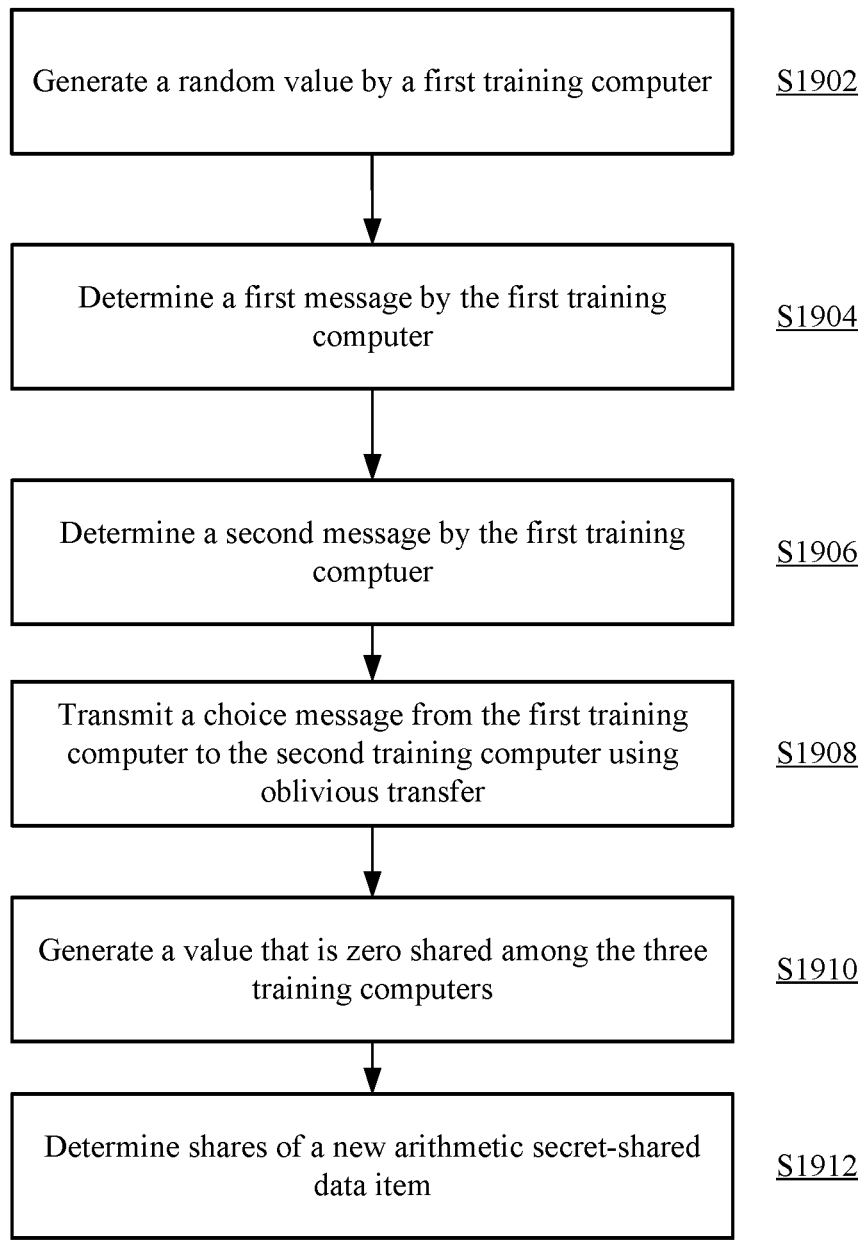
FIG. 19 shows a method of performing three-party oblivious transfer with a public value and a bit.

FIG. 19 shows a method of performing three-party oblivious transfer with a data item and a shared bit. The method illustrated in FIG. 19 will be described in the context of three-party oblivious transfer between three training computers during training of a machine learning model. It is understood, however, that embodiments of the invention can be applied to other circumstances, such as between devices where the shared bit is a vector of shared bits. Although the steps are illustrated in a specific order, it is understood that embodiments of the invention may include methods that have the steps in different orders. In addition, steps may be omitted or added and may still be within embodiments of the invention.

The three-parties can include a first training computer, a second training computer, and a third training computer. The first training computer can store the data item a, which can be an arithmetic value. The shared bit b can be secret-shared among the three training computers in the following way. The first training computer can store a first share $b_1$ of the shared bit and a third $b_3$ share of the shared bit, the second training computer can store the first share $b_1$ of the shared bit and a second share $b_2$ of the shared bit, and the third training computer can store the second share $b_2$ of the shared bit and the third share $b_3$ of the shared bit. This manner of secret-sharing is labeled differently than as described above. The labeling used to designate the shares of a data item can be arbitrary. For example, in some embodiments, the first training computer can store first and second shares. In other embodiments, the first training computer can store second and third shares. Each training computer can store two of the three shares of a data item, wherein each training computer stores a different pair of the three shares.

In some embodiments, the shared bit b can be a vector of secret-shared bits of any suitable length, as described herein. For example, b can be a vector 0101. Each bit of the vector can be secret-shared among the three training computers. For example, the first share $b_1$ of the shared bit can be 0101, the second share $b_2$ of the shared bit can be 1010, and the third share $b_3$ of the shared bit can be 1010. The shared bit b can be equal to $b_1 \oplus b_2 \oplus b_3$. The ith bit of the first share $b_1$ of the shared bit can be denoted as $b_1[i]$.

At step S1902, the first training computer can generate a random value $r \leftarrow \mathbb{Z}_{2^k}$ using any suitable method described herein. At step S1904, after generating the random value r, the first training computer can determine a first message $m_0$. The first training computer can determine the first message $m_0$ based on shares of the shared bit b, the data item a, and the random value r. The first message $m_0$ can be equal to zero XOR the first share $b_1$ of the shared bit XOR the third share $b_3$ of the shared bit, all multiplied by the data item a, then minus the random value r (i.e., $m_0 = (0 \oplus b_1 \oplus b_3)a - r$).

At step S1906, after determining the first message $m_0$, the first training computer can determine a second message $m_1$ based on shares of the shared bit b, the public value a, and the random value r. The second message $m_1$ can be equal to $(1 \oplus b_1 \oplus b_3)a - r$. In general, the first training computer can determine an ith message $m_i := (i \oplus b_1 \oplus b_3)a - r$ for $i \in \{0,1\}$.

The first message $m_0$ can represent the case where the second share $b_2$ of the shared bit is equal to a value of 0.

Therefore, the term $(0 \oplus b_1 \oplus b_3)a$ can be equal to ba when $b_2=0$. The second message $m_1$ can represent the case where the second share $b_2$ of the shared bit is equal to a value of 1. Therefore, the term $(1 \oplus b_1 \oplus b_3)a$ can be equal to ba when $b_2=1$. However, the first training computer does not know if the second share $b_2$ of the shared bit is equal to 0 or 1 and therefore computes both messages.

At step S1908, after the first training computer determines the first message $m_0$ and the second message $m_1$, the three training computers can perform a three-party oblivious transfer as described herein. For example, the first training computer can be the sender 1810, the second training computer can be the receiver 1820, and the third training computer can be the helper 1830 as described in FIG. 18. The choice bit c can be the second share $b_2$ of the shared bit (i.e., $c=b_2$). Since the second training computer and the third training computer both know the second share $b_2$ of the shared bit, both the second training computer and the third training computer can hold the choice bit c.

The first training computer and the third training computer can both generate two random strings including a first random string $w_0$ and a second random string $w_1$. The first training computer can mask the first message $m_0$ and the second message $m_1$ using the first random string $w_0$ and the second random string $w_1$, respectively, as described herein. After masking the two messages, the first training computer can transmit the two masked messages to the second training computer.

The third training computer can determine a choice random string $w_{b_2}$ based on the second share $b_2$ of the shared bit. The third training computer can set the choice random string $w_{b_2}$ equal to the first random string $w_0$, if the second share $b_2$ of the shared bit is equal to a value of 0. The third training computer can set the choice random string $w_{b_2}$ equal to the second random string $w_1$, if the second share $b_2$ of the shared bit is equal to a value of 1.

After determining the choice random string $w_{b_2}$, the third training computer can transmit the choice random string $w_{b_2}$ to the second training computer. The second training computer can recover a choice message $m_{b_2}$ based on the two masked messages (i.e., $m_0 \oplus w_0$ and $m_1 \oplus w_1$) and the choice random string $w_{b_2}$. For example, if the second share $b_2$ of the shared bit is equal to a value of 0, then the second training computer can XOR the choice random string $w_{b_2}$ with the first masked message $m_0$ (i.e., $m_0 \oplus w_0 \oplus w_{b_2} = m_{b_2} = m_0$). If the second share $b_2$ of the shared bit is equal to a value of 1, then the second training computer can XOR the choice random string $w_{b_2}$ with the second masked message $m_1$ (i.e., $m_1 \oplus w_1 \oplus w_{b_2} = m_{b_2} = m_1$).

The second training computer can perform this oblivious transfer to learn the choice message $m_{b_2}$, which can be equivalent to $m_{b_2} = (b_2 \oplus b_1 \oplus b_3)a - r = ba - r$. In some embodiments, after determining the choice message $m_{b_2}$, the second training computer can transmit the choice message $m_{b_2}$ to the third training computer.

At step S1910, after the three training computers perform the oblivious transfer of the message $m_{b_2}$, from the first training computer to the second training computer, the three training computers can locally generate a zero shared value s ($s_1$, $s_2$, $s_3$), using any suitable method described herein. As a result of the generation of the zero shared value s, the first training computer can store a first share $s_1$ of the zero shared value s and a third share $s_3$ of the zero shared value s. The second training computer can store the first share $s_1$ of the zero shared value s and a second share $s_2$ of the zero shared value s. The third training computer can store the second share $s_2$ of the zero shared value s and the third share $s_3$ of the zero shared value s. Furthermore, the sum of the shares of the zero shared value s can equal zero (i.e., $s=s_1+s_2+s_3$).

At step S1912, the three training computers can determine shares of a new arithmetic secret-shared data item. The new arithmetic secret-shared data item can be $[\![c]\!] = [\![ab]\!]^A$. The first training computer and the second training computer can determine a first share $c_1$ of the new arithmetic secret-shared data item $[\![c]\!]$ based on the first share $s_1$ of the zero shared value s and the random value r. The first training computer and the second training computer can set the first share $c_1$ equal to $s_1+r$. In some embodiments, the second training computer does not hold the random value r. The first training computer can determine the first share $c_1$ and then transmit the first share $c_1$ to the second training computer. In other embodiments, the second training computer can also generate the random value r, in conjunction with the first training computer during step S1902. The random value r can be generated using any suitable method described herein.

The first training computer and the third training computer can determine a third share $c_3$ of the new arithmetic secret-shared data item $[\![c]\!]$. The first training computer and the third training computer can set the third share $c_3$ equal to the third share $s_3$ of the zero shared values.

The second training computer and the third training computer can determine a second share $c_2$ of the new arithmetic secret-shared data item $[\![c]\!]$. The second share $c_2$ can be equal to the choice message $m_{b_2}$ plus the second share $s_2$ of the zero shared value s (i.e., $c_2 = m_{b_2} + s_2$).

The arithmetic data item c is secret-shared such that $[\![c]\!] = (s_1+r, ba-r+s_2, s_3)$. The data item c can be reconstructed by the three training computers by determining a sum of the three shares of the new arithmetic secret-shared data item $[\![c]\!]$, i.e., $(s_1+r)+(ba-r+s_2)+(s_3)=ba$. This method can use a total of two rounds of communication.

In some embodiments, the operations of addition and subtraction of the random value can be switched, such that each time the random value is added it can rather be subtracted, and vice-versa. In this case the arithmetic data item c is secret-shared such that $[\![c]\!] = (s_1 r, ba+r+s_2, s_3)$.

In some embodiments, the three-party oblivious transfer procedure can be repeated in parallel one more time, so that the third training computer can also learn the choice message $m_{b_2}$ in the first round. The overall communication of this approach can be 6 k bits and 1 round.

3. 3-Party OT with Arithmetic Secret-Shared Data Item and a Binary Secret-Shared Value Next, a generalized approach for three-party oblivious transfer is discussed. The generalized approach can be for two secret-shared data items in the semi-honest setting, rather than a data tem a and a shared bit b, as described herein. In this case, the data item a can be an arithmetic secret-shared value $[\![a]\!]$, rather than a value that is known to the first training computer.

The computation of the multiplication of the arithmetic secret-shared value $[\![a]\!]^A$ and the binary secret-shared value $[\![b]\!]^B$ (i.e., $[\![a]\!]^A [\![b]\!]^B$) can be determined by performing computations similar to the computation of $a[\![b]\!]^B$, described herein, twice in parallel. The expression $[\![a]\!]^A [\![b]\!]^B$ can be written as $[\![a]\!]^A [\![b]\!]^B = a_1 [\![b]\!]^B + (a_2+a_3)[\![b]\!]^B$, wherein a first term is $a_1 [\![b]\!]^B$ and a second term is $(a_2+a_3)[\![b]\!]^B$.

The first training computer can act as a sender in the three-party oblivious transfer during the computation of the first term $a_1 [\![b]\!]^B$. The computation of the first term $a_1 [\![b]\!]^B$ can be performed using any suitable method described herein.

Then, the third training computer can act as the sender in the three-party oblivious transfer during the computation of the second term $(a_2+a_3)[\![b]\!]^B$, since the third training computer can store the second and third shares of the arithmetic data item a. The computation of the second term $(a_2+a_3)[\![b]\!]^B$ can be performed using any suitable method described herein. In total, 4 k bits per training computer are communicated over 1 round.

B. Three Party Oblivious Transfer in the Malicious Setting:

The three-party oblivious transfer in the semi-honest setting fails in the malicious setting. The first training computer can act maliciously by choosing the value of the data item a arbitrarily when the data item a is known by the first training computer. First, we will discuss three-party oblivious transfer with a data item and a binary secret-shared bit, then we will discuss three-party oblivious transfer with an arithmetic secret-shared data item and a binary secret-shared value.

1. 3-Party OT with Data Item and a Binary Secret-Shared Bit

In the first case, the first training computer can fully know an arithmetic data item a. A binary secret-shared bit $[\![b]\!]^B$ can be secret-shared among the three training computers such that the first training computer can store a first share $b_1$ of the shared bit and a third $b_3$ share of the shared bit, the second training computer can store the first share $b_1$ of the shared bit and a second share $b_2$ of the shared bit, and the third training computer can store the second share $b_2$ of the shared bit and the third share $b_3$ of the shared bit.

Computing a $[\![b]\!]^B$ can occur in two steps. In a first step, the three training computers can first convert the binary shared bit $[\![b]\!]^B$ into an arithmetic secret-shared bit $[\![b]\!]^A$ (i.e., the three training computers can compute $[\![^B \rightarrow [\![b]\!]^A)$) as described herein. In a second step, the three training computers can compute a product of the arithmetic data item a and the arithmetic secret-shared bit $[\![b]\!]^A$, i.e., $a [\![b]\!]^A = [\![ab]\!]^A$.

First, the three training computers can convert the binary secret-shared bit $[\![b]\!]^B$ into an arithmetic secret-shared bit $[\![b]\!]^A$. The three training computers can locally compute the shares $[\![b_1]\!]^A$, $[\![b_2]\!]^A$, and $[\![b_3]\!]^A$, where $[\![b]\!]^B=(b_1, b_2, b_3)$, and where $[\![b_1]\!]^A := (b_1, 0, 0)$, $[\![b_2]\!]^A := (0, b_2, 0)$, and $[\![b_3]\!]^A := (0, 0, b_3)$, using any suitable method described herein. The three training computers can then compute an intermediate secret-shared value $[\![d]\!]$ using an arithmetic circuit that can emulate the XOR of each of the inputs to the circuit by computing $[\![d]\!] := [\![b_1]\!] + [\![b_1]\!] - 2 [\![b_1]\!][\![b_2]\!]$. The intermediate secret-shared value $[\![d]\!]$ can be equal to $[\![b_1 \oplus b_2]\!]$, since the arithmetic circuit emulates the XOR operation.

In a second round, the three training computers can compute the arithmetic sharing of the bit b (i.e., $[\![b]\!]^A$) as $[\![b]\!]^A := [\![d \oplus b_3]\!]^A$. This conversion sends 2 k bits between training computers over two rounds.

After determining the arithmetic secret-shared bit $[\![b]\!]^A$, the three training computers can then compute a final result $[\![ab]\!]^A$ by computing $a[\![b]\!]^A$ as described herein. Compared to performing the bit decomposition from section VI.B.1, this approach can reduce the round complexity and communication by O(log k).

2. 3-Party OT with Arithmetic Secret-Shared Data Item and a Binary Secret-Shared Value Embodiments described herein can be extended from a data item a, known by the first training computer, to an arithmetic secret-shared data item. First, the three training computers can convert $[\![b]\!]^B$ to an arithmetic sharing $[\![b]\!]^A$ using a two round procedure, as described herein. In a third round, the three training computers can compute $[\![a]\!]^A [\![b]\!]^B = [\![ab]\!]$, as described herein.

C. Polynomial Piecewise Functions:

Next, efficient computation of polynomial piecewise functions according to embodiments of the invention will be discussed. These functions can be constructed as a series of polynomials. For example, $f_1, \ldots, f_m$, can denote the polynomials with public coefficients and $-\infty = c_0 < c_1 < \ldots < c_{m-1} < c_m = \infty$ such that, $$f_i(x) = \begin{cases} f_1(x), & x < c_1 \\ f_2(x), & c_1 \le x < c_2 \\ \ldots \\ f_m(x), & c_{m-1} \le x \end{cases}$$

The technique for computing $f$ can first involve computing a vector of secret-shared values $b_1, \ldots b_m \in \{0,1\}$ such that $b_i = 1 \Leftrightarrow c_{i-1} < x \le c_i$. $f$ can then be computed as $f(x) = \Sigma_i b_i f_i(x)$.

First, the case of computing x<c will be discussed. This expression can be rewritten as $[\![x]\!]^A - c < 0$. Recall that x can be represented as a two's complement value, therefore the most significant bit (MSB) of x−c can denote its sign, i.e. 1 if x−c<0. This can imply that the inequality can be computed by extracting the MSB. In turn, this can be computed by taking the bit extraction, as described herein, of $[\![x-c]\!]$ to obtain binary shares of $[\![b]\!]^B := [\![msb(x-c)]\!]^B$. When the bit-extraction is performed with binary secret-sharing, the round complexity can be O(log k) while the communication can be O(k) bits.

On the other hand, when the conversion is performed using a garbled circuit, the round complexity decreases to 1 with an increase in communication totaling O(κk) bits. Each $b_i$ is the logical AND of two such shared bits which can be computed within the garbled circuit or by an additional round of interaction when binary secret-sharing is used.

Each of the $f_i$ functions are expressed as a polynomial $f_i([\![x]\!]) = a_{i,j}[\![x]\!]^j + \ldots + a_{i,1}[\![x]\!] + a_{i,0}$ where all $a_{i,l}$ are publicly known constants. When $f_i$ is a degree 0 polynomial, the computation $b_i f_i([\![x]\!])$ can be optimized as $a_{i,0} [\![b_i]\!]^B$, using techniques described herein. In addition, when the coefficients of $f_i$ are integers, the computation of $a_{i,l}[\![x]\!]^i$ can be performed locally, given $[\![x]\!]^i$. However, when $a_{i,j}$ has a non-zero decimal, an interactive truncation can be performed, as described herein. An exception to using a truncation, is the case that $f_i$ is degree 0, which can directly be performed using the techniques described herein.

What remains is the computation of $[\![x]\!]^j, \ldots, [\![x]\!]^2$ given $[\![x]\!]$. The computation of these terms can be performed once and used across all $f_1, \ldots, f_m$, and may use log j rounds of communication. The computation of these terms can be performed in parallel with the computation of the outer coefficients $b_1, \ldots b_m$. As such, when computing these terms using binary secret-sharing, the overall round complexity is unaffected and remains bounded by O(log k). However, if garbled circuits are used to compute the $b_1$ terms, the round complexity decreases to log j≤log k.

VIII. Further Details on Machine Learning

First training linear regression models using the gradient decent method will be discussed. Given n training examples $x_1, \ldots x_n \in \mathbb{R}^d$ and output variables $y_1, \ldots y_n$, the goal is to find a vector $w \in \mathbb{R}^d$, which minimizes the distance between $f(x_i) := x_i \cdot w = \Sigma_j x_{ij} w_j$, and the true output $y_i$, where distance is defined as the L2 norm. For a convex relationship, it can be shown that recursively defining the jth weight as $$w_j := w_j - \alpha \frac{\partial C(w)}{\partial w_j} = w_j - \alpha \frac{1}{n} \sum_i^n (x_i \cdot w - y_i) x_{ij}$$

converges to a vector that minimizes the L2 norm. The extra term $\alpha$ is the learning rate, which can be suitably small.

Leveraging this, w can be computed by initializing w as the zero vector, and then repeatedly updating it using the recursive relation until it converges. Each update is called an iteration. To improve performance, a random subset of the n training examples can be used during each iteration. Let B denote the size of the subset. Using matrix notation, we can then define the update operations as $$w := w - \alpha \frac{1}{B} X_j^T \times (X_j \times w - Y_j),$$

where $X_j$ and $Y_j$ are the jth subset of the training examples/labels.

The training of logistic regression models, where the output variable y is binary, will also be discussed. In this case, the rate of convergence of the training procedure can be improved by applying an activation function $f$, which bounds $f(x \cdot w)$ to be within zero and one. Logistic regression defines $f$ to be the logistic function. Due to $f$ being non-linear, we approximate $f$ using our piecewise polynomial technique. In particular, in some embodiments, we implement the same approximation as [41], but note that, in other embodiments, a more accurate higher degree approximation can be used with minimal to no change in performance. Overall, the update procedure can be expressed as $$w := w - \alpha \frac{1}{B} X_j^T \times (f(X_j \times w) - Y_j).$$

Finally, neural networks, which can be thought of as a generalization of logistic regression, will be discussed. A neural network can be divided up into m layers, each containing $m_i$ nodes. Each node is a linear function composed with a non-linear activation function (e.g., the ReLU function). To evaluate a neural network, the nodes at the first layer are evaluated on the input features (x). The outputs of these nodes are forwarded, as inputs, to the next layer of the network, until all layers have been evaluated in this manner. The training of neural networks can be performed using back propagation in a similar manner to logistic regression, except that each layer of the network can be updated in a recursive manner, starting at the output layer and working backward.

Given the building blocks described herein, efficient protocols for training linear regression, logistic regression and neural network models, on private data using the gradient decent method can be constructed. Each model will be discussed in detail.

Figure 20:
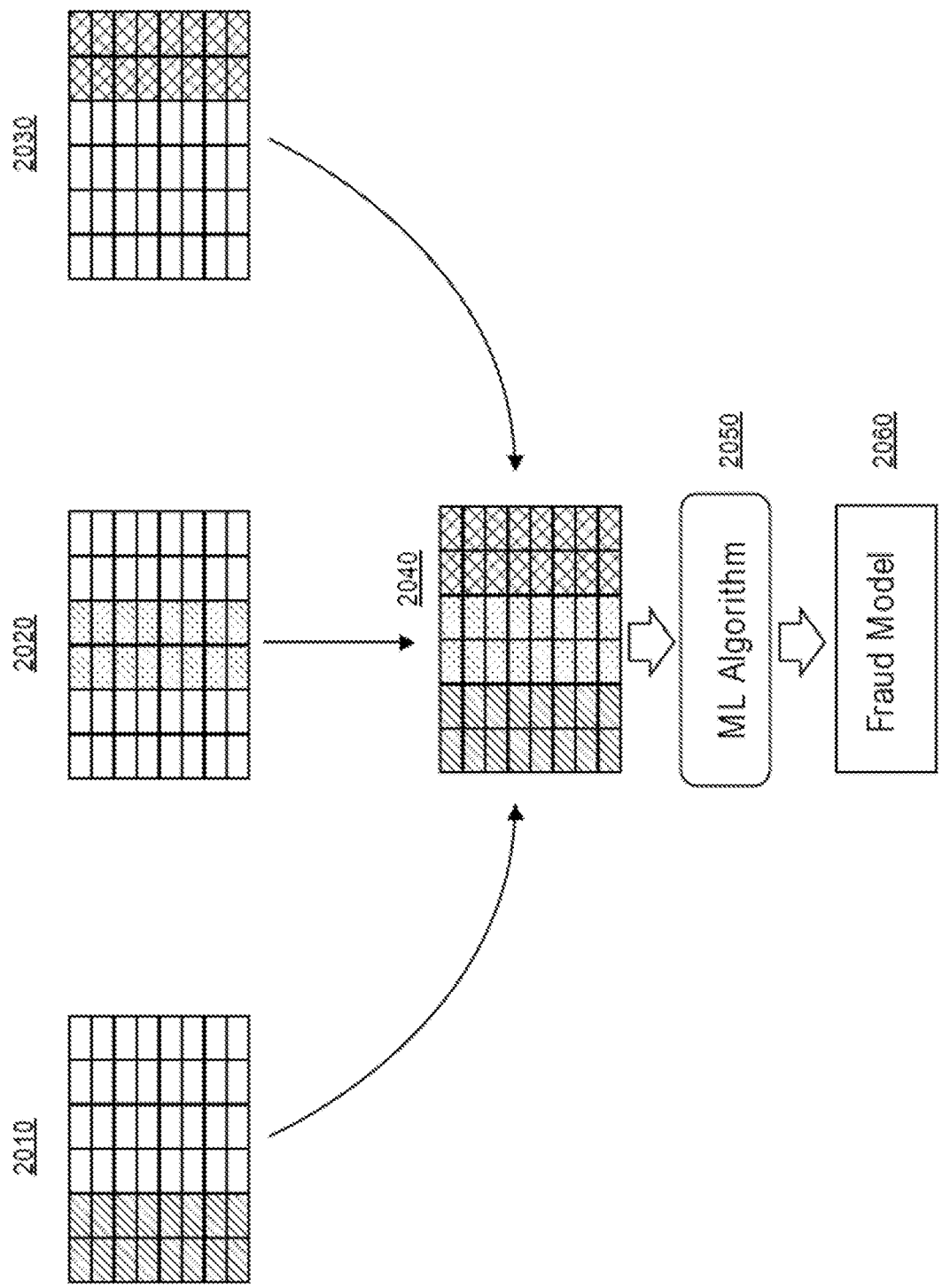
FIG. 20 shows a high-level diagram depicting a process for creating a machine learning model according to an embodiment of the invention.

FIG. 20 shows a high-level diagram depicting a process for creating a machine learning model according to an embodiment of the invention. FIG. 20 includes a first training computer 2010, a second training computer 2020, and a third training computer 2030. The three training computers are shown to each have a share of a data item. Each training computer can have two of three shares of the data item, however, one share at each training computer is shown for ease of presentation. The shares at each training computer 2010-2030 can make up the data item 2040. The data item 2040 can be the actual value of the data that is secret-shared, however, the training computers 2010-2030 do not know the full data item 2040. As described herein, the training computers 2010-2030 can train a machine learning algorithm 2050 on the shares of the data item 2040. The machine learning algorithm 2050 can include linear regression, logistic regression, neural networks, etc. The output of the machine learning algorithm 2050 can be a model. In this example, the model can be a fraud model 2060, wherein the data items 2040 relate to fraud data. The fraud model 2060 can then be used for predictions of new data.

A. Linear Regression:

Embodiments can create a linear regression model using a stochastic gradient decent method. Regression has many applications, for example, in medical science, it is used to learn the relationship between a disease and representative features, such as age, weight, diet habits and use it for diagnosing purposes.

A set of training samples, each having d features and an output Y can be included in secret-shared data items that are shared among three training computers. The d features can be measured or otherwise obtained from a training sample, e.g., an event (e.g., a cyberattack), a physical sample (e.g., a patient), or electronic communications relating to accessing a resource (e.g., an account, a building, a database record, or an account). The output Y of a training sample can correspond to a known classification that is determined by a separate mechanism, e.g., based on information that is obtained after the d features (e.g., that a patient did have a disease or a transaction was fraudulent) or done manually.

Given n training examples $x_1, \ldots x_n \in \mathbb{R}^d$ and the corresponding output variable $y_1, \ldots, y_n$, the goal is to find a vector $w \in \mathbb{R}^d$ which minimizes the distance between $f(x_i) := x_i \cdot w = \Sigma_j x_{ij} w_j$ and the true output $y_i$. The distance can be the L2 cost function, $$C_{\{(x_i, y_i)\}}(w) := \frac{1}{n} \sum_i \frac{1}{2} (x_i \cdot w - y_i)^2.$$

That is, the squared difference between the predicted output $f(x_i)$ and the true output $y_i$. For linear relationships between $x_i$ and $y_i$, updating the weight vector as $$w_j := w_j - \alpha \frac{\partial C(w)}{\partial w_j} = w_j - \alpha \frac{1}{n} \sum_i^n (x_i \cdot w - y_i) x_{ij}$$

will probably converge to the w which minimizes the L2 cost function $C_{\{x_i, y_i\}}(w)$. The extra term $\alpha$ is the learning rate, which can control how large of a step toward the minimum the algorithm should take at each iteration.

Linear regression can be implemented in the secure framework described herein. First, the training computers can jointly input the training examples $X \in \mathbb{R}^{n \times d}$ and $Y \in \mathbb{R}^n$. The data can be distributed between the training computers in any suitable manner, for example, distributed from client computers to the training computers as described herein. For simplicity, the initial weight vector w can be initialized as a zero vector, and the learning rate α can be set as described above.

One optimization to this algorithm is batching. The overall dataset of n examples are randomly divided into batches of size B denoted by $X_1, \ldots, X_{n/B}$ and $Y_1, \ldots, Y_{n/B}$. The update procedure for the jth batch is then defined as, $$w := w - \alpha \frac{1}{B} X_j^T \times (X_j \times w - Y_j)$$

In some embodiments, once all the batches have been used once, the training samples can be selected as part of a batch of training samples that are selected randomly. Each set of batches can be referred to as an epoch.

In the secret-shared setting, the batch size B has several considerations. First, it can be large enough to ensure good quality gradients at each iteration. On the other hand, when B increases beyond a certain point, the quality of the gradient stops improving, which results in wasted work and decreased performance. This trade-off has a direct consequence in the secret-shared setting. The communication required for each iteration is proportional to B. Therefore, decreasing the batch size B results in a smaller bandwidth requirement. However, two rounds of interaction are used for each iteration of the algorithm, regardless of the batch size B. Therefore, in some embodiments, the batch size B can be set to be proportional to the available bandwidth in the time required for one round trip (i.e., two rounds). In other embodiments, the batch size B can be the minimum value of B determined by the training data. In yet other embodiments, the batch size B can be the larger of the bandwidth available and the minimum value of B determined by the training data.

A batched update function can then be applied to each batch. The termination condition can be computed periodically, e.g. every 100 batches. This check need not add to the overall round complexity; instead, this check can be performed asynchronously with the update function. Moreover, due to it being performed infrequently, it will have little impact on the overall running time.

The two matrix multiplications, performed in the update function, can be optimized using the delayed reshare technique described herein. This can reduce the communication per multiplication to B+D elements, instead of 2 DB elements. In many cases, the training data is very high dimensional, making this optimization efficient. The dominant cost of this protocol is 2 rounds of communication per iteration. In the semi-honest setting, each iteration sends B+D shares per party and uses B+D truncation triples.

Besides the original input data, intermediate values can be secret-shared. Such intermediate values can occur during the training and/or evaluation of the model. Examples of intermediate values include the output of a node in a neural network, an inner product of input values and weights prior to evaluation by a logistic function, etc. The intermediate values are sensitive because they can also reveal information about the data. Thus, every intermediate value can remain secret-shared.

In some embodiments, after determining the machine learning model, the machine learning model can be used for a new sample. The model can provide an output label for the new sample based on d features of the new sample. The new sample having d features can be received, by the training computers, from any one of the clients used for training, or a new client. The client can secret-share the features of the new sample with the training computers, each of which can apply the final (optimized) weight parts of the machine learning model to the d features and intermediate values to obtain output parts. The predicted output Y' for the new sample can be reconstructed from the parts stored at the training computers. Other intermediate values can be reconstructed, but some embodiments may only reconstruct the final output Y'. Other embodiments can reconstruct the d weights using the d weight parts at each of the K training computers to obtain the model, which can then be used by a single computer to determine a predicted output for a new sample.

B. Logistic Regression:

Embodiments of the invention can use logistic regression techniques. Logistic regression is a widely used classification algorithm and is conceptually similar to linear regression. The main difference is that the dependent variable y is binary, as opposed to a real value in the case of linear regression. For example, given a data item x relating to a user's transaction history, the training computers can decide whether a pending transaction should be approved y=1 or denied y=0.

Figure 21:
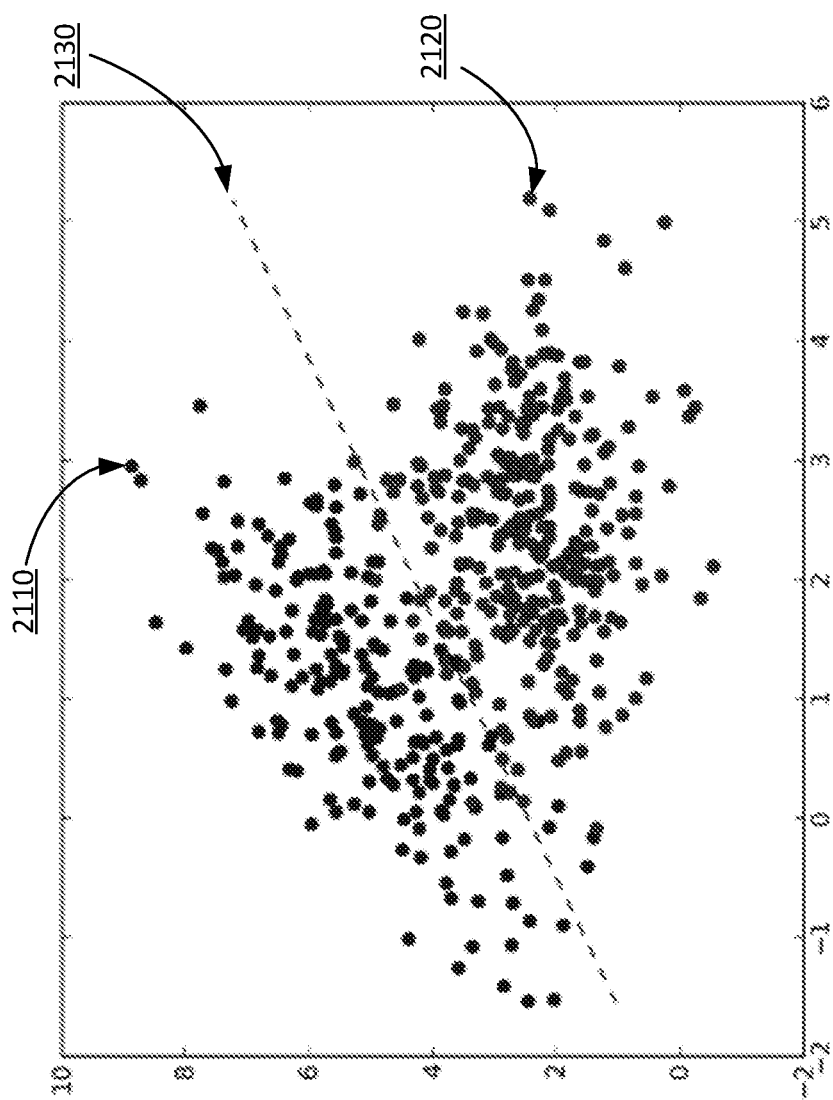
FIG. 21 shows a plot of the separation of labeled data during a machine learning process according to an embodiment of the invention.

FIG. 21 shows a plot of the separation of labeled data during a machine learning process according to an embodiment of the invention. FIG. 21 will be described in reference to transaction history data, however, it is understood that any suitable data can be used. The plot includes approved transactions 2110, denied transactions 2120, and a hyperplane 2130.

The approved transactions 2110 can include data that has been labeled with y=1, whereas the denied transactions 2120 can include data that has been labeled with y=0. The hyperplane 2130 can be a plane that separates the approved transactions 2110 and the denied transactions 2120. The training computers can be capable of determining an optimal hyperplane 2130 that separates the two sets of labeled data.

In this case, the rate of convergence can be improved by bounding the output variable to be in the range between zero and one. This is achieved by applying an activation function $f$, which is bounded by zero and one, to the inner product, i.e. y'=g(x)=$f$(x·w). While there are many suitable activation functions, in the problem of logistic regression, $f$ is defined to be the logistic function $$f(u) = \frac{1}{1+e^u}.$$

One consequence of using this activation function is that the L2 cost function, described above, is no longer convex. This can be addressed by changing the cost function to be the cross entropy equation, $C_{(x,y)}(w) := -y \log f(x \cdot w) - (1-y) \log(1-f(x \cdot w))$. The update function for batch j can be defined as, $$w := w - \alpha \frac{1}{B} X_j^T \times (f(X_j \times w) - Y_j)$$

While the cost function has changed, the update function is similar to linear regression with the sole addition of the activation function $f$.

However, computing the logistic function in the secret-shared setting is an expensive operation. In some embodiments, the approach presented by Mohassel & Zhang [41] can be performed, where the logistic function is replaced with the piecewise function:

$$f(x) = \begin{cases} 0, & x < -1/2 \\ x + 1/2, & -1/2 \le x < 1/2 \\ 1, & 1/2 \le x \end{cases}$$

As shown in [41; FIG. 7], the piecewise function roughly approximates the original. Moreover, [41] empirically showed that this change only decreases the accuracy of the MNIST model by 0.02 percent. This can allow the training computers to easily handle other approximations of the logistic function (e.g. [37] considers a piecewise linear function with 12 pieces).

C. Neural Nets:

Embodiments of the invention can use neural network techniques. Neural network models can have accurate predictions on a wide range of applications, such as image and speech recognition. Conceptually, neural networks are a generalization of regression to support complex relationships between high dimensional input and output data. A basic neural network can be divided up into m layers, each containing $m_i$ nodes. Each node is a linear function composed with a nonlinear activation function. To evaluate a neural network, the nodes at the first layer are evaluated on the input features. The outputs of these nodes are then forwarded as inputs to the next layer of the network until all layers have been evaluated in this manner. The training of neural networks is performed using back propagation, in a similar manner to logistic regression, except that each layer of the network should be updated in a recursive manner, starting at the output layer and working backward. Many different neural network activations functions have been considered in the literature. One of the most popular is the rectified linear unit (ReLU) function, which can be expressed as $f(x) = \max(0, x)$. This function, and nearly all other activations functions, can easily be implemented using the piecewise polynomial technique described herein. The evaluation of neural networks is considered herein. A single training iteration is approximately twice the cost of the evaluation. For a more detailed description of the exact operations, neural network evaluation entails, see also [44], [37].

IX. Results of Privacy-Preserving Machine Learning

Next, results of an implementation of the methods and systems described herein will be described. The implementation was written in C++ and builds on the primitives provided by the libOTe library [46], the Ivory Runtime [45], and the linear algebra library Eigen [3]. All arithmetic shares are performed modulo $2^{64}$. Due to the significant development time required to implement the maliciously secure protocols ([26] has no publicly available code), we implement and report performance numbers for the semi-honest setting. This does not hinder comparison with prior work, since prior works focus on semi-honest protocols.

The implementation in the semi-honest setting demonstrates that methods according to embodiments of the invention are as fast, or faster, than all previous protocols. Embodiments of the invention improve the overall running time by 100 to 1000 times, while reducing the amount of communication. The implemented tasks include linear and logistic regression training for a variety of problem sizes and neural network evaluations for the Modified National Institute of Standards and Technology (MNIST) hand writing recognition task [6].

A. Experimental Setup:

The implementation is performed on a single server equipped with 2 18-core Intel Xeon CPUs and 256 GB of RAM. Despite having this many cores, each party performs the vast majority of their computation on a single thread. All three parties communicate through a local loopback device using the Linux tc command to artificially set the bandwidth and latency as desired. We consider two such settings: a local area network (LAN) setting with a shared 10 Gbps connection and sub-millisecond round-trip time (RTT) latency and a wide area network (WAN) setting with a 40 Mbps maximum throughput and 40 ms RTT latency. The server also employs hardware accelerated AES-NI to perform fast random number generation. However, it is understood that embodiments of the invention are not limited thereto.

B. Datasets:

Some embodiments of the invention relate to the performance of privacy-preserving machine learning solutions. As a result, the implementation can use synthetic datasets to demonstrate the performance of the framework. To obtain the accuracy on real datasets, we refer to [41] which performs a functionally equivalent computation.

C. Linear Regression:

First, the gradient decent protocol for learning linear regression models as described herein will be discussed. At each iteration, a random subset $X_j$ of the dataset is sampled and the model is updated as $$w := w - \alpha \frac{1}{B} X_j^T \times (X_j \times w - Y_j).$$

We report performance in terms of iterations per second, as opposed to end-to-end running time. This is done to present the results in a way that can be easily compared to other tasks.

FIG. 22 shows a data table of linear regression performance. FIG. 22 presents the throughput of our protocol compared to [41] and is further parameterized by the number of features (i.e., dimension) $d \in \{10, 100, 1000\}$ and the size of the mini-batch $B \in \{128, 256, 512, 1024\}$. In FIG. 22, linear regression performance is measured in iterations per second. Dimension denotes the number of features, while batch size denotes number of samples used in each iteration. WAN setting has 40 ms RTT latency and 40 Mbps throughput. The preprocessing for [41] was performed either using OT or the DGK cryptosystem with the faster protocol being reported above. The * symbol denotes that the DGK protocol was performed.

The columns labeled "Online" denote the throughput of the input dependent computation, while the columns labeled "Online+Offline" denote the total throughput including the pre-processing phase, which is input independent. As the figure shows, throughput of embodiments of the invention is strictly better than that of [41]. In the LAN setting online throughput of embodiments is between 1.5 to 4.5 times greater than [41] The throughput difference in the online phase can be attributed to a simpler multiplication protocol. For example, [41] requires preprocessed matrix beaver triples, along with a more complex opening procedure. While the online throughput of embodiments is considerably higher than [41], another advantage is an offline phase, which is orders of magnitude more efficient.

When the overall throughput is considered, the throughput of embodiments becomes 200 to 1000 times greater than [41]. The difference can be attributed to replicated secret-sharing where multiplication can be performed without the expensive beaver triples preprocessing step. The operation performed in the offline phase according to embodiments is the generation of truncated shares $[\![r]\!]$ and $[\![r/2^d]\!]$, which requires computing the addition circuit which can be made extremely efficient, as described herein.

In the WAN setting, embodiments are also faster than [41] by roughly a factor of 2 in the online phase and 10 to 1000 times faster when the overall throughput is considered. In the online phase, both protocols require the same number of rounds. This difference in throughput can be attributed to an improved implementation and a more efficient multiplication protocol. As before, the overall throughput of embodiments is similar to just the online phase, with a reduction in throughput of roughly 10 percent. This is in drastic contrast with [41], where the majority of the computation is performed in the offline phase.

Embodiments of the invention also achieve a smaller communication overhead compared to [41]. The communication complexity for the online phase of both protocols is similar. Each party performs two matrix multiplications where shares of B and D are sent. However, in the offline phase, [41] presents two protocols where the first requires O(BD) exponentiations and D+B elements to be communicated per iterations. Embodiments of the invention do not require exponentiations, and achieves the same communication overhead, albeit with better constants. Due to the large number of exponentiations required by the protocol, [41] also propose a second technique based on oblivious transfer which is more computationally efficient at the expense of an increased communication of O(BDk) elements per iterations.

In the LAN setting, the computationally efficient oblivious transfer protocol achieves the higher throughput. However, in the WAN setting, the communication overhead is the bottleneck and the exponentiation-based protocol becomes faster. In FIG. 22, we report and compare against the variant with the best throughput. In embodiments, the preprocessing is computationally more efficient than either approach presented by [41] and requires less communication.

Due to the offline phase of [41] having such a low throughput, the authors proposed an alternative client-aided protocol where semi-honest clients generate triplet shares in preprocessing and share them among the two servers. If an assisting client is the third sever, this variant of their protocol has a similar security model as ours with the notable exception that there is no natural way to extend it to the malicious setting. The advantage of adding a third party is that the throughput of the offline phase can be significantly improved. However, it is still several orders of magnitude slower than the preprocessing according to embodiments of the invention for a few reasons. First, their protocol requires that random matrices of the form $R_1 \times R_2 = R_3$ be generated by the third party, where $R_1$ is a D×B dimension matrix. These have to be constructed and sent to the two other parties resulting in high communication. On the other hand, preprocessing according to embodiments of the invention simply requires the sending of O(B) elements. Considering that D can be in the order of 100s this results in a significant reduction is computation and communication. Moreover, overall embodiments of the invention are already faster than the online phase of [41] and therefore is faster regardless of which preprocessing technique is used.

D. Logistic Regression:

Next, an evaluation of the training of logistic regression models will be discussed. Logistic regression is more complex than linear regression due to the need to compute the logistic function at each iteration. Embodiments of the invention can approximate this using a piecewise linear function, which switches to and from a binary secret-sharing scheme. While relatively efficient computationally, it does have a consequence of increasing the round complexity by 7 per iteration in some embodiments.

FIG. 23 shows a data table of logistic regression performance. Logistic regression performance is measured in iterations per second. In the LAN setting, where latency is small, piecewise linear functions have little impact. For example, given a batch size of B=128 and dimension D=10, embodiments of the invention can perform 2251 iterations per second using a single thread. Moreover, increasing the dimension to D=100, only decreases the throughput to 1867 iterations per second. When compared to [41], this represents an order of magnitude improvement in running time. This difference is primarily attributed to [41] using garbled circuits, which requires fewer rounds at the cost of increased bandwidth and more expensive operations. For both linear and logistic regression, the offline phase is similar in iterations per second. As such, the efficient offline phase in embodiments, results in a 200 and 800 times speedup over [41], when the overall throughput is considered.

In the WAN setting, an increased round complexity begins to lower performance to the point that [41] is almost as fast as embodiments of the invention during the online phase. For B=128 and D=100 embodiments perform 4.1 iterations per seconds, while [41] achieves 3.1 iterations per second. However, as the batch size increases (resulting in better rate of convergence), embodiments scale significantly better then [41].

Consider a batch size of B=1024, where embodiments achieve 3.99 iterations per second while [41] achieves 0.99 iterations per seconds. When the end-to-end throughput is considered, embodiments are approximately 1.05 times slower while [41] is between 2 and 100 times slower, representing 3 to 300 times improvement when compared with embodiments of the invention.

Embodiments of the invention also achieve a smaller communication overhead when approximating the logistic function. This can be attributed to using a binary secret-sharing and the binary-arithmetic multiplication protocol, described herein. In total, some embodiments require each party to send roughly 8 Bk bits while [41], which uses garbled circuits and requires 1028 Bk bits. In some embodiments, there are 7 rounds of interaction, compared to 4 rounds by [41]. However, at the cost of less than double the rounds, embodiments achieve a 128 times reduction in communication, which facilitates a much higher throughput in the LAN or WAN setting when there is a large amount of parallelism.

E. Inference:

We also benchmark our framework performing machine learning inference using linear regression, logistic regression, and neural network models. For this task, a model, that has already been trained, is secret-shared between the parties, along with an unlabeled feature vector for which a prediction is desired. Given this, the training computers evaluate the model on the feature vector to produce a prediction label. Inference (evaluation) for all three types of models can be seen as a special case of training (e.g. one forward propagation in case of neural networks), and hence can be easily performed using embodiments of the invention.

The performance of embodiments of the invention on the MNIST task [6] is reported, which takes 784=28×28 pixel images of hand written numbers as input features and attempts to output the correct number. The accuracy of these models range from 93% (linear) to 99% (CNN). The performance of this task can be compared to prior works that also performed the MNIST task, such as [41], [44], [38].

When evaluating a linear model, embodiments can use one online round of interaction (excluding the sharing of the input and reconstructing the output). As such, the online computation is extremely efficient, performing one inner product and communicating O(1) bytes. The offline preprocessing however, can use slightly more time, at 3.7 ms, along with the majority of the communication. The large difference between online and offline can be attributed to the fact that the offline phase is optimized for high throughput as opposed to low latency.

Indeed, to take advantage of streaming SIMD extensions (SSE) vectorization instructions, the offline phase performs 128 times more work than is required. When compared to SecureML, it can be observed that their total time for performing a single prediction is slightly less than embodiments of the invention, due to their offline phase requiring one round of interaction as compared to our 64 rounds. However, achieving this running time in the two party setting requires a very large communication of 1.6 MB as opposed to our 0.002 MB, an 800× improvement.

Embodiments of the invention also scale much better, as it requires almost the same running time to evaluate 100 predictions as it does 1. SecureML on the other hand incurs a 20× slowdown, which is primarily in the communication heavy OT-based offline phase.

A similar trend can be observed when evaluating a logistic regression model. The online running time of embodiments of the invention, when evaluating a single input vector, require just 0.2 milliseconds compared to SecureML requiring 0.7, with the total time of both protocols being approximately 4 milliseconds. However, embodiments of the invention require 0.005 MB of communication compared to 1.6 MB by SecureML, a 320× difference. When 100 inputs are all evaluated together, the total running time of embodiments is 9.1 ms compared to 54.2 by SecureML, a 6× improvement.

Embodiments of the invention particularly stand out when evaluating neural networks. A first network to consider (NN) contains three fully connected layers consisting of 128, 128, and 10 nodes respectively. Between each layer, the ReLU activation function can be applied using the piecewise polynomial technique described herein. Embodiments require 3 ms in the online phase to evaluate the model and 8 ms overall. SecureML, on the other hand, requires 193 ms in the online phase and 4823 ms overall, a 600× difference. Embodiments also require 0.5 MB of communication, as compared to 120.5 MB by SecureML.

More recently MiniONN [38] and Chameleon [44] have both proposed similar mixed protocol frameworks for evaluating neural networks. Chameleon builds on the two party ABY framework [22], whereas embodiments extend to the three-party case. However, Chameleon modifies that framework so that a semi-honest third party helps perform the offline phase as suggested in the client-aided protocol of [41]. As such, Chameleon's implementation can also be seen in the semi-honest three-party setting (with an honest majority). In addition, because Chameleon is based on two-party protocols, many of its operations are less efficient compared to embodiments of the invention, and cannot be naturally extended to the malicious setting. MiniONN on the other hand, is in the same two-party model as SecureML. It too is based on semi honest two-party protocols and has no natural extension to the malicious setting.

FIG. 24 shows running time and communications of privacy preserving inference of linear, logistic, and neural network models in the LAN setting. [41] was evaluated on the benchmark machine and [44], [38] are cited from [44] using a similar machine. The models are for the MNIST dataset with D=784 features. NN denotes neural net with 2 fully connected hidden layers each with 128 nodes along with a 10 node output layer. CNN denotes a convolutional neural net with 2 hidden layers, see [44]. * denotes where embodiments over approximate the cost of the convolution layers with an additional fully connected layer with 980 nodes.

As FIG. 24 shows, embodiments significantly outperform both Chameleon and MiniONN protocols when run on similar hardware. The online running time of embodiments is just 6 milliseconds compared to 1360 by Chameleon and 3580 by MiniONN. The difference becomes even larger when the overall running time is considered, with embodiments requiring 10 milliseconds, while Chameleon and MiniONN require 270× and 933× more time, respectively. In addition, our protocol requires the least communication of 5.2 MB compared to 12.9 by Chameleon and 657.5 by MiniONN. Chameleon's implementation is in a similar security model to embodiments of the invention, whereas MiniONN is in the two-party setting.

X. Computer System

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems may be interconnected via a system bus. Additional subsystems can include a printer, keyboard, storage device(s), monitor, which can be coupled to display adapter. Peripherals and input/output (I/O) devices, which couple to I/O controller, can be connected to the computer system by any number of means known in the art such as input/output (I/O) port (e.g., USB, FireWire®). For example, an I/O port or external interface (e.g. Ethernet, Wi-Fi, etc.) can be used to connect the computer system to a wide area network such as the Internet, a mouse input device, or a scanner. The interconnection via system bus can allow the central processor to communicate with each subsystem and to control the execution of a plurality of instructions from system memory or the storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by external interface, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

XI. References

[1] Arcene data set. archive.ics.uci.edu/ml/datasets/Arcene. Accessed: 2016-07-14

[2] Azure machine learning studio. azure.microsoft.com/en-us/services/machine-learning-studio/

[3] Eigen library. eigen.tuxfamily.org/[4]

[4] Google cloud ai. cloud.google.com/products/machine-learning/[5]

[5] Machine learning on aws. aws.amazon.com/machine-learning/[6]

[6] MNIST database. yann.lecun.com/exdb/mnist/. Accessed: 2016-07-14

[7] Watson machine learning. www.ibm.com/cloud/machine-learning

[8] M. Abadi et al., Deep learning with differential privacy, In *Proceedings of the* 2016 *ACM SIGSAC Conference on Computer and Communications Security*, pages 308-318. ACM, 2016

[9] Y. Aono et al., Scalable and secure logistic regression via homomorphic encryption. In *Proceedings of the Sixth ACM Conference on Data and Application Security and Privacy*, pages 142-144. ACM, 2016

[10] T. Araki et al., High-throughput semi-honest secure three-party computation with an honest majority, In E. R. Weippl et al., editors, *Proceedings of the* 2016 *ACM SIGSAC Conference on Computer and Communications Security*, Vienna, Austria, October 24-28, 2016, pages 805-817. ACM, 2016

[11] J. Barzilai and J. J. Borwein, Two-point step size gradient methods, 8:141-148, 01 1988

[12] A. Ben-David et al., Fairplay MP: a system for secure multi-party computation. pages 257-266

[13] F. Bourse et al., Fast homomorphic evaluation of deep discretized neural networks, Cryptology ePrint Archive, Report 2017/1114, 2017, eprint.iacr.org/2017/1114

[14] P. Bunn and R. Ostrovsky. Secure two-party k-means clustering. In *Proceedings of the* 14*th ACM conference on Computer and communications security*, pages 486-497. ACM, 2007

[15] R. Canetti. Security and composition of multiparty cryptographic protocols, 13(1):143-202, 2000

[16] H. Chabanne et al., Privacy-preserving classification on deep neural network, *IACR Cryptology ePrint Archive*, 2017:35, 2017

[17] N. Chandran et al., Efficient, constant-round and actively secure MPC: beyond the three-party case, In B. M. Thuraisingham, D. Evans, T. Malkin, and D. Xu, editors, *Proceedings of the 2017 ACM SIGSAC Conference on Computer and Communications Security*, C C S 2017, Dallas, Tex., USA, Oct. 30-Nov. 3, 2017, pages 277-294. ACM, 2017

[18] N. Chandran et al., Ezpc: Programmable, efficient, and scalable secure two-party computation, *Cryptology ePrint Archive*, Report 2017/1109, 2017. eprint.iacr. org/2017/1109

[19] M. Chase, R. Gilad-Bachrach, K. Lathe, K. Lauter, and P. Rindal. Private collaborative neural network learning

[20] M. Chiesa et al., Towards securing internet exchange points against curious onlookers, In L. Eggert and C. Perkins, editors, *Proceedings of the 2016 Applied Networking Research Workshop, ANRW 2016*, Berlin, Germany, Jul. 16, 2016, pages 32-34. ACM, 2016

[21] D. Demmler et al., ABY—A framework for efficient mixed-protocol secure two-party computation.

[22] D. Demmler, T. Schneider, and M. Zohner. Aby-a framework for efficient mixed-protocol secure two-party computation, In *NDSS*, 2015

[23] W. Du and M. J. Atallah, Privacy-preserving cooperative scientific computations, In csfw, volume 1, page 273. Citeseer, 2001

[24] W. Du et al., Privacy-preserving multivariate statistical analysis: Linear regression and classification. In *SDM*, volume 4, pages 222-233, SIAM, 2004

[25] M. K. Franklin, M. Gondree, and P. Mohassel. Multiparty indirect indexing and applications. pages 283-297

[26] J. Furukawa et al., High-throughput secure three-party computation for malicious adversaries and an honest majority. In J. Coron and J. B. Nielsen, editors, *Advances in Cryptology—EUROCRYPT 2017-36th Annual International Conference on the Theory and Applications of Cryptographic Techniques*, Paris, France, Apr. 30-May 4, 2017, Proceedings, Part II, volume 10211 of Lecture Notes in Computer Science, pages 225-255, 2017

[27] A. Gascon et al., Secure linear regression on vertically partitioned datasets

[28] I. Giacomelli et al., Privacy preserving ridge regression over distributed data from lhe. Cryptology ePrint Archive, Report 2017/979, 2017, eprint.iacr.org/2017/979

[29] R. Gilad-Bachrach et al., Cryptonets: Applying neural networks to encrypted data with high throughput and accuracy. In *International Conference on Machine Learning*, pages 201-210, 2016

[30] R. Gilad-Bachrach et al., Secure data exchange: A marketplace in the cloud, Cryptology ePrint Archive, Report 2016/620, 2016, eprint.iacr.org/2016/620

[31] D. Harris, A taxonomy of parallel prefix networks, 12 2003

[32] E. Hesamifard et al., Cryptodl: Deep neural networks over encrypted data. *arXiv preprint arXiv:* 1711.05189, 2017

[33] G. Jagannathan and R. N. Wright, Privacy-preserving distributed kmeans clustering over arbitrarily partitioned data. In *Proceedings of the eleventh ACM SIGKDD international conference on Knowledge discovery in data mining*, pages 593-599. ACM, 2005

[34] V. Kolesnikov and T. Schneider, Improved garbled circuit: Free XOR gates and applications, pages 486-498

[35] R. Kumaresan, S. Raghuraman, and A. Sealfon. Network oblivious transfer. In M. Robshaw and J. Katz, editors, *Advances in Cryptology—CRYPTO 2016-36th Annual International Cryptology Conference*, Santa Barbara, Calif., USA, Aug. 14-18, 2016, Proceedings, Part II, volume 9815 of Lecture Notes in Computer Science, pages 366-396, Springer, 2016

[36] Y. Lindell and B. Pinkas, Privacy preserving data mining, In *Annual International Cryptology Conference*, pages 36-54. Springer, 2000

[37] J. Liu et al., Oblivious neural network predictions via minionn transformations, In B. M. Thuraisingham et al., editors, *Proceedings of the 2017 ACM SIGSAC Conference on Computer and Communications Security*, C C S 2017, Dallas, Tex. USA, Oct. 30-Nov. 3, 2017, pages 619-631. ACM, 2017

[38] J. Liu et al., Oblivious neural network predictions via minionn transformations. In *Proceedings of the 2017 ACM SIGSAC Conference on Computer and Communications Security*, pages 619-631, ACM, 2017

[39] H. B. McMahan et al., Learning differentially private language models without losing accuracy, *arXiv preprint arXiv:* 1710.06963, 2017

[40] P. Mohassel et al., Fast and secure three-party computation: The garbled circuit approach. pages 591-602

[41] P. Mohassel and Y. Zhang. Secureml: A system for scalable privacy preserving machine learning. In *2017 IEEE Symposium on Security and Privacy, SP 2017*, San Jose, Calif., USA, May 22-26, 2017, pages 19-38, IEEE Computer Society, 2017

[42] M. Naor et al., Privacy preserving auctions and mechanism design, In *EC*, pages 129-139, 1999

[43] V. Nikolaenko et al., Privacy-preserving ridge regression on hundreds of millions of records, In *Security and Privacy (SP), 2013 IEEE Symposium on*, pages 334-348. IEEE, 2013

[44] M. S. Riazi et al., Chameleon: A hybrid secure computation framework for machine learning applications

[45] P. Rindal. A generic Secure Computation API for garbled circuits, SPDZ, etc. github.com/ladnir/Ivory-Runtime

[46] P. Rindal. libOTe: an efficient, portable, and easy to use Oblivious Transfer Library. github.com/osu-crypto/libOTe

[47] B. D. Rouhani et al., Deepsecure: Scalable provably-secure deep learning, *arXiv preprint arXiv:* 1705.08963, 2017

[48] A. P. Sanil et al., Privacy preserving regression modelling via distributed computation. In *Proceedings of the tenth ACM SIGKDD international conference on Knowledge discovery and data mining*, pages 677-682. ACM, 2004

[49] R. Shokri and V. Shmatikov, Privacy-preserving deep learning, In *Proceedings of the 22nd ACM SIGSAC Conference on Computer and Communications Security*, pages 1310-1321. ACM, 2015

[50] R. Shokri et al., Membership inference attacks against machine learning models, In *Security and Privacy (SP), 2017 IEEE Symposium on*, pages 3-18. IEEE, 2017

[51] A. B. Slavkovic et al., "secure" logistic regression of horizontally and vertically partitioned distributed databases. In *Seventh IEEE International Conference on Data Mining Workshops (ICDMW 2007)*, pages 723-728. IEEE, 2007

[52] C. Song et al., Machine learning models that remember too much. In *Proceedings of the 2017 ACM SIGSAC Conference on Computer and Communications Security*, pages 587-601, ACM, 2017

[53] F. Tramèr et al., Stealing machine learning models via prediction apis, In *USENIX Security Symposium, pages* 601-618, 2016

[54] J. Vaidya et al., Privacy-preserving svm classification, *Knowledge and Information Systems*, 14(2):161-178, 2008

[55] S. Wu et al., Privacy preservation for stochastic gradient descent application to secure logistic regression, *The 27th Annual Conference of the Japanese Society for Artificial Intelligence*, 27:1-4, 2013

[56] H. Yu et al., Privacy-preserving svm classification on vertically partitioned data, In *Pacific Asia Conference on Knowledge Discovery and Data Mining*, pages 647-656. Springer, 2006

[57] S. Zahur et al., Two halves make a whole—reducing data transfer in garbled circuits using half gates. pages 220-250

What is claimed is:

1. A method of performing privacy-preserving machine learning in a three-server model, the method comprising:
storing, by three training computers, secret-shared private data from a plurality of data clients, wherein each secret-shared data item of the secret-shared private data is represented by three parts, and wherein the secret-shared private data includes a set of training samples, each having features and an output Y, wherein the three training computers comprise a first training computer, a second training computer, and a third training computer;
initializing values for a set of weights for a machine learning model, the weights being secret-shared among the three training computers, wherein the weights and the features are stored as integers;
truncating, by the three training computers, a result of a multiplication of a secret-shared feature and a secret-shared weight as part of training the machine learning model, wherein the result comprises a first share, a second share, and a third share, wherein truncating includes:
generating, by the second training computer and the third training computer, a random value, wherein the random value is determined to be a truncated third share;
truncating, by the second training computer, a sum of the second share and the third share resulting in an intermediate value, wherein the intermediate value is subtracted by the random value resulting in a truncated second share;
transmitting, by the second training computer, the truncated second share to the first training computer; and
transmitting, by the first training computer, a truncated first share to the third training computer, the truncated first share generated by truncating the first share; and
training, by performing additional multiplications and truncations for secret-shared features of the set of training samples and secret-shared weights, a machine learning model for predicting the outputs Y of the set of training samples.

2. The method of claim 1, wherein the random value is generated using a pseudorandom function and a secret key stored by the second training computer and the third training computer.

3. The method of claim 1 further comprising:
multiplying, by the three training computers, matrix-vectors X and Y such that half of the multiplications are done locally, and wherein each server shares a final result $Z_i$ with N communications.

4. The method of claim 1, wherein the training samples are selected as part of a batch of training samples that are selected randomly, wherein the batch of training samples have a batch size B proportional to available bandwidth in a time for one round trip.

5. The method of claim 1, wherein the training samples are selected as part of a batch of training samples that are selected randomly, wherein the batch of training samples have a batch size B based on a size of the training samples.

6. The method of claim 1, further comprising:
reconstructing the weights using weight parts at each of the three training computers.

7. The method of claim 1, further comprising:
receiving a new sample having d features;
applying, by each of the three training computers, weight parts of the machine learning model to obtain output parts; and
reconstructing, by the three training computers, the output parts to obtain a predicted output for the new sample.

8. A method of performing privacy-preserving machine learning in a three-server model, the method comprising:
storing, by three training computers, secret-shared private data from a plurality of data clients, wherein each secret-shared data item of the secret-shared private data is represented by three parts, and wherein the secret-shared private data includes a set of training samples, each having features and an output Y, wherein the three training computers comprise a first training computer, a second training computer, and a third training computer;
initializing values for a set of weights for a machine learning model, the weights being secret-shared among the three training computers, wherein the weights and the features are stored as integers;
truncating, by the three training computers, a result of a multiplication of a secret-shared feature and a secret-shared weight as part of training the machine learning model, wherein the result comprises a first share, a second share, and a third share, wherein truncating includes:
performing preprocessing, by the three training computers, resulting in a random arithmetic share and a truncated random arithmetic share for each of the three training computers;
computing, by each of the three training computers, a respective result share minus the random arithmetic share resulting in intermediate shares of an intermediate value;
revealing, by the three training computers, the intermediate shares to the three training computers, resulting in the three training computers storing the intermediate value;
truncating, by the three training computers, the intermediate value, resulting in a truncated intermediate value; and
computing, by each of the three training computers, the respective truncated random arithmetic share plus the truncated intermediate value, resulting in a truncated data item, wherein the truncated data item is secret-shared among the three training computers; and training, by performing additional multiplications and truncations for secret-shared features of the set of training samples and secret-shared weights, a machine learning model for predicting the outputs Y of the set of training samples.

9. The method of claim 8, wherein performing preprocessing further comprises:
determining, by the three training computers, a random binary share for each of the three training computers;
generating, by the three training computers, shares of two of three shares of the random binary share; and
determining, by the three training computers, a third share of the three shares of the random binary share, based on the random binary share and the shares of two of the three shares of the random binary share.

10. The method of claim 8, wherein performing preprocessing further comprises:
determining, by the three training computers, a random binary share for each of the three training computers, wherein the random binary share is truncated to be a truncated random binary share;
generating, by a first training computer and a second training computer of the three training computers, shares of a second share of the random binary share and shares of a truncated second share of the truncated random binary share;
generating, by the second training computer and a third training computer of the three training computers, shares of a third share of the random binary share and shares of a truncated third share of the truncated random binary share;
revealing, by the three training computers, the shares of the second share and the shares of the truncated second share to the first training computer and the second training computer, and revealing the shares of the third share and shares of the truncated third share to the second training computer and the third training computer; and
computing, by the three training computers, shares of a first share of the random binary share and shares of a truncated first share of the truncated random binary share based on the random binary share, the truncated random binary share, the shares of the second share, the shares of the third share, the shares of the truncated second share, and the shares of the truncated third share using a ripple carry subtraction circuit and thereafter revealing the shares of the first share and the shares of the truncated first share to the first training computer and the third training computer.

11. The method of claim 8, wherein performing preprocessing is performed in parallel for all truncations and results of preprocessing are stored respectively at the three training computers.

12. The method of claim 8, wherein revealing, by the three training computers, the intermediate shares to the three training computers further comprises:
updating, by the three training computers, a log of reveal messages to include the intermediate shares; and
comparing, by the three training computers, the log of reveal messages stored by each of the three training computers.

13. The method of claim 8, further comprising:
reconstructing the weights using weight parts at each of the three training computers.

14. The method of claim 8, further comprising:
receiving a new sample having d features;
applying, by each of the three training computers, weight parts of the machine learning model to obtain output parts; and
reconstructing, by the three training computers, the output parts to obtain a predicted output for the new sample.

15. A method of efficiently performing computations using secret-shared data shared among a plurality of computers, the method comprising:
storing, by three training computers, secret-shared private data from a plurality of data clients, wherein each secret-shared data item of the secret-shared private data is represented by three parts, and wherein the secret-shared private data includes a set of training samples, each having features and an output, wherein the three training computers comprise a first training computer, a second training computer, and a third training computer;
initializing values for a set of weights for a machine learning model, the weights being secret-shared among the three training computers, wherein the weights and the features are stored as integers, and wherein a first shared tensor X comprises secret-shared features and a second shared tensor Y comprises secret-shared weights;
determining, by the first training computer, local shares of elements of an inner product z of locally-stored shares of the first shared tensor X and locally-stored shares of the second shared tensor Y, wherein the second training computer and the third training computer determine respective local shares of elements of the inner product;
summing, by the first training computer, local shares of the elements of the inner product z to obtain a local share of the inner product z;
truncating, by the first training computer, the local share of the inner product z, wherein the second training computer and the third training computer truncate respective local shares of the inner product;
revealing, by the first training computer, a truncated local share of the inner product to the third training computer; and
receiving, by the first training computer, a second truncated local share of the inner product from the second training computer.

16. The method of claim 15 further comprising:
training by performing, by the first training computer, additional multiplications and truncations for secret-shared features of the set of training samples and secret-shared weights, a machine learning model for predicting the outputs of the set of training samples.

17. The method of claim 15, wherein the local shares of the inner product comprise a first share, a second share, and a third share, and wherein the method further comprises:
revealing, by the first training computer, the first share of the inner product to the third training computer and the second training computer;
receiving, by the first training computer, the second share of the inner product from the second training computer; and
receiving, by the first training computer, the third share of the inner product from the third training computer.

18. The method of claim 15 further comprising:
determining, by the first training computer, preprocessed truncation pair comprising the secret-shared random value r and the secret-shared truncated random value, wherein the preprocessed truncation pair is determined in conjunction with a second training computer and a third training computer.

19. The method of claim 15, wherein truncating further comprises:
- adding, by the first training computer, the local shares of the elements of the inner product z and a secret-shared random value r, resulting in a local share of an intermediate value;
- revealing, by the first training computer, the local share of the intermediate value to the second training computer and the third training computer;
- receiving, by the first training computer, a share of the intermediate value, wherein the first training computer can determine an intermediate value;
- truncating, by the first training computer, the intermediate value by a predetermined number of bits to determine a truncated intermediate value; and
- subtracting, by the first training computer, the truncated intermediate value by a secret-shared truncated random value, resulting in a product of two tensors.

20. The method of claim 15, wherein truncating further comprises:
- generating, by the second training computer and the third training computer, a random value, wherein the random value is determined to be a truncated third share;
- truncating, by the second training computer, a sum of second local shares of the inner product and third local shares of the inner product resulting in an intermediate value, wherein the intermediate value is subtracted by the random value resulting in a truncated second share;
- transmitting, by the second training computer, the truncated second share to the first training computer; and
- transmitting, by the first training computer, a truncated first share of the inner product to the third training computer, the truncated first share generated by truncating a first share of the inner product locally stored by the first training computer.

* * * * *

UNITED STATES PATENT AND TRADEMARK OFFICE
CERTIFICATE OF CORRECTION

PATENT NO. : 11,222,138 B2  
APPLICATION NO. : 17/057574  
DATED : January 11, 2022  
INVENTOR(S) : Mohassel et al.

Page 1 of 1

It is certified that error appears in the above-identified patent and that said Letters Patent is hereby corrected as shown below:

On the Title Page

"Related U.S. Application Data" item (60), please remove "Provisional application No. 62/677,575" and insert -- Provisional application No. 62/677,576 --

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*